United States Patent
Matsuura et al.

(10) Patent No.: US 6,788,811 B1
(45) Date of Patent: Sep. 7, 2004

(54) CODING APPARATUS, DECODING APPARATUS, CODING METHOD, DECODING METHOD, AMD COMPUTER-READABLE RECORDING MEDIUM FOR EXECUTING THE METHODS

(75) Inventors: Nekka Matsuura, Tokyo (JP); Takahiro Yagishita, Tokyo (JP); Yukiko Yamazaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/565,545

(22) Filed: May 5, 2000

(30) Foreign Application Priority Data

May 10, 1999 (JP) .............................. 11-129147
Apr. 28, 2000 (JP) ........................ 2000-131322

(51) Int. Cl.[7] .............................. G06K 9/36; H04N 7/12; H04N 11/02

(52) U.S. Cl. ...................... 382/166; 382/248; 382/251; 382/281; 345/604; 348/395.1; 348/398.1; 348/403.1; 348/438.1; 358/426.01

(58) Field of Search ................................ 382/162, 166, 382/232, 233, 248, 250, 251, 253, 276, 278, 281, 240, 277, 167; 345/555, 589, 591, 604; 348/395.1, 396.1, 398.1, 403.1, 437.1, 438.1; 358/426.01, 426.04, 426.06

(56) References Cited

U.S. PATENT DOCUMENTS

| | | | |
|---|---|---|---|
| 4,875,063 A | 10/1989 | Idenawa et al. | |
| 4,918,489 A | 4/1990 | Inage et al. | |
| 4,977,414 A | 12/1990 | Shimada et al. | |
| 5,019,913 A | 5/1991 | Kiya et al. | |

(List continued on next page.)

FOREIGN PATENT DOCUMENTS

| | | |
|---|---|---|
| JP | 63-009282 | 1/1988 |
| JP | 6-246070 | 9/1994 |
| JP | 6-246079 | 9/1994 |
| JP | 10-257331 | 9/1998 |
| JP | 11-136519 | 5/1999 |

OTHER PUBLICATIONS

Delp et al, Image Compression Using Block Truncation Coding, IEEE Transactions on Communications, Sep. 1979, vol 27, iss 9, p 1335–1342.*

Lema et al, Absolute Moment Block Truncation Coding and Its Application to Color Images, IEEE Transactions on Communications, Oct. 1984, vol 32, iss 10, p 1148–1157.*

Campbell et al, Two bit/pixel full color encoding, Proceedings of the 13th annual conference on Computer Graphics and interactive techniques, Aug. 18–26, 1986, vol 20, iss 4, p 215–223.*

(List continued on next page.)

(57) ABSTRACT

A coding apparatus which can simplify a coding circuit and also simplify the processing of quantization. Image data that consists of R-, G-, and B-color components read from a scanner into buffers is subjected to transformation using a position correlation for each of RGB in position-correlation transformation sections. The DC component of each of the components is then color-converted in a color conversion section to be a DC lightness signal and DC color signals, and the signals are quantized in a quantization section and a coding section. Whereas, the AC components of each of the components are subjected to quantization in a first step in an AC component quantization section, and further to color conversion in a color conversion section to be an AC lightness signal and AC color signals. The signals are quantized in a second step in a quantization section and a coding section.

79 Claims, 38 Drawing Sheets

U.S. PATENT DOCUMENTS

| | | | |
|---|---|---|---|
| 5,107,278 A | | 4/1992 | Shimada et al. |
| 5,491,506 A | | 2/1996 | Yagishita et al. |
| 5,565,907 A | | 10/1996 | Wada et al. |
| 5,585,944 A | * | 12/1996 | Rodriguez .................. 358/500 |
| 5,838,817 A | * | 11/1998 | Funada ....................... 382/166 |
| 5,892,847 A | * | 4/1999 | Johnson ...................... 382/232 |
| 5,923,828 A | | 7/1999 | Yagishita |
| 6,031,937 A | * | 2/2000 | Graffagnino ................ 382/236 |
| 6,052,205 A | | 4/2000 | Matsuura |
| 6,144,763 A | * | 11/2000 | Ito .............................. 382/166 |
| 6,154,493 A | * | 11/2000 | Acharya et al. ........ 375/240.19 |
| 6,195,456 B1 | * | 2/2001 | Balasubramanian et al. .......................... 382/167 |
| 6,219,457 B1 | * | 4/2001 | Potu ........................... 382/246 |
| 6,427,029 B1 | * | 7/2002 | Kono et al. ................. 382/248 |
| 6,459,816 B2 | * | 10/2002 | Matsuura et al. ........... 382/248 |
| 6,480,623 B1 | | 11/2002 | Yagishita et al. |
| 6,507,674 B1 | | 1/2003 | Yagishita et al. |
| 6,519,052 B1 | | 2/2003 | Oneda et al. |
| 6,556,707 B1 | | 4/2003 | Yagishita et al. |
| 2002/0031276 A1 | | 3/2002 | Yagishita et al. |

OTHER PUBLICATIONS

M. Shahshahani, Wavelets and image compression, 1992 Conference Record of the Twenty–Sixth Asilomar Conference on Signals, Systems and Computers, Oct. 26–28, 1992, vol 2, p 701–704.*

Overturf et al, Color image coding using morphological pyramid decomposition, IEEE Transactions on Image Processing, Feb. 1995, vol 4, iss 2, p 177–185.*

*Primary Examiner*—Bhavesh M. Mehta
*Assistant Examiner*—Christopher Sukhaphadhana
(74) *Attorney, Agent, or Firm*—Oblon, Spivak, McClelland, Maier & Neustadt, P.C.

Tak Po Chan et al, Visual pattern BTC with two principle colors for color images, 1995 IEEE International Symposium on Circuits and Systems, Apr. 28–May 3, 1995, vol 1, p 235–238.*

Soo–Chang Pei et al, A novel block truncation coding of color images by using quaternion–moment–preserving principle, 1996 IEEE International Symposium on Circuits and Systems, May 12–15, 1996, vol 2, p 684–687.*

Y. Oshima, et al., Seikei University, Department of Technology, pp. 1–3, "Encoding of color image based on uniform color space," 1986 (with English Translation).

U.S. patent application Ser. No. 09/664,832, filed Sep. 19, 2000, pending.

U.S. patent application Ser. No. 10/153,654, filed May 24, 2002, pending.

U.S. patent application Ser. No. 10/230,090, filed Aug. 29, 2002, pending.

U.S. patent application Ser. No. 09/085,714, filed May, 28, 1998, allowed.

U.S. patent application Ser. No. 10/308,117, filed Dec. 03,2002, pending.

U.S. patent application Ser. No. 10/379,533, Takeyama et al., filed Mar. 6, 2003.

U.S. patent application Ser. No. 10/769,855, Watanabe et al., filed Feb. 3, 2004.

U.S. patent application Ser. No. 10/461,399, Sugiura et al., filed Jun. 16, 2003.

U.S. patent application Ser. No. 10/617,193, Yamazaki et al., filed Jul. 11, 2003.

U.S. patent application Ser. No. 09/073,873, filed May 7, 1998, pending.

U.S. patent application Ser. No. 09/282,456, filed Mar. 31, 1999, pending.

U.S.patent application Ser. No. 09/330,007, filed Jun. 11, 1999, pending.

U.S. patent application Ser. No. 09/401,503, filed Sep. 22, 1999, pending.

* cited by examiner

FIG.3A

| $R_{00}$ | $R_{01}$ |
|---|---|
| $R_{10}$ | $R_{11}$ |

FIG.3B

| $G_{00}$ | $G_{01}$ |
|---|---|
| $G_{10}$ | $G_{11}$ |

FIG.3C

| $B_{00}$ | $B_{01}$ |
|---|---|
| $B_{10}$ | $B_{11}$ |

FIG.4

$$LL_X = \frac{X_{00}+X_{01}+X_{10}+X_{11}}{4} \qquad HL_X = \frac{X_{00}+X_{01}}{2} - \frac{X_{01}+X_{11}}{2}$$

$$LH_X = \frac{X_{00}+X_{01}}{2} - \frac{X_{10}+X_{11}}{2} \qquad HH_X = X_{00}+X_{01}-X_{10}-X_{11}$$

$$Y_Z = \frac{Z_R+2Z_G+Z_B}{4} \qquad U_Z=Z_R-Z_G \qquad V_Z=Z_B-Z_G$$

| VECTOR No. | VECTOR |
|---|---|
| 1 | $(Y_{HL}, Y_{LH})=(0,0)$ |
| 2 | $(Y_{HL}, Y_{LH})=(16,0)$ |
| 3 | $(Y_{HL}, Y_{LH})=(32,0)$ |
| 4 | $(Y_{HL}, Y_{LH})=(64,0)$ |
| 5 | $(Y_{HL}, Y_{LH})=(-16,0)$ |
| 6 | $(Y_{HL}, Y_{LH})=(-32,0)$ |
| 7 | $(Y_{HL}, Y_{LH})=(-64,0)$ |
| 8 | $(Y_{HL}, Y_{LH})=(0,16)$ |
| 9 | $(Y_{HL}, Y_{LH})=(0,32)$ |
| 10 | $(Y_{HL}, Y_{LH})=(0,64)$ |
| 11 | $(Y_{HL}, Y_{LH})=(0,-16)$ |
| 12 | $(Y_{HL}, Y_{LH})=(0,-32)$ |
| 13 | $(Y_{HL}, Y_{LH})=(0,-64)$ |
| 14 | UNUSED |
| 15 | UNUSED |
| 16 | UNUSED |

VECTOR QUANTIZATION

SCALOR QUANTIZATION

| CONDITION | QUANTIZED VALUE |
|---|---|
| $n_u >= 1.0$ | 1.0 |
| $1.0 > n_u >= 0.5$ | 0.5 |
| $0.5 > n_u > -0.5$ | 0.0 |
| $-0.5 >= n_u > -1.0$ | -0.5 |
| $-1.0 >= n_u$ | -1.0 |

| $Y_{LL}$ 5 bit | $U_{LL}$ 5 bit | $V_{LL}$ 5 bit | $\vec{Y_H}$ 4 bit | $\vec{U_H}\vec{V_H}$ 5 bit |

NON-LINEAR QUATIZATION IN WHICH A
PART CLOSE TO ACHROMATIC COLOR
IS FINELY DIVIDED

FIG.24

| VECTOR No. | VECTOR |
|---|---|
| 1 | $(Y_{HL}, Y_{LH}) = (16, 0)$ |
| 2 | $(Y_{HL}, Y_{LH}) = (-16, 0)$ |
| 3 | $(Y_{HL}, Y_{LH}) = (0, 16)$ |
| 4 | $(Y_{HL}, Y_{LH}) = (0, -16)$ |
| 5 | $(Y_{HL}, Y_{LH}) = (32, 0)$ |
| 6 | $(Y_{HL}, Y_{LH}) = (-32, 0)$ |
| 7 | $(Y_{HL}, Y_{LH}) = (0, 32)$ |
| 8 | $(Y_{HL}, Y_{LH}) = (0, -32)$ |
| 9 | $(Y_{HL}, Y_{LH}) = (64, 0)$ |
| 10 | $(Y_{HL}, Y_{LH}) = (-64, 0)$ |
| 11 | $(Y_{HL}, Y_{LH}) = (0, 64)$ |
| 12 | $(Y_{HL}, Y_{LH}) = (0, -64)$ |
| 13 | $(Y_{HL}, Y_{LH}) = (16, 16)$ |
| 14 | $(Y_{HL}, Y_{LH}) = (-16, 16)$ |
| 15 | $(Y_{HL}, Y_{LH}) = (16, -16)$ |
| 16 | $(Y_{HL}, Y_{LH}) = (-16, -16)$ |

FIG.25

| $Y_{LL}$ 5 bit | $U_{LL}$ 5 bit | $V_{LL}$ 5 bit | $\vec{Y_H}$ 4 bit | $\vec{U_H}\vec{V_H}$ 5 bit |
|---|---|---|---|---|

EDGE SECTION CODE

| $Y_{LL}$ 7 bit | $U_{LL}$ 6 bit | $V_{LL}$ 6 bit | Flag 5 bit |
|---|---|---|---|

NON-EDGE SECTION CODE

FIG.27A
ORIGINAL IMAGE
FIG.27B
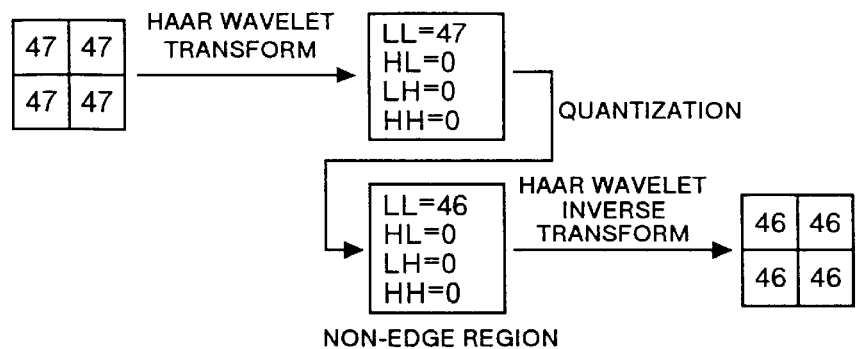
NON-EDGE REGION
FIG.27C
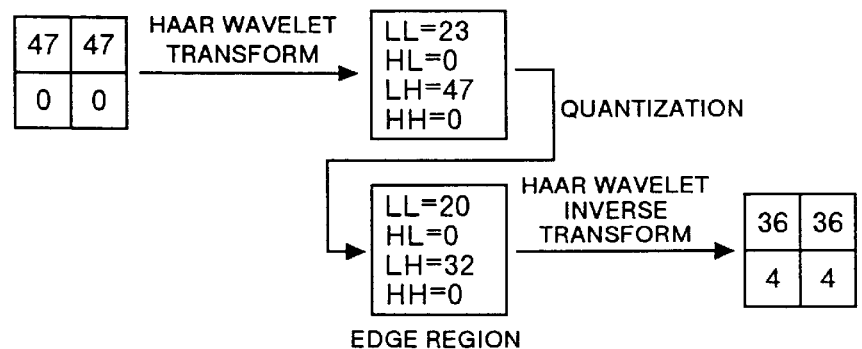
EDGE REGION

FIG.28

| $Y_{LL}$ 5 bit | $U_{LL}$ 5 bit | $V_{LL}$ 5 bit | $\vec{Y_H}$ 4 bit | $\vec{U_H}\vec{V_H}$ 5 bit |
|---|---|---|---|---|

EDGE REGION CODE

| $Y_{LL}$ 6 bit | $U_{LL}$ 5 bit | $V_{LL}$ 5 bit | $\vec{Y_H}$ 3bit | Flag 5 bit |
|---|---|---|---|---|

SMALLER-VALUE EDGE REGION CODE

| $Y_{LL}$ 7 bit | $U_{LL}$ 6 bit | $V_{LL}$ 6 bit | Flag 5 bit |
|---|---|---|---|

NON-EDGE REGION CODE

FIG.29A

| VECTOR No. | VECTOR |
|---|---|
| 1 | $(Y_{HL}, Y_{LH}) = (64, 0)$ |
| 2 | $(Y_{HL}, Y_{LH}) = (-64, 0)$ |
| 3 | $(Y_{HL}, Y_{LH}) = (0, 64)$ |
| 4 | $(Y_{HL}, Y_{LH}) = (0, -64)$ |
| 5 | $(Y_{HL}, Y_{LH}) = (96, 0)$ |
| 6 | $(Y_{HL}, Y_{LH}) = (-96, 0)$ |
| 7 | $(Y_{HL}, Y_{LH}) = (0, 96)$ |
| 8 | $(Y_{HL}, Y_{LH}) = (0, -96)$ |
| 9 | $(Y_{HL}, Y_{LH}) = (128, 0)$ |
| 10 | $(Y_{HL}, Y_{LH}) = (-128, 0)$ |
| 11 | $(Y_{HL}, Y_{LH}) = (0, 128)$ |
| 12 | $(Y_{HL}, Y_{LH}) = (0, -128)$ |
| 13 | $(Y_{HL}, Y_{LH}) = (64, 64)$ |
| 14 | $(Y_{HL}, Y_{LH}) = (-64, 64)$ |
| 15 | $(Y_{HL}, Y_{LH}) = (64, -64)$ |
| 16 | $(Y_{HL}, Y_{LH}) = (-64, -64)$ |

EDGE REGION

FIG.29B

| VECTOR No. | VECTOR |
|---|---|
| 1 | $(Y_{HL}, Y_{LH}) = (16, 0)$ |
| 2 | $(Y_{HL}, Y_{LH}) = (-16, 0)$ |
| 3 | $(Y_{HL}, Y_{LH}) = (0, 16)$ |
| 4 | $(Y_{HL}, Y_{LH}) = (0, -16)$ |
| 5 | $(Y_{HL}, Y_{LH}) = (32, 0)$ |
| 6 | $(Y_{HL}, Y_{LH}) = (-32, 0)$ |
| 7 | $(Y_{HL}, Y_{LH}) = (0, 32)$ |
| 8 | $(Y_{HL}, Y_{LH}) = (0, -32)$ |

SMALLER-VALUE EDGE REGION

SMALLER-VALUE EDGE REGION

FIG.36

NON-LINEAR QUANTIZATION TABLE
FOR COLOR-DIFFERENCE LOW FREQUENCY(5bit)

| ABSOLUTE VALUE OF INPUT VALUE | OUTPUT VALUE | TOTAL (POSITIVE/NEGATIVE INCLUDED) |
|---|---|---|
| 0 | 0 | 1 |
| 1~3 | 2 | 3 |
| 4~6 | 5 | 5 |
| 7~9 | 8 | 7 |
| 10~12 | 11 | 9 |
| 13~15 | 14 | 11 |
| 16~31 | 24 | 13 |
| 32~47 | 40 | 15 |
| 48~63 | 56 | 17 |
| 64~79 | 72 | 19 |
| 80~95 | 88 | 21 |
| 96~127 | 112 | 23 |
| 128~159 | 144 | 25 |
| 160~191 | 176 | 27 |
| 192~223 | 208 | 29 |
| 224~255 | 240 | 31 |

FIG.37

NON-LINEAR QUANTIZATION TABLE
FOR COLOR-DIFFERENCE LOW FREQUENCY(6bit)

| ABSOLUTE VALUE OF INPUT VALUE | OUTPUT VALUE | TOTAL (POSITIVE/NEGATIVE INCLUDED) |
|---|---|---|
| 0 | 0 | 1 |
| 1~3 | SAME AS THE INPUT VALUE | 7 |
| 4~7 | 6 | 9 |
| 8~11 | 10 | 11 |
| 12~15 | 14 | 13 |
| 16~19 | 18 | 15 |
| 20~23 | 22 | 17 |
| 24~27 | 26 | 19 |
| 28~31 | 30 | 21 |
| 32~35 | 34 | 23 |
| 36~39 | 36 | 25 |
| 40~47 | 44 | 27 |
| 48~55 | 52 | 29 |
| 56~63 | 60 | 31 |
| 64~71 | 68 | 33 |
| 72~79 | 76 | 35 |
| 80~87 | 84 | 37 |
| 88~95 | 92 | 39 |
| 96~103 | 100 | 41 |
| 104~111 | 108 | 43 |
| 112~115 | 116 | 45 |
| 116~127 | 120 | 47 |
| 128~143 | 136 | 49 |
| 144~159 | 152 | 51 |
| 160~175 | 168 | 53 |
| 176~191 | 184 | 55 |
| 192~207 | 200 | 57 |
| 208~223 | 216 | 59 |
| 224~239 | 232 | 61 |
| 204~255 | 248 | 63 |

FIG.38

NON-LINEAR QUANTIZATION TABLE
FOR COLOR-DIFFERENCE LOW FREQUENCY(7bit)

| ABSOLUTE VALUE OF INPUT VALUE | OUTPUT VALUE | TOTAL (POSITIVE/ NEGATIVE INCLUDED) | ABSOLUTE VALUE OF INPUT VALUE | OUTPUT VALUE | TOTAL (POSITIVE/ NEGATIVE INCLUDED) |
|---|---|---|---|---|---|
| 0 | 0 | 1 | 105~111 | 108 | 85 |
| 1~20 | SAME AS THE INPUT VALUE | 41 | 112~118 | 115 | 87 |
| 21~23 | 22 | 43 | 119~125 | 122 | 89 |
| 24~27 | 26 | 45 | 126~132 | 129 | 91 |
| 28~31 | 30 | 47 | 133~139 | 136 | 93 |
| 32~35 | 34 | 49 | 140~146 | 143 | 95 |
| 36~39 | 38 | 51 | 147~153 | 150 | 97 |
| 40~43 | 42 | 53 | 154~160 | 157 | 99 |
| 44~47 | 46 | 55 | 161~167 | 164 | 101 |
| 48~51 | 50 | 57 | 168~174 | 171 | 103 |
| 52~55 | 54 | 59 | 175~181 | 178 | 105 |
| 56~59 | 58 | 61 | 182~188 | 185 | 107 |
| 60~63 | 62 | 63 | 189~195 | 192 | 109 |
| 64~67 | 66 | 65 | 196~202 | 199 | 111 |
| 68~71 | 70 | 67 | 203~209 | 206 | 113 |
| 72~75 | 74 | 69 | 210~216 | 213 | 115 |
| 76~79 | 78 | 71 | 217~223 | 220 | 117 |
| 80~83 | 82 | 73 | 224~230 | 227 | 119 |
| 84~87 | 86 | 75 | 231~237 | 234 | 121 |
| 88~91 | 90 | 77 | 238~244 | 241 | 123 |
| 92~95 | 94 | 79 | 245~251 | 248 | 125 |
| 96~99 | 98 | 81 | 252~255 | 255 | 127 |
| 100~104 | 102 | 83 | | | |

CODING APPARATUS, DECODING APPARATUS, CODING METHOD, DECODING METHOD, AMD COMPUTER-READABLE RECORDING MEDIUM FOR EXECUTING THE METHODS

FIELD OF THE INVENTION

The present invention relates to a coding apparatus, a decoding apparatus, a coding method, a decoding method, and a computer-readable recording medium for executing the methods, which are used in any image formation apparatus such as a digital copying machine and a facsimile device.

BACKGROUND OF THE INVENTION

In recent years, there has been an increase in demand for a color image, and a higher resolution has been in progress to response to requests for high quality of images. Under these situations, the demands for compressing a color image in order to save memory has been increasing.

Conventionally, a method for compressing a color image is executed by using a technique of first performing color conversion on an image to separate image information into a lightness signal and color signals, and then performing quantization on the signals so that the color signals are reduced higher than the lightness signal. This technique is executed based on the idea that highly important information is tried to efficiently be preserved by focusing on the information for the lightness signals through color conversion.

For example, FIG. 40 shows a technique in "Coding of color image based on uniform color spaces" (Oshima, Monma, and Kubota) described in No. 24 of the papers prepared for "The 14$^{th}$ National Conference of the Image Electronics Institute in 1986" that was held on Jun. 3 and 4, 1986. In FIG. 40, of the data for a color image subjected to color conversion (RGB→Lab conversion) in an RGB-to-Lab conversion section 101, only color signals a and b that do not give influence over the image quality even when the signals are degraded are subjected to 4-pixel averaging by 2×2-pixel block in color-difference averaging sections 112 and 122. The lightness signal and the color signals of image data are then sub-sampled in a brightness sampling section 103 and a color-difference sampling sections 113, 123, respectively, and are coded in a coding section 134.

The technology described in JP63-9282A is a technique based on the same idea as described above, and the technique is shown in FIG. 41. In FIG. 41, in the data for a color image subjected to color conversion in a color conversion section 202, a lightness signal is orthogonally transformed in a brightness orthogonal transformation section 203 to a DC component and AC components, and both of the DC and AC components are quantized and coded in a quantization/coding section 204. Whereas, referring to the color signals, each typical color (a block average in the embodiment), that represents the information within a block with one color, is computed in color-difference typical color computation sections 213, 223, and only the typical colors are quantized and coded in quantization/coding sections 214 and 224.

Further, the technology described in JP06-245079A is shown in FIG. 42. In FIG. 42, of the data for a color image subjected to color conversion by predetermined block for each color, both a lightness signal and color signals are transformed to DC components and AC components in a brightness DC/AC transformation section 303 and in color-difference DC/AC transformation sections 313 and 323, respectively. The AC components of the lightness signal and the color signals are quantized using a ratio between the amplitudes of the two in quantization/coding sections 304, 314, and 324. Further, the DC components of the color signals are quantized in the quantization/coding sections 314 and 324 using nonlinear quantization in which information with a smaller color difference is quantized more finely.

As explained above, the conventional coding of a color image has been realized, as the basic flow of processing, by allowing information to be biased through color conversion and then allowing the information to be further biased by using a position correlation for each lightness signal and color signals as required.

However, this conventional type of coding has not always been the most appropriate system for the coding of a color image, which has been found wasteful from the viewpoint of a circuit scale. More specifically, there is a problem such that ① color conversion circuit, that may have required its small scale or a small number thereof, increases in number because the position correlation that is more direct as compared to a correlation between colors is not used in the upstream of the processing. There is also a problem such that ② different quantization tables are required for a lightness signal and color signals because color conversion is executed and then quantization is performed on the signals.

SUMMARY OF THE INVENTION

It is an object of this invention to provide a coding apparatus, a decoding apparatus, a coding method, a decoding method, and a computer-readable recording medium that executes the methods, which can simplify the coding circuit and also simplify the processing for quantization by utilizing a position correlation of each component before performing color conversion and then executing color conversion.

According to one aspect of this invention, a first transformation unit transforms the information for each component by using a one-dimensional or two-dimensional position correlation of an image so that bias is generated in the amount of information, a second transformation unit transforms the information transformed by the first transformation unit to obtain a lightness signal and color signals, and a quantization unit performs quantization on the coefficients obtained through transformation by the first transformation unit and/or the second transformation unit.

According to another aspect of this invention, a separation unit separates information for each component into a DC component and AC components by predeter mined block, a transformation unit transforms the AC components separated by the separation unit to a lightness signal and color signals to obtain an AC lightness signal and AC color signals, and a quantization unit performs quantization on the AC lightness signal and/or the AC color signals obtained by the transformation unit.

According to still another aspect of this invention, a separation unit separates information for each component into a DC component and AC components by predetermined block, an AC component quantization unit performs quantization on the AC components separated by the separation unit. A first transformation unit transforms the DC component separated by the separation unit to a lightness signal and color signals to obtain a DC lightness signal and DC color signals, and a second transformation unit transforms the AC components quantized by the first quantization unit to a lightness signal and color signals to obtain an AC lightness signal and AC color signals. A quantization unit performs quantization on the AC lightness signal and/or the AC color signals transformed by the second transformation unit.

According to still another aspect of this invention, a separation unit separates information for each component into a DC component and AC components by predetermined block, a transformation unit transforms the DC component separated by the separation unit to a lightness signal and color signals to obtain a DC lightness signal and DC color signals, and a quantization unit performs quantization on the AC component separated by the separation unit.

Further, when an AC lightness signal and/or AC color signals are quantized, the quantization unit performs vector quantization on the signals.

Further, when an AC lightness signal and AC color signals are quantized, the quantization unit performs quantization on the ratio between the AC lightness signal and the AC color signal.

Further, the quantization unit performs vector quantization on a specific color that has an edge with the largest value of the AC components, and performs, for the other colors, quantization on the ratio between each AC component of the other colors and the vector of the specific color.

Further, the quantization unit sets a threshold value to a value larger than the median of quantized values when vector quantization is performed.

Further, the AC component quantization unit performs quantization by cutting off a low-order bit of one coefficient or all coefficients of the AC component.

Further, the AC component quantization unit deletes any coefficient corresponding to a slant edge of an image.

Further, the separation unit performs transformation by referring to only pixels within a predetermined block as a unit to be transformed.

Further, the separation unit performs Haar wavelet transform.

According to still another aspect of this invention, a transformation unit performs BTC-transformation on the information for each component by predetermined block, a color conversion unit subjects the BTC-transformed information to color conversion, and a quantization unit performs quantization on the information color-converted by the color conversion unit.

According to still another aspect of this invention, a first transformation unit transforms the information for each component by using a one-dimensional or two-dimensional position correlation of an image in each predetermined block so that bias is generated in the amount of information, and a second transformation unit transforms the information transformed by the first transformation unit to obtain a lightness signal and color signals. A region determination unit determines any region of the image by predetermined block, and a quantization unit performs different quantization for each region on the coefficient obtained through transformation by the first transformation unit and/or the second transformation unit based on the result of determination in the region determination unit. A flag information creation unit then creates flag information to identify the region determined by the region determination unit.

According to still another aspect of this invention, a separation unit separates information for each component into a DC component and AC components by predetermined block, a first quantization unit performs quantization on the AC components separated by the separation unit, and a transformation unit transforms the AC components quantized by the first quantization unit to a lightness signal and color signals to obtain an AC lightness signal and AC color signals. A region determination unit determines which region of a plurality of regions the predetermined block belongs to based on the magnitude of at least one amplitude of the AC component, the AC lightness signal, and the AC color signals for each of the predetermined blocks. A second quantization unit performs different quantization for each region on the AC lightness signal and/or the AC color signals based on the result of determination in the region determination unit, and a flag information creation unit then creates flag information to identify the region determined by the region determination unit.

Further, the second quantization unit performs quantization on the AC component, or the AC lightness signal and/or the AC color signals more roughly in the region whose amplitude is smaller.

Further, the region determination unit determines an edge region and a non-edge region.

Further, the region determination unit determines regions in n-levels (n: integer of 3 or more).

Further, the flag information may be bits dedicated to a flag, or may be formed together with a code that represents a coefficient value.

Further, a fixed-length code is generated as code information.

According to still another aspect of this invention, an inverse quantization unit performs inverse quantization on code information to restore an AC lightness signal, AC color signals, a DC lightness signal, and DC color signals. A first inverse color conversion unit performs inverse color conversion on the AC lightness signal and the AC color signals to restore an AC signal, and a second inverse color conversion unit performs inverse color conversion on the DC lightness signal and the DC color signals to restore a DC signal. An AC inverse quantization unit performs inverse quantization on the AC signal restored in the first inverse color conversion unit, and a position-correlation inverse transformation unit performs inverse transformation of position correlation on the DC signal restored in the second inverse color conversion unit and the AC signal inverse-quantized in the AC inverse quantization unit to restore each component of a color image.

According to still another aspect of this invention, an inverse quantization unit performs inverse quantization on code information to restore an AC lightness signal, AC color signals, and a DC signal, and a first inverse color conversion unit performs inverse color conversion on the AC lightness signal and the AC color signals to restore an AC signal. An AC inverse quantization unit performs inverse quantization on the AC signal restored in the first inverse color conversion unit, and a position-correlation inverse transformation unit performs inverse transformation of position correlation on the DC signal and the AC signal inverse-quantized in the AC inverse quantization unit to restore each component of a color image.

According to still another aspect of this invention, an inverse quantization unit performs inverse quantization on code information, an inverse color conversion unit performs inverse color conversion on the information inverse-quantized in the inverse quantization unit, and an inverse BTC unit performs inverse BTC-transformation on the information inverse-color-converted in the inverse color conversion unit to restore each component of a color image.

According to still another aspect of this invention, a region determination unit determines any region to which code information belongs from flag information, and an inverse quantization unit performs different inverse quantization for each region on the code information for the predetermined block based on the result of determination in the region determination unit to restore a DC lightness signal, DC color signals, an AC lightness signal, and AC color signals. A first inverse color conversion unit performs inverse color conversion on the AC lightness signal and the AC color signals to restore an AC signal, and a second inverse color conversion unit performs inverse color conversion on the DC lightness signal and the DC color signals to restore a DC signal. An AC inverse quantization unit performs inverse quantization on the AC signal restored in the first inverse color conversion unit, and a position-correlation inverse transformation unit performs inverse transformation of position correlation on the DC signal restored in the second inverse color conversion unit and the AC signal inverse-quantized in the AC inverse quantization unit to restore each component of a color image.

According to still another aspect of this invention, a region determination unit determines any region to which code information belongs from flag information, and an inverse quantization unit performs different inverse quantization for each region on the code information for the predetermined block based on the result of determination in the region determination unit to restore a DC lightness signal, DC color signals, an AC lightness signal, and AC color signals. A first inverse color conversion unit performs inverse color conversion on the AC lightness signal and the AC color signals to restore an AC signal, and a position-correlation inverse transformation unit performs inverse transformation of position correlation on the DC signal restored in the inverse quantization unit and the AC signal restored in the first inverse color conversion unit to restore each component of a color image.

Further, the inverse quantization unit uses a median value when a DC lightness signal is to be restored.

According to still another aspect of this invention, the information for each component is transformed by using a one-dimensional or two-dimensional position correlation of an image so that bias is generated in the amount of information, the transformed information is further transformed to obtain a lightness signal and color signals, and the obtained coefficients are quantized.

According to still another aspect of this invention, the information for each component is separated into a DC component and AC components by predetermined block, the separated AC components are transformed to a lightness signal and color signals to obtain an AC lightness signal and AC color signals, and the AC lightness signal and/or the AC color signals are quantized.

According to still another aspect of this invention, the information for each component is separated into a DC component and AC components by predetermined block, the separated AC components are quantized, and the separated DC component is transformed to a lightness signal and color signals to obtain a DC lightness signal and DC color signals. The quantized AC components are transformed to a lightness signal and color signals to obtain an AC lightness signal and AC color signals, and the transformed AC lightness signal and/or the AC color signals are further quantized.

According to still another aspect of this invention, the information for each component is separated into a DC component and AC components by predetermined block, the separated DC component is transformed to a lightness signal and color signals to obtain a DC lightness signal and DC color signals, and the separated AC signal is quantized.

According to still another aspect of this invention, the information for each component is BTC-transformed in each predetermined block, the BTC-transformed information is color-converted, and the color-converted information is quantized.

According to still another aspect of this invention, the information for each component is transformed by using a one-dimensional or two-dimensional position correlation of an image in each predetermined block so that bias is generated in the amount of information, the transformed information is further transformed to obtain a lightness signal and color signals, any region of the image is determined in each of the predetermined blocks. Different quantization for each region is performed on the coefficients obtained through transformation based on the result of determination on the region, and flag information to identify the determined region is created.

According to still another aspect of this invention, the information for each component is separated into a DC component and AC components by predetermined block, the separated AC components are quantized, and the quantized AC components are transformed to a lightness signal and color signals to obtain an AC lightness signal and AC color signals. It is determined which region of a plurality of regions the predetermined block belongs to based on the magnitude of at least one amplitude of the AC component, the AC lightness signal, and the AC color signals in each of the predetermined blocks. Different quantization for each region is performed on the AC lightness signal and/or the AC color signals based on the result of determination on the region, and flag information to identify the determined region is created.

According to still another aspect of this invention, code information is inversely quantized to restore an AC lightness signal, AC color signals, a DC lightness signal, and DC color signals. Inverse color conversion is performed on the AC lightness signal and the AC color signals to restore an AC signal, and inverse color conversion is performed on the DC lightness signal and the DC color signals to restore a DC signal. Inverse quantization is performed on the restored AC signal, and inverse transformation of position correlation is performed on the restored DC signal and the inverse-quantized AC signal to restore each component of a color image.

According to still another aspect of this invention, code information is inversely quantized to restore an AC lightness signal, AC color signals, a DC lightness signal, and a DC color signal. Inverse color conversion is performed on the AC lightness signal and the AC color signals to restore an AC signal, and the restored AC signal is inversely quantized. Inverse transformation of position correlation is performed on the restored DC signal and the inverse-quantized AC signal to restore each component of a color image.

According to still another aspect of this invention, code information is inversely quantized, inverse color conversion is performed on the inverse-quantized information, and inverse BTC-transformation is performed on the information inverse-color-converted to restore each component of a color image.

According to still another aspect of this invention, any region to which code information belongs is determined from flag information, and different inverse quantization for each region is performed on the code information for the predetermined block based on the result of determination on the region to restore a DC lightness signal, DC color signals, an AC lightness signal, and AC color signals. Inverse color conversion is performed on the AC lightness signal and the AC color signals to restore an AC signal, and inverse color conversion is performed on the DC lightness signal and the DC color signals to restore a DC signal. The restored AC signal is inversely quantized, and inverse transformation of position correlation is performed on the inverse-quantized AC signal and the restored DC signal to restore each component of a color image.

According to still another aspect of this invention, any region to which code information belongs is determined from flag information, and different inverse quantization for each region is performed on the code information for the predetermined block based on the result of determination on the region to generate a DC signal, an AC lightness signal, and AC color signals. Inverse color conversion is performed on the AC lightness signal and the AC color signals to restore an AC signal, the restored AC signal is inversely quantized, and inverse transformation of position correlation is performed on the restored DC signal and the inverse-quantized AC signal to restore each component of a color image.

According to still another aspect of this invention, the program recorded in a recording medium is executed by a computer to realize the steps of the above explained invention.

Other objects and features of this invention will become understood from the following description with reference to the accompanying drawings.

BRIEF DESCRIPTION OF THE DRAWINGS

FIG. 3A, FIG. 3B, and FIG. 3C show two-dimensional Haar transform in which the transformation is executed by 2×2-pixel block;

FIG. 4 shows equations of Haar transform;

FIG. 5 shows equations of color conversion;

FIG. 6 shows an example of a vector-quantization table;

FIG. 24 shows an example of a vector table;

FIG. 25 shows fixed-length codes obtained in the fifth embodiment;

FIG. 27A, FIG. 27B, and FIG. 27C show how to determine regions in multiple steps;

FIG. 28 shows examples of the fixed-length code;

FIG. 29A and FIG. 29B show examples of the vector table for an edge region and a smaller-value edge region;

FIG. 36 shows an example of a non-linearly quantization table (5 bits) of color-difference low frequencies;

FIG. 37 shows an example of a non-linearly quantization table (6 bits) of color-difference low frequencies;

FIG. 38 shows an example of a non-linearly quantization table (7 bits) of color-difference low frequencies;

DESCRIPTION OF THE PREFERRED EMBODIMENTS

Preferred embodiments of the present invention are explained in detail below with reference to FIG. 1 to FIG. 39.

In this specification, the expression of "transformation of a signal to a lightness signal and color signals" is simply expressed as "color conversion". Therefore, in addition to the case where RGB colors are transformed, the case of transforming a coefficient of frequency transformation in "the same manner as that of the case where separation is performed into a lightness signal and color signals" is also expressed as "color conversion". Any circuit that performs such conversion is called "color conversion section" or "color conversion circuit". That is because conversion for an achromatic color is in common with ordinary color conversion at the point in that any signal corresponding to a color signal becomes zero.

Further, in this specification, the term of "quantization" refers to means, in a broad sense, for reducing information. For example, in addition to any means based on a simple bit reduction or for reducing the number of bits through transformation with a table, the case where all the information is abandoned is also described "quantization". Further, in this specification, HL, LH, and HH may be described "H" as their generic name. For example, "YH" is a generic name for YHL, YLH, and YHH.

Figure 1:
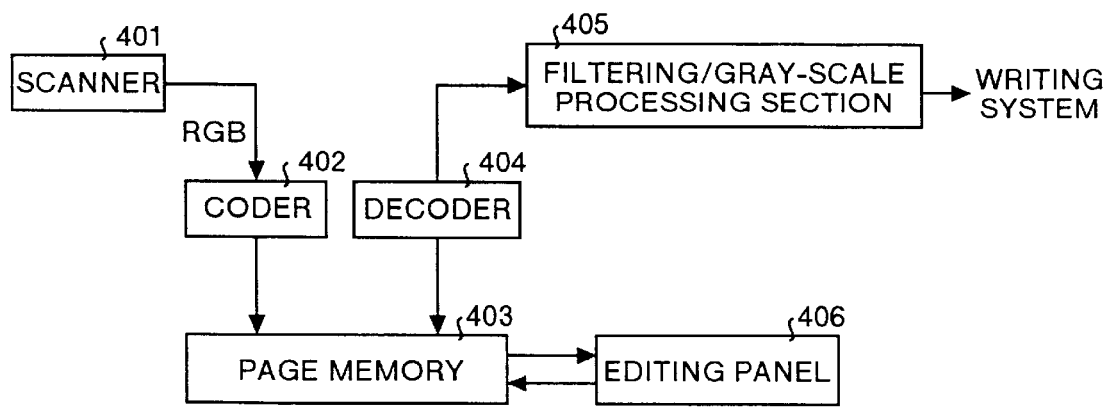
FIG. 1 is a block diagram showing a signal processing system of a digital color copying machine according to embodiments of the present invention.

FIG. 1 is a block diagram showing a configuration of a signal processing system of a digital color copying machine according to the embodiments. The cases where color image data read from a scanner is coded and where the coded information is decoded are explained below.

The digital color copying machine shown in FIG. 1 comprises a scanner 401 that reads color image data (R, G, B) on a document, a coder 402 that codes (compresses) the color image data (R, G, B) input from the scanner 401, and a page memory 403 that stores the compression code (code information) coded in the coder 402. The digital color copying machine also comprises a decoder 404 that decodes the coded compression code (code information) stored in the page memory 403, and a filtering/gray-scale processing section 405 that subjects the color image data decoded in the decoder 404 to filtering, color conversion (RGB→CMYK transformation), and gray-scale processing, or the like, and outputs the processed data to a writing system.

Operation of the signal processing system of the digital copying machine is explained below. The image data consisting of components for three colors of RGB read through the scanner 401 is coded (compressed) in the coder 402 and stored in the page memory 403. In the embodiments of the present invention, a fixed-length coding system with which it is easy to access the memory is employed as an image coding method for convenience in rotation and edit of an image. The component here refers to each color component such as RGB or CMYK forming a color image. The image data in the page memory is read onto an editing panel 406 as required and edited. When the data is to be written (an image is formed), the compression code (code information) compressed in the coder 402 and stored in the page memory 403 is read from the page memory 403 by a 2×2 image block. The read code information is decoded in the decoder 404, subjected to filtering, RGB-to-CMYK transformation, and gray-scale processing, and then transferred to the writing system.

A first embodiment to a sixth embodiment of the coder 402 and the decoder 404 in FIG. 1 are explained in detail below.

First Embodiment

Figure 2:
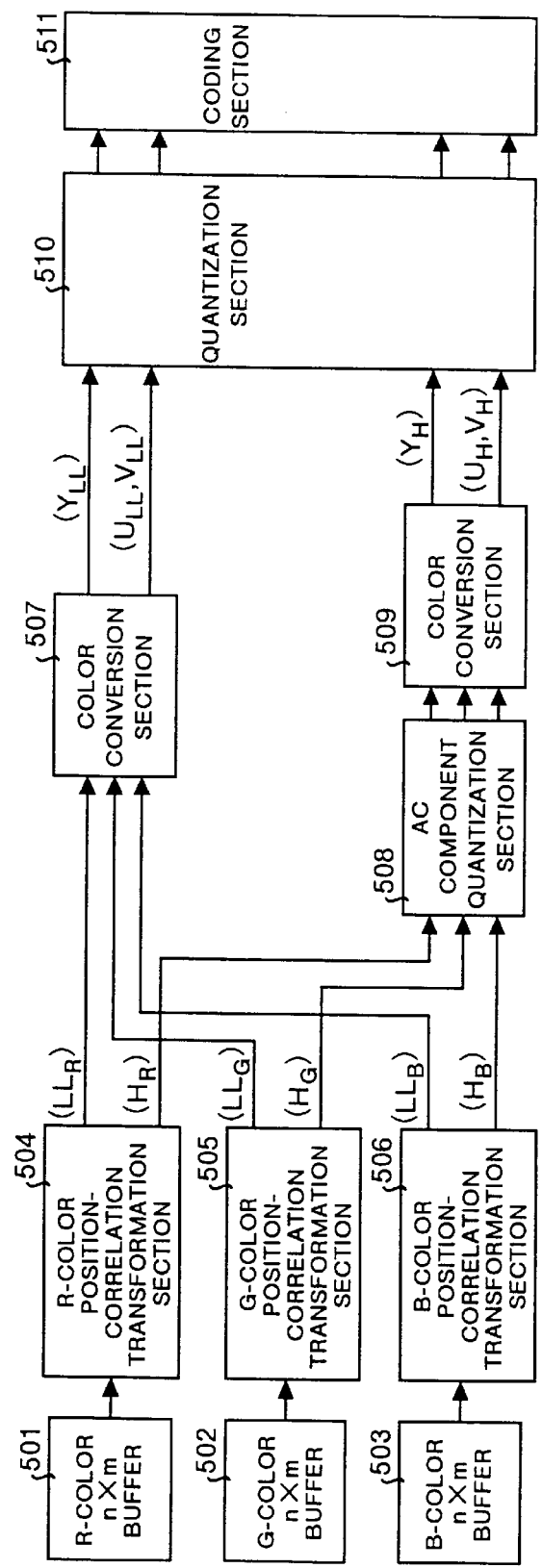
FIG. 2 is a block diagram showing a coder of a first embodiment.

FIG. 2 is a block diagram showing a first embodiment of the coder 402. The coder 402 shown in FIG. 2 comprises R-, G-, B-color n×m buffers 501, 502, and 503 which temporarily store image data, consisting of components in R, G, B colors (e.g., 1 pixel consists of 8 bits for each color), that is input from the scanner 401 by n×m unit (e.g., by 2×2 pixel block). The coder 402 further comprises R-color, G-color, and B-color position-correlation transformation sections 504, 505, and 506 each of which performs transformation using a position correlation (henceforth, position-correlation transformation) on each component (RGB) stored in the R-, G-, B-color n×m buffers 501, 502, and 503 to separate the component into a DC component and AC components for each color, outputs the DC component to a color conversion section 507, and also outputs the AC components to an AC component quantization section 508. The coder 402 also comprises the color conversion section 507 that performs color conversion (separation of lightness from color) on the DC components of the components input from the R-color, G-color, and B-color position-correlation transformation sections 504, 505, and 506 to generate a DC lightness signal and DC color signals, and outputs the generated signals to a quantization section 510.

Further, the coder 402 shown in FIG. 2 comprises the AC component quantization section 508 that performs quantization in a first step on the AC component of each component input from the R-color, G-color, and B-color position-correlation transformation sections 504, 505, and 506, and outputs the quantized values to a color conversion section 509. The coder 402 further comprises the color conversion section 509 that performs color conversion (separation of lightness from color) on the AC components for each component, quantized in the first step, input from the AC component quantization section 508 to generate an AC lightness signal and AC color signals, and outputs the generated signals to the quantization section 510. The coder 402 further comprises the quantization section 510 that performs quantization on the DC lightness signal and the DC color signals input from the color conversion section 507, performs quantization in the second step on the AC lightness signal and AC color signals input from the color conversion section 509, and outputs the quantized values to a coding section 511. The coder 402 also comprises the coding section 511 that creates a fixed-length code for information (a unit of 2×2-pixel block) quantized in the quantization section 510, and stores the code in the page memory 403.

The coding method of the coder 402 in FIG. 2 is explained below. In FIG. 2, the image data consisting of components in R, G, B colors (e.g., units of 2×2-pixel block, 1 pixel consists of 8 bits for each color), that is read from the scanner 401 is input into the R-, G-, B-color n×m buffers 501, 502, and 503 for temporary storage.

The R-color, G-color, and B-color position-correlation transformation sections 504, 505, and 506 perform transformation of position correlation on the components (RGB) stored in the R-, G-, B-color n×m buffers 501, 502, and 503, separate the components into DC components LLR, LLG, and LLB and AC components HR, HG, and HB in each color. The DC components LLR, LLG, and LLB are output to the color conversion section 507, whereas the AC components HR, HG, and HB are output to the AC component quantization section 508.

As position-correlation transformation, Haar wavelet transform (henceforth, Haar transform) as a type of wavelet transform can be used on two dimensions. The two-dimensional Haar transform is explained more specifically. In the two-dimensional Haar transform, transformation is executed in units of 2×2-pixel block. FIG. 3 shows an example of a 2×2-pixel block (R, G, B). In this embodiment, as shown in FIG. 3, a pixel block is cut out for each RGB, and the Haar transform as shown in the equations in FIG. 4 is executed in each of the RGB colors. As a result of Haar transform, the image information for a 2×2-pixel block is transformed to four coefficients of LL, HL, LH, and HH. Of the coefficients, the coefficient LL is a DC component, whereas the coefficients HL, LH, and HH are AC components.

In this embodiment, as a position-correlation transformation (means for separating a DC component from an AC component), the case of utilizing the Haar transform has been explained, but the present invention is not limited by this transform. As position-correlation transformation, orthogonal transformation such as DCT, slant transform, Hadamard transform, and subband transform as a generic name of frequency transformations are applicable. Further, block coding executed by utilizing the feature such that a tonal change in image density is locally moderate, or the like are also applicable.

However, in such a usage pattern that code information is stored in memory (page memory 403) inside a digital color copying machine and a plurality times of access are made like in this embodiment, transformation executed by referring to information in any adjacent pixel blocks, what is called overlap transform is not preferable. Namely, when a plurality copies of image are formed by accessing a plurality times to the code information stored in the memory and if the fixed-length code created through overlap transform is used, transfer efficiency inside the apparatus is reduced to one-tenths because accesses have to be made also to codes required for reference other than the code as an object for decoding. If a large number of buffer memories are provided in order to avoid the above problem, the number of accessing is reduced, thus the transfer efficiency is improved, but memory costs increase instead. According to the circumstances, it is desirable to use any other transform except overlap transform. A transform unit not to overlap includes discrete cosine transform (DCT) and Haar wavelet transform, or the like. The Haar wavelet transform is the most preferable because of its ease of transformation.

The AC component quantization section 508 subjects the AC components HR, HG, and HB of the input components to quantization in the first step to output the quantized values to the color conversion section 509. In the processing of quantization in the first step of the AC component quantization unit 508, HH of the AC components HL, LH, and HH is cut off. The HH coefficient is a coefficient corresponding to a slant edge of an image. This coefficient is of the least visual importance of the Haar coefficients. Therefore, even if this coefficient is cut off, degradation in image quality is not so noticeable.

The color conversion section 509 performs color conversion (separation of lightness from color) on the AC components of each component, quantized in the first step, input from the AC component quantization section 508, and generates an AC lightness signal YH and AC color signals UH, VH to output the signals to the quantization section 510. The color conversion section 507 performs color conversion (separation of lightness from color) on the DC components LLR, LLG, and LLB of the components input from the R-color, G-color, and B-color position-correlation transformation sections 504, 505, and 506, and generates a DC lightness signal YLL and DC color signals ULL, VLL to output the signals to the quantization section 510.

In the color conversion executed in the color conversion sections 507 and 509, YUV transform is executed using the equations shown in FIG. 5. In FIG. 5, of the obtained coefficients, Yz is an "AC lightness signal", and Uz and Vz are "AC color signals". The color conversion according to the present invention is not limited by these conversion, but the same effect can be obtained by using some other transformation such as Lab, YIQ, and YCrCb. These types of transformation are executed generally to RGB color signals. As a result, the transformation is such that a color signal becomes zero in an achromatic image. When the same equations of transformation as explained above are applied to each of the AC components in RGB colors, for example, the values corresponding to the color signals also become zero in the achromatic image. Based on these circumstances, not only the case where these types of transformation are performed on RGB signals, but also the case where these types of transformation are executed to components in general of an image such as AC components and a DC component is also described "transformed to a lightness signal and color signals" in this specification.

The quantization section 510 performs quantization on the DC lightness signal YLL and the DC color signals ULL, VLL input from the color conversion section 507. The quantization section 510 also performs quantization in the second step on the AC lightness signal YH and AC color signals UH, VH input from the color conversion section 509, and outputs the quantized values to the coding section 511.

① In regard to quantization performed on the "DC lightness signal" YLL and the "DC color signals" ULL and VLL, linear quantization is performed on the "DC lightness signal" YLL by dropping bits so as to be 5 bits. Whereas quantization is performed on the "DC color signals" ULL and VLL through non-linear quantization so as to be 5 bits. It is assumed here that the non-linear quantization is realized by performing fine quantization on any part in which the absolute values of the "DC color signals" ULL and VLL are small, and performing rough quantization on any part in which the absolute values are large. The reason that such non-linear quantization is performed is because information for the "DC color signals" ULL, VLL is centered on the region close to zero through color conversion and a color tone is largely affected by the fact that the values around zero slightly change. Therefore, if the region close to zero is not finely quantized, degradation in image quality becomes quite recognizable. FIG. 36 to FIG. 38 show examples of the non-linear quantization table when non-linear-quantization is performed on the "DC color signals" ULL and VLL.

② It is assumed that vector quantization is performed on Yz (z=HL, LH, HH) as an "AC lightness signal", and that Uz and Vz as "AC color signals" are vector-quantized and then the ratio between each of the vectors and the vector of Yz is coded.

The vector quantization of Yz (z=HL, LH, HH) as an "AC lightness signal" is explained in detail below. A vector YH=(YHL, YLH) consisting of "AC lightness signals" is first created (YHH is always zero because HH is cut off in the AC component quantization section 508 in this embodiment), and then the vector YH=(YHL, YLH) consisting of the "AC lightness signals" is vector-quantized according to the quantization table in FIG. 6. The quantization table shown in FIG. 6 shows the case where vector quantization is executed thereon to be 13 values 4 bits.

Figure 7A:
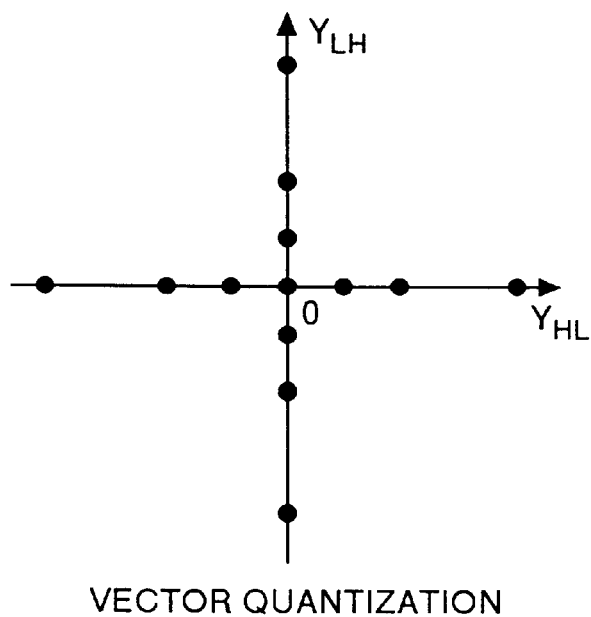
FIG. 7A and FIG. 7B show a comparison between vector quantization and scal or quantization.
Figure 7B:
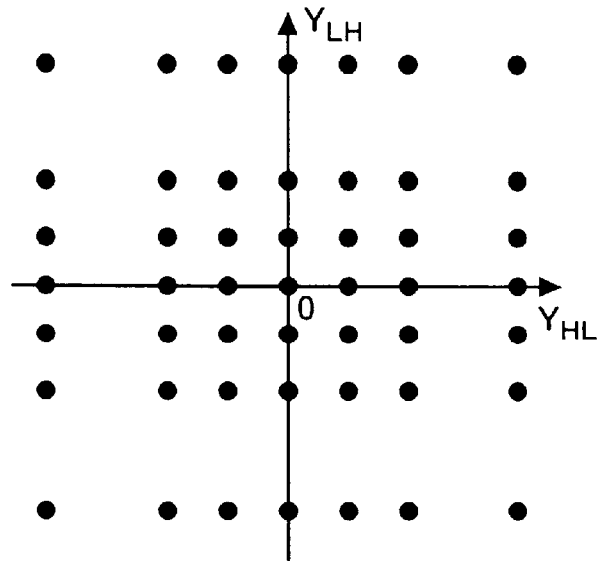

The merits of performing vector quantization are that coding efficiency is much more significant as compared to the case where scalor quantization is performed on each AC component. For example, when a vertical edge and a horizontal edge that are important for image quality are required to be preserved without their degradation, and in the case of the vector quantization, necessary edges can be preserved with 13 values 4 bits as shown in FIG. 7A, whereas in the case of scalor quantization, as shown in FIG. 7B, information with 49 values 6 bits is required for the edges. Further, these 49 values include also vectors (e.g., both YHL and YLH have also large values such as (YHL, YLH)=(64, 64)) that are very low frequency of occurrence, thus coding efficiency is decreased. It is assumed that the vector quantization is performed by computing distances between all the vectors and the vector YH, and selecting any vector that has the shortest distance.

When a high frequency component is to be vector-quantized, selection of any vector, so that the length of the vector becomes shorter as compared to the length before quantization, makes Moire at a dots section (cyclic degradation on patterns) hardly occur. For example, when candidates for quantized values with respect to a vector of (44, 0, 0) are (48, 0, 0) and (32, 0, 0), it is better to select the quantized values (32, 0, 0) so that Moire at a dots section does not occur even if the values (48, 0, 0) show a shorter distance to the vector. Therefore, if any thought is given to Moiré at a dots section, a threshold value for quantization may also be set to any value larger than the median point of quantized values.

The vector quantization of Uz and Vz as "AC color signals" is explained below. When Uz and Vz as "AC color signals" are to be vector-quantized, a ratio with the vector of Yz is coded as explained above. This is a quantizing method that utilizes the fact that structures of the "AC lightness signal" and the "AC color signal" are similar to each other within the same block.

Figure 8:
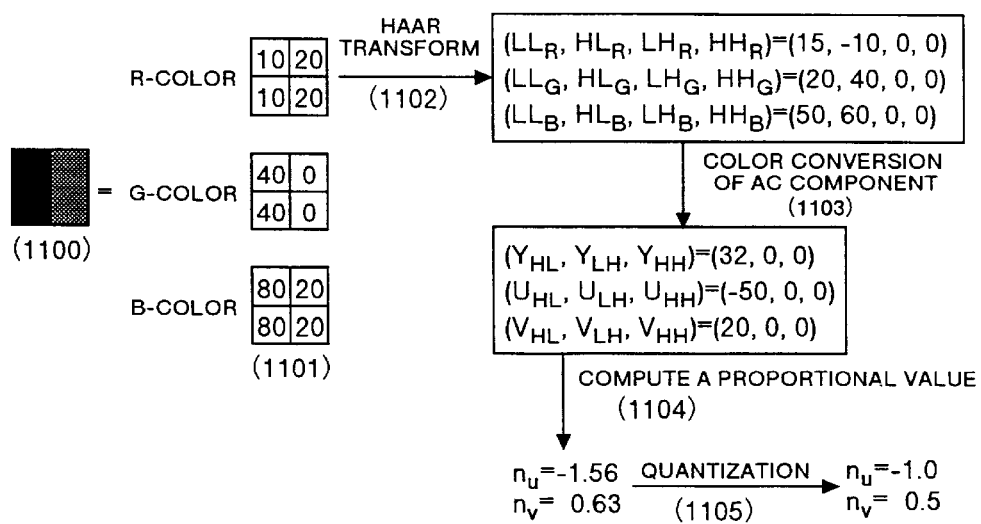
FIG. 8 shows an concept of quantization performed on a ratio between a vector of an AC lightness signal and a vector of each AC color signal.

The vector quantization of Uz and Vz as "AC color signals" is explained with reference to FIG. 8. FIG. 8 shows how to perform vector quantization on Uz and Vz as "AC color signals".

When there is a vertical boundary between different two colors in a block as shown in (1100) of FIG. 8, information (1101) for each of RGB colors is subjected to Haar transform (1102) and AC components are subjected to color conversion (1103). It is then found that the vector of "AC lightness signal" and each of the vectors of "AC color signals" are in a proportional relationship. That is, YH=nu×UH, and YH=nv×VH. Wherein YH, UH, and VH are vectors, YH=(YHL, YLH), UH=(UHL, ULH), and VH=(VHL, VLH), and nu and nv: a constant. Although the two vectors corresponding to each vector are shown as a two-dimensional vector because the HH component is 0 in this embodiment, but are originally shown as a three-dimensional vector such as YH=(YHL, YLH, YHH).

By quantizing these proportional constants nu and nv (1105), efficient quantization can be performed. This proportional relationship between vectors always holds on condition that the number of different colors within a block is two colors or less. Further, it is rare that three or more colors exist together within such a small block as a 2×2-pixel block, therefore, this is an effective method of quantization. However, there are many cases where a complete proportional relationship does not hold in actual cases because of occurrence of slight variations in the colors due to scanning fluctuations, or the like. To solve the problem in this embodiment, the ratio is coded as follows.

That is, ① Firstly, YH is vector-quantized. ② An angle θ formed with YH and UH is computed through inner product computation. ③ When θ is closer to 0 degree rather than to the threshold value, or when it is close to 180 degrees, it is regarded that YH and UH are proportional to each other. Whereas, when θ is close to 0 degree, |YH|/|UH| is decided as a proportional value nu, and so is –|YH|/|UH| when θ is close to 180 degrees. For instance, |YH| represents the length of YH=(YHL, YLH) as a vector, and |YH|=√(YHL*YHL+YLH*YLH). Further, an appropriate threshold value is different depending on the precision of a machine and these two vectors are hard to be regarded as being proportional to each other in a machine having large scanning fluctuations. Therefore, the threshold value is required to be set to a larger value. ④ When θ is any value that is not regarded as that YH and UH are proportional to each other, coding is carried out with a proportional coefficient as 0. ⑤ Lastly, the proportional coefficient is quantized according to the table in FIG. 9. ⑥ The same processing is executed to V. ⑦ From FIG. 9, the proportional coefficients are managed in 5 values each for U and V, total: 25 values 5 bits.

Figures 9, 10:
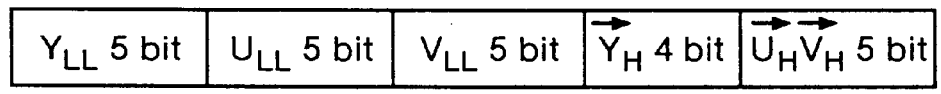
FIG. 9 shows an example of quantized values of the ratio.
FIG. 10 shows an example of a fixed-length code obtained in the first embodiment.

The coding section 511 puts together the information (units of 2×2 pixels) quantized in the quantization section 510 to create a fixed-length code, and stores the codes in the page memory 403. FIG. 10 shows a format example of a fixed-length code. As shown in FIG. 10, as a result of quantization executed in the quantization/coding sections 505 and 515, each of the "DC lightness signal" YLL and the "DC color signals" ULL, VLL is put together to 5 bits, respectively, YH to 4 bits, and UH and VH to 5 bits. By summing these bits, a 24-bit fixed-length code can be obtained. The image before compression is composed of 96 bits through 4 pixels×3 colors×8 bits, thus, the compression with a compression factor of ¼ can be achieved in this embodiment.

As explained above, according to the coder of the first embodiment, a position correlation is transformed for each of the components (e.g., 1 pixel consists of 8 bits for each color) in R, G, B colors of image data, and then color conversion is carried out in the color conversion section. Thus, a coding circuit can be simplified and quantization processing can also be simplified.

Further, according to the coder of the first embodiment, Haar transform is employed as transformation of position correlation, thus the transformation of position correlation becomes possible with a simple configuration. The AC component quantization section 508 deletes any coefficient (HH coefficient) corresponding to a slant edge of an image. Therefore, such an effect that cutting off this coefficient does not much give influence over degradation in image quality since this coefficient is one with the least visual importance of the coefficients used in the Haar transform.

The effect due to the coder 402 of the first embodiment is explained below more specifically as compared to that of the conventional art. In the coder 402 of the first embodiment, as compared to that of the conventional art, there exist merits that a high degree of bias in information is generated in the upstream side of the processing. Namely, the position correlation of the image is generally more direct as compared to a correlation between colors of each component. Therefore, by performing transformation using the position correlation in the upstream side of the processing, various types of quantization become possible at that point of time.

Figure 11A:
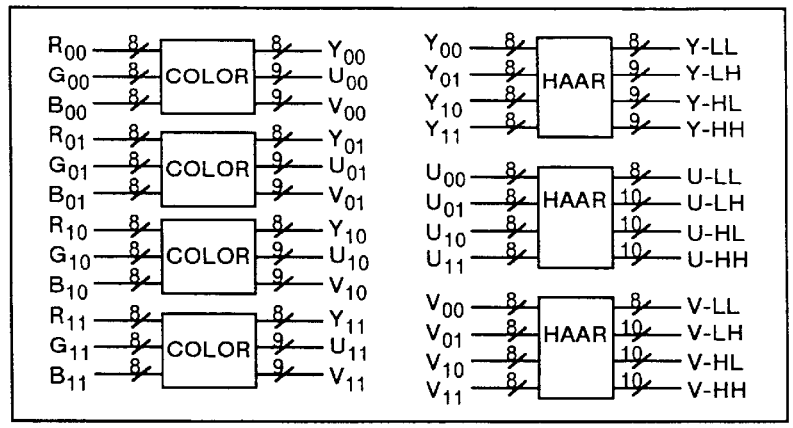
FIG. 11A, FIG. 11B, and FIG. 11C show a comparison between the conventional circuit scale and the circuit scale according to this embodiment.
Figure 11B:
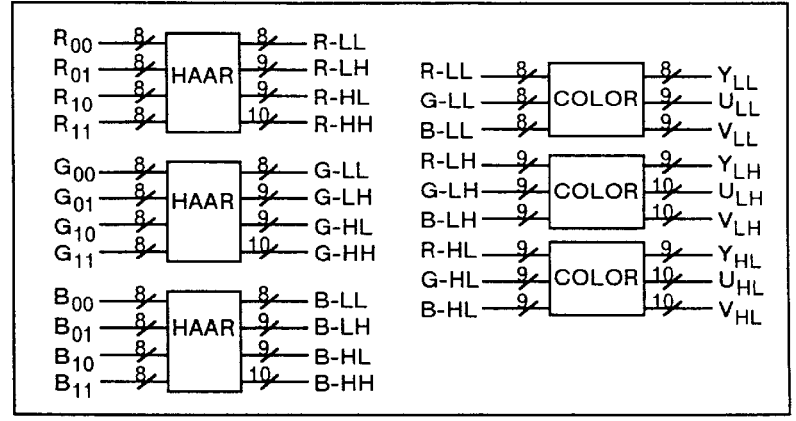

More specifically, the AC component quantization section 508 in FIG. 2 first performs quantization on the coefficient HH. Therefore, by performing the equalization in the first step, a color conversion circuit for the coefficient HH can be removed. FIG. 11A shows a necessary number of color conversion circuits and Haar transform circuits for the conventional method. With regard to the color conversion circuit, four circuits for 2×2 pixels are required, whereas, with regard to the Haar transform circuit, three circuits for YUV are required. In contrast, FIG. 11B shows the number of the circuits according to this embodiment. Since the coefficient HH is cut off by means of quantization, the need for color conversion for the coefficient HH is eliminated, thus, one of the color conversion circuits can be reduced.

Figure 11C:
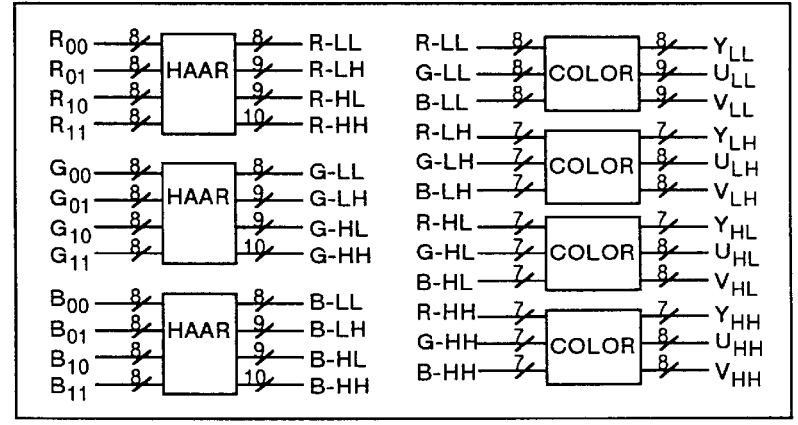

Referring to the quantization in the AC component quantization section 508, as explained above, not by cutting off all of one coefficient, but even by cutting offlow-order bits of the coefficient, the number of bits that a color conversion circuit handles can be reduced, which allows processing efficiency to be enhanced. For example, the coefficients HL, LH, and HH have originally 9 bits, 9 bits, and 10 bits, respectively. The low-order bits of these coefficients are reduced by 2 bits for the coefficients HL and LH, whereas, by 3 bits for the coefficient HH, and then color conversion is performed. The number of bits that each of the color conversion circuits handles is only 7 bits, 7 bits, and 7 bits, respectively. The necessary number of the color conversion circuits and the Haar transform circuits in this case is shown in FIG. 11C.

As compared to this, the conventional method, for example, the method disclosed in JP06-245070A has the steps of executing color conversion and separating a lightness signal and color signals into a DC component and AC components. In this method, the component of a color signal with a smaller absolute value has visually more important meanings. Therefore, by deleting the low-order bits, there may occur such inconvenience that a light-colored background disappears. Thus, quantization can not be performed before color conversion is carried out. When each of the color signals U and V has a value of 3, for example, by performing Haar transform on these signals after having been 2-bit-quantized, a subtle color tone disappears at the time of the quantization. In order to prevent this inconvenience, it may be thought that non-linear quantization is used for the coefficients U and V based on the conventional method. In this case, however, a coefficient for Haar transform to be obtained in the downstream side becomes sensitive to quantization. Therefore, even a little amount of quantization may cause significant degradation in image quality. As a result, the above method is inefficient.

In general, the DC component of color signals may be preserved in order to prevent degradation in a color tone. In this embodiment, accurate color conversion is carried out on the DC component so that the color tones can be preserved, while a certain amount of quantization is performed on the AC components and then color conversion is carried out, thus, the circuit scale can be reduced.

As explained above, in this embodiment, such an effect that the circuit scale can be reduced can be obtained without decreasing in coding efficiency as compared to the conventional method. The expression of "without decreasing in coding efficiency as compared to the conventional method" means that the same level of localization effects of information as that of the conventional method can be obtained by utilizing both of the position correlation and the color correlation. Especially, in the case of this embodiment, both the Haar transform and the color conversion are linear transformation. Therefore, the values of transformation coefficients are totally the same no matter which transformation of the two may be first performed unless quantization is considered.

Figure 12:
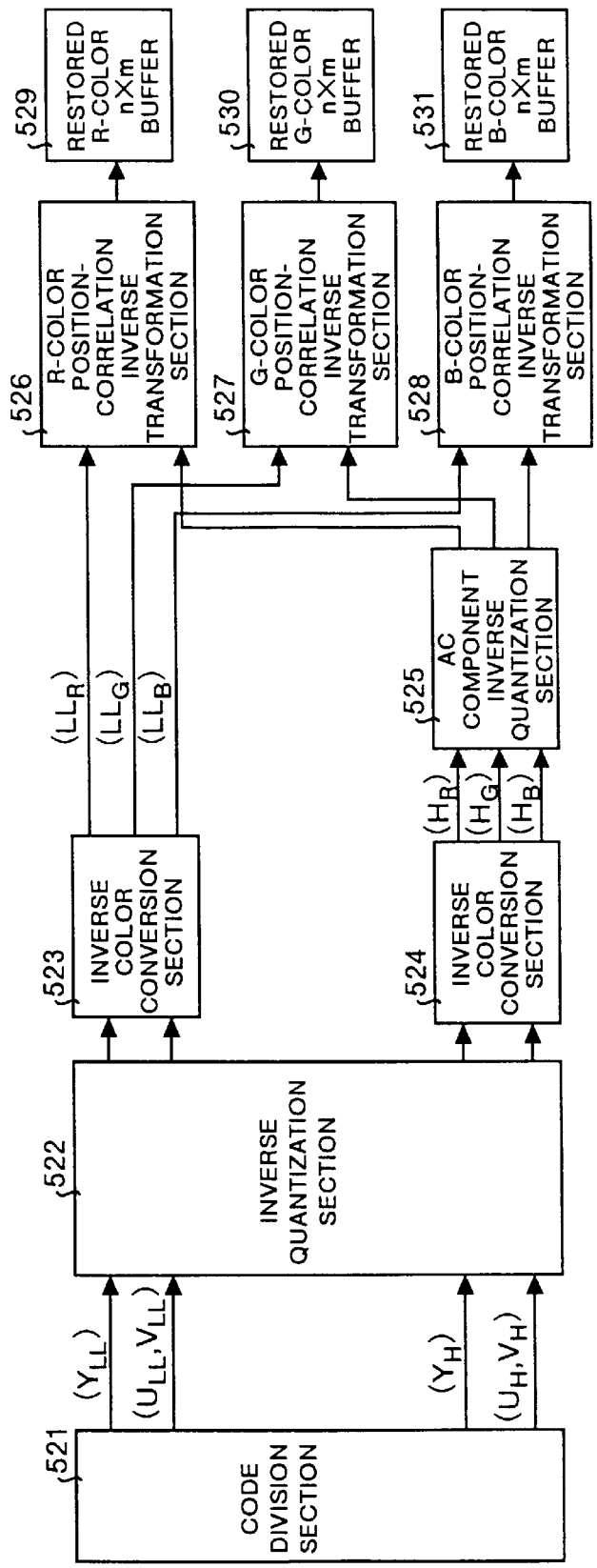
FIG. 12 is a block diagram showing a configuration of a decoder of the first embodiment.

FIG. 12 is a block diagram showing a first embodiment of the decoder 404. The decoder 404 of the first embodiment shown in FIG. 12 decodes compression codes coded in the coder 402 of the first embodiment. The decoder 404 shown in FIG. 12 comprises a code division section 521, an inverse quantization section 522, an inverse color conversion section 523, an inverse color conversion section 524, and an AC component inverse quantization section 525. The decoder 404 further comprises a R-color position-correlation inverse transformation section 526, a G-color position-correlation inverse transformation section 527, a B-color position-correlation inverse transformation section 528, a restored R-color n×m buffer 529, a restored G-color n×m buffer 530, and a restored B-color n×m buffer 531.

The decoding method of the decoder 404 in FIG. 12 is explained in detail below. The compression code (see FIG. 10) compressed in the coder 402 and stored in the page memory 403 is read out from the page memory 403 by 2×2-pixel block at the time of forming an image. The read-out code is decoded in the decoder 404, subjected to filtering in the filtering/gray-scale processing section 405, and then transferred to the writing system.

The code division section 521 divides the compression code for a 2×2-pixel block (see FIG. 10) stored in the page memory 403 to YLL, ULL, VLL, YH, UH, and VH based on the code structure, and outputs the divided codes to the inverse quantization section 522. The inverse quantization section 522 performs inverse quantization on the compression codes YLL, ULL, VLL, YH, UH, and VH input from the code division section 521.

More specifically, the inverse quantization section 522 adds 3 bits to the low-order of YLL 5 bits to be 8 bits. Further, the inverse quantization section 522 restores ULL and VLL to be 9 bits using the table with which inverse quantization of non-linear quantization executed in the coding side is performed. When 3 bits are added to the low-order of the YLL 5 bits, simply by adding "000" to the low-order bit through bit shift, density is decreased. Therefore, it is desirable to add "100" as a median value thereto. To be more specific, the low-order 2 bits of the value of 23=10111 are cut off (i.e., divided by 4) to obtain a code as 101, and by adding 00 to the low-order 2 bits at the time of decoding, 10100=20 is obtained. However, by adding 2 as the median value of 4 to the low-order bit, 10110=23 is obtained. Generally, restoration of the median value makes less change in density, which allows an S/N ratio to be enhanced.

The inverse quantization section 522 restores a vector, concerning YH, by using the table shown in FIG. 6 based on the code values. The inverse quantization section 522 restores nu and nv, concerning UH, VH, from the code with 25 values in the inverse order of the processing for coding.

The inverse color conversion section 523 performs inverse color conversion of YUV transform on the restored DC lightness signal YLL and DC color signals ULL, VLL. The inverse color conversion section 523 then outputs the restored LLR, LLG, and LLB to the R-color position-correlation inverse transformation section 526, the G-color position-correlation inverse transformation section 527, and the B-color position-correlation inverse transformation section 528, respectively.

The inverse color conversion section 524 performs inverse color conversion of YUV transform on the restored AC lightness signal YH and AC color signals UH, VH. The inverse color conversion section 524 then outputs the restored HR, HG, and HB to the AC component inverse quantization section 525. The AC component inverse quantization section 525 performs inverse quantization on the restored HR, HG, and HB (in this case, HH=0 is added to each color), and outputs the values to the R-color position-correlation inverse transformation section 526, the G-color position-correlation inverse transformation section 527, and the B-color position-correlation inverse transformation section 528, respectively.

The R-color, G-color, and B-color position-correlation inverse transformation sections 526, 527, and 528 perform inverse transformation of the Haar wavelet transform on the restored (LLR, HR), (LLG, HG), and (LLB, HB), and store the values in the restored R-color n×m buffer 529, the restored G-color n×m buffer 530, and the restored B-color n×m buffer 531, respectively. Thus, restoration is made in units of 2×2-pixel block. Further, when a large capacity of memory is available, by performing each inverse transformation using a table reference method, the processing time can be reduced.

As explained above, according to the decoder of the first embodiment, it is possible to restore the code information coded in the coder 402 according to the first embodiment.

Second Embodiment

Figure 13:
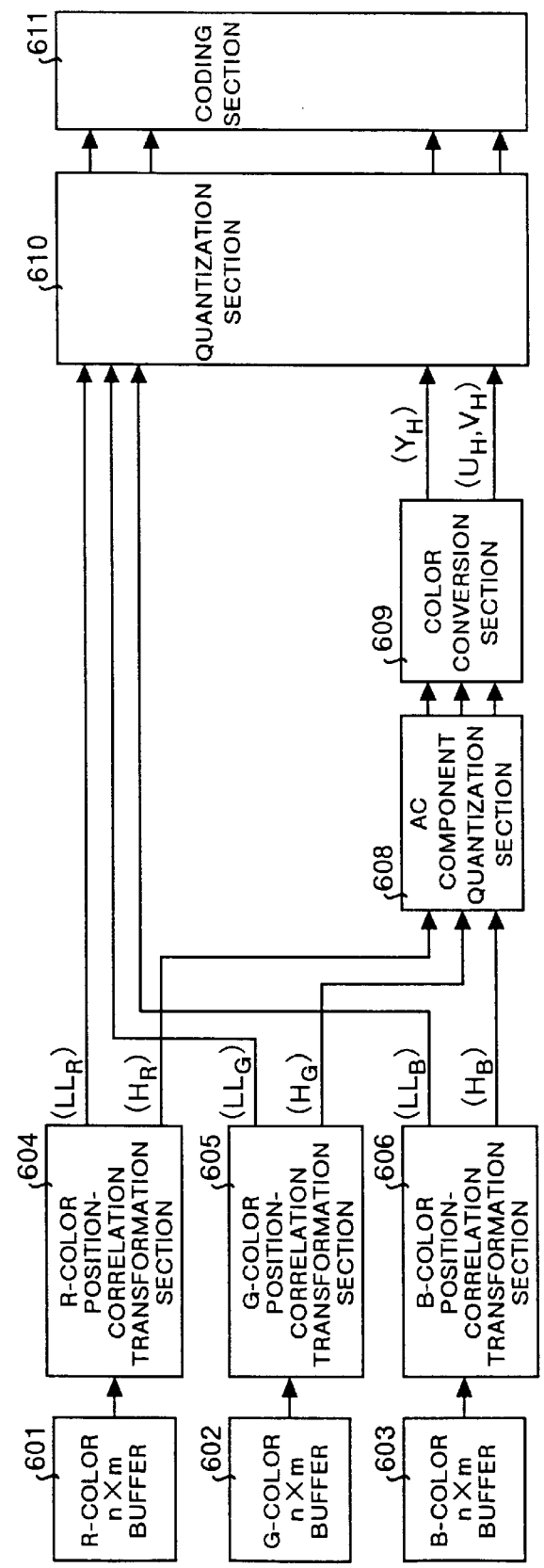
FIG. 13 is a block diagram showing a coder of a second embodiment.

FIG. 13 is a block diagram showing a second embodiment of the coder 402. The different points of the coder 402 in the second embodiment from the coder 402 (FIG. 2) in the first embodiment are as follows. The coder 402 in the first embodiment is configured to separate a DC component into a lightness signal and color signals, whereas, the coder 402 in the second embodiment is configured not to separate a DC component into a lightness signal and color signals. The coder 402 in the second embodiment has a configuration in which the color conversion section 507 in the first embodiment (FIG. 2) is removed, but the functions of the other sections are the substantially same as those of the first embodiment (FIG. 2).

The coder 402 shown in FIG. 13 comprises a R-color n×m buffer 601, a G-color n×m buffer 602, and a B-color n×m buffer 603 that temporarily store image data composed of components in R, G, B colors (e.g., 1 pixel consists of 8 bits for each color) that is input from the scanner 401 in units of n×m (e.g., in units of 2×2-pixel block). The coder 402 further comprises a R-color position-correlation transformation section 604, a G-color position-correlation transformation section 605, and a B-color position-correlation transformation section 606 that perform transformation using a position correlation on each of the components (RGB) stored in the R-, G-, B-color n×m buffers 601, 602, and 603 to separate each data into a DC component and AC components for each color, output the DC components to a quantization section 610, and output the AC components to an AC component quantization section 608.

The coder 402 shown in FIG. 13 further comprises the AC component quantization section 608 that performs quantization in the first step on the AC components of the components input from the R-color, G-color, and B-color position-correlation transformation sections 604, 605, and 606 to output the quantized values to a color conversion section 609. The coder 402 also comprises the color conversion section 609 that performs color conversion (separation of lightness from color) on the AC components of the components, quantized in the first step, input from the AC component quantization section 608, and generates an AC lightness signal and AC color signals to output the signals to a quantization section 610. The coder 402 also comprises the quantization section 610 that performs quantization on the DC signals input from the R-color, G-color, and B-color position-correlation transformation sections 604, 605, and 606, and also performs quantization in a second step on the AC lightness signal and the AC color signals input from the color conversion section 609 to output the quantized values to a coding section 611. The coder 402 further comprises the coding section 611 that puts together the information (units of 2×2-pixel block) quantized in the quantization section 610 to create a fixed-length code, and stores the code in the page memory 403.

The coding method of the coder 402 in FIG. 13 is explained in detail below. The image data composed of components in R, G, and B colors (e.g., units of 2×2-pixel block, 1 pixel consists of 8 bits for each color) read from the scanner 401 is input to the R-, G-, B-color n×m buffers 601, 602, and 603 for temporary storage.

The R-color, G-color, and B-color position-correlation transformation sections 604, 605, and 606 perform transformation of position correlation on the components (RGB) stored in the R-, G-, B-color n×m buffers 601, 602, and 603, and separate signals into DC components LLR, LLG, and LLB and AC components HR, HG, and HB for each color. The sections 604, 605, and 606 then output the DC components LLR, LLG, and LLB to the quantization section 610, and output the AC components HR, HG, and HB to the AC component quantization section 608. As position-correlation transformation, the Haar transform is used as is in the first embodiment.

The AC component quantization section 608 performs quantization in the first step on the AC components HR, HG, and HB of the input components to output the quantized values to the color conversion section 609. In the first-step quantization executed in the AC component quantization section 608, the low-order bits of the coefficients HL, LH, and HH that have originally 9 bits, 9 bits, and 10 bits are cut off by 2 bits for the coefficients HL and LH, whereas, by 3 bits for the coefficient HH (see FIG. 11C).

The color conversion section 609 performs color conversion (separation of lightness from color) on the AC component for each component, quantized in the first step, input from the AC component quantization section 608, generates an AC lightness signal YH and AC color signals UH, VH, and outputs the generated signals to the quantization section 610. The color conversion is executed using YUV transform in the same manner as that in the first embodiment.

The quantization section 610 performs quantization on the DC signals LLR, LLG, and LLB input from the R-color, G-color, and B-color position-correlation transformation sections 604, 605, and 606 to output the quantized values to the coding section 611. More specifically, the quantization section 610 performs linear quantization on the RGB DC components LLR, LLG, and LLB to be 5 bits each. Further, the quantization section 610 performs quantization in the second step on the AC lightness signal YH and the AC color signals UH, VH input from the color conversion section 609 to output the quantized values to the coding section 611. In the second-step quantization, vector quantization is executed in the same manner as the first embodiment.

Figure 15:
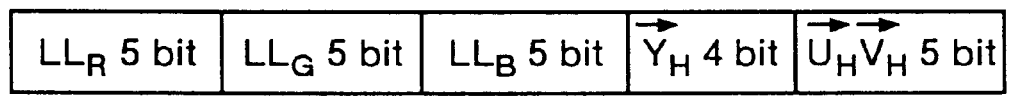
FIG. 15 shows a fixed-length code obtained in the second embodiment.

The coding section 611 puts together the information (units of 2×2-pixel block) quantized in the quantization section 610 to create a fixed-length code, and stores the code in the page memory 403. FIG. 15 shows a format example of a fixed-length code. The 24-bit fixed-length code is created as is in the first embodiment.

As explained above, according to the coder of the second embodiment, since color conversion is not executed to the DC component of each component, in addition to the effect due to the first embodiment (the high degree of bias in information occurs in the upstream side of the processing), such effects as reduction of a circuit scale can be obtained as follows.

① The need for a quantization table to perform quantization on DC components of color signals is eliminated.

Figure 14:
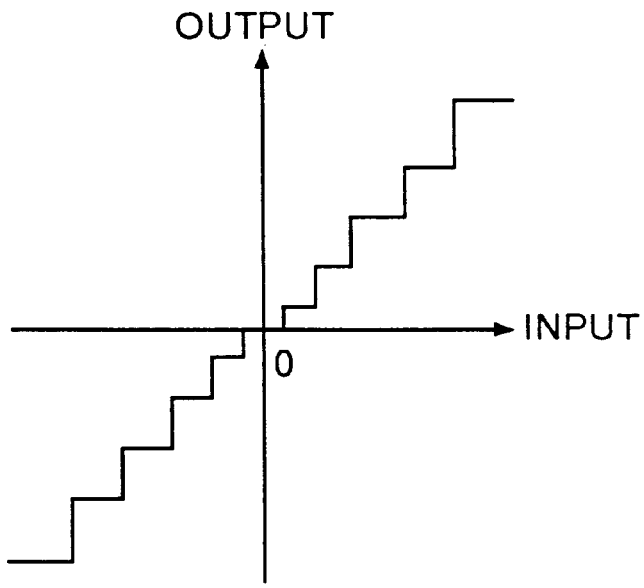
FIG. 14 shows an concept of non-linear quantization of a DC component of a color signal.

In the DC components of the color signals, a smaller absolute value is more important, therefore, it is generally required to perform non-linear quantization when the small absolute value is quantized. An example of a non-linear quantization table with which such non-linear quantization is executed is shown in FIG. 14. The method for performing non-linear quantization includes a method based on computation and a method based on usage of a transformation table. However, the former is slow in a processing speed, while the latter is quick in a processing speed, but the transformation table needs to be prepared in a machine, which makes the costs higher. These troubles occur because two DC components having different characteristics such as a lightness signal and a color signal are quantized. In the coder of the second embodiment, on the other hand, color-conversion is not executed to DC components of colors. Therefore, quantization of all the DC components can be carried out in a simple bit cutting-off method, thus the table for non-linear quantization or the like is not necessarily prepared.

Figure 16:
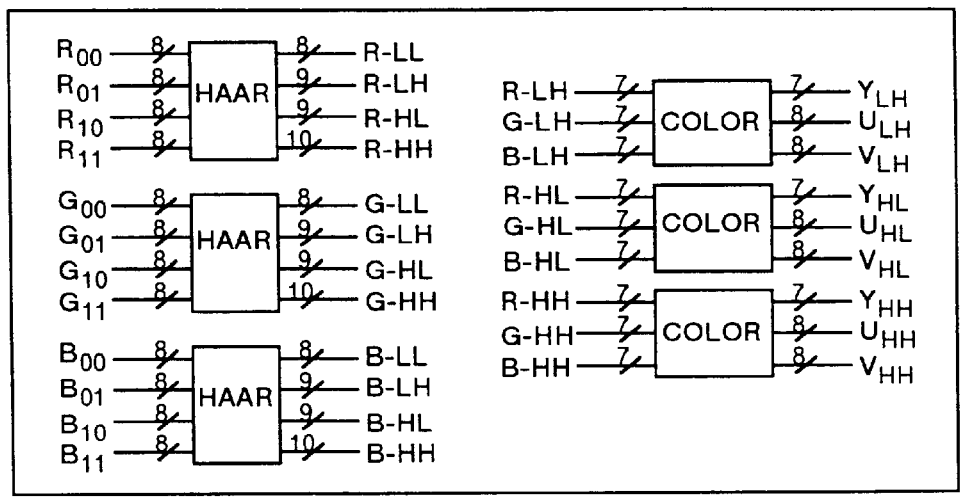
FIG. 16 shows a circuit scale of the second embodiment.

② Since color conversion is not executed to DC components, the need for any color conversion circuit for DC components is eliminated. FIG. 16 shows the necessary number of color conversion circuits and Haar transform circuits in the coder of the second embodiment. As shown in the figure, the color conversion circuit for DC components is not required.

Since the color conversion is not executed to the DC components in the coder of the second embodiment, the localization of the finally obtained information is somewhat less effective in regard to the DC components. However, this demerit is not always largely effected when fixed-length compression is performed. That is because, in a color copying machine with which high-precision color reproduction is required, DC components even in color signals are not allowed, in many cases, to largely be cut off from the viewpoint of image quality. Therefore, the number of bits of the DC components in a lightness signal and color signals does not largely change.

In any coding method that is generally employed, the AC components of color signals may be abandoned (what is called sub-sampling), but the DC components are rare to be quantized. Therefore, there are also many cases where the merit of reduction of a circuit scale, such that the number of non-linear quantization tables and color conversion circuits can be reduced even by one, is more worthy rather than the demerit that DC components are not color-converted.

Further, the AC component quantization section 608 may be removed from the coder 402 of the second embodiment. In this case, there is no such effect, due to "high degree of bias in information in the upstream side", that has been explained in the first embodiment, but the effects ① and ② can be achieved.

Figure 17:
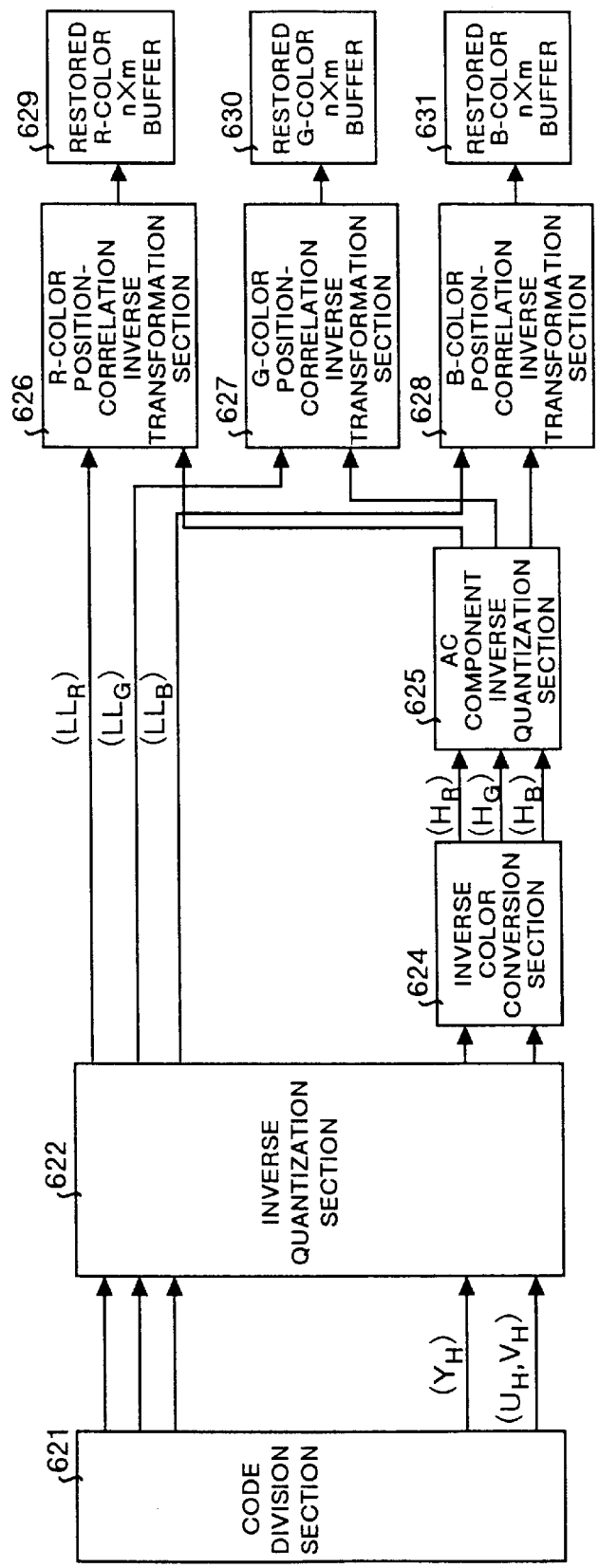
FIG. 17 is a block diagram showing a configuration of a decoder of the second embodiment.

FIG. 17 is a block diagram showing a second embodiment of the decoder 404. The decoder 404 of the second embodiment shown in FIG. 17 decodes compression codes coded in the coder 402 of the first embodiment. The decoder 404 shown in FIG. 17 comprises a code division section 621, an inverse quantization section 622, an inverse color conversion section 624, and an AC component inverse quantization section 625. The decoder 404 further comprises a R-color position-correlation inverse transformation section 626, a G-color position-correlation inverse transformation section 627, a B-color position-correlation inverse transformation section 628, a restored R-color n×m buffer 629, a restored G-color n×m buffer 630, and a restored B-color n×m buffer 631.

The decoding method of the decoder 404 in FIG. 17 is explained below. The compression code (see FIG. 15) compressed in the coder 402 and stored in the page memory 403 is read out from the page memory 403 in units of 2×2-pixel block at the time of forming an image. The read-out code is decoded in the decoder 404, subjected to filtering in the filtering/gray-scale processing section 405, and then transferred to the writing system.

The code division section 621 divides the compression code (see FIG. 15) for a 2×2-pixel block into LLR, LLG, LLB, YH, UH, and VH based on the code structure, and outputs the divided codes to the inverse quantization section 622. The inverse quantization section 622 performs inverse quantization on the compression codes LLR, LLG, LLB, YH, UH, and VH input from the code division section 621.

More specifically, the inverse quantization section 622 restores LLR, LLG, and LLB to 9 bits, and outputs restored values to the R-color position-correlation inverse transformation section 626, the G-color position-correlation inverse transformation section 627, the B-color position-correlation inverse transformation section 628, respectively. Further, the inverse quantization section 622 restores a vector, concerning YH, by using the table shown in FIG. 6 based on the code values. The inverse quantization section 622 restores nu and nv, concerning UH, VH, from the code with 25 values in the inverse order of the processing for coding.

The inverse color conversion section 624 performs inverse color conversion of YUV transform on the restored AC lightness signal YH and AC color signals UH, VH. The inverse color conversion section 524 then outputs the restored HR, HG, and HB to the AC component inverse quantization section 625. The AC component inverse quantization section 625 performs inverse quantization on the restored HR, HG, and HB (in this case, HH=0 is added to each color), and outputs the values to the R-color position-correlation inverse transformation section 626, the G-color position-correlation inverse transformation section 627, and the B-color position-correlation inverse transformation section 628, respectively.

The R-color, G-color, and B-color position-correlation inverse transformation sections 626, 627, and 628 perform inverse transformation of the Haar wavelet transform on the restored (LLR, HR), (LLG, HG), and (LLB, HB), and store the values in the restored Recolor n×m buffer 629, the restored G-color n×m buffer 630, and the restored B-color n×m buffer 631, respectively. Thus, restoration is made in units of 2×2-pixel block. Further, when a large capacity of memory is available, by performing each inverse transformation using a table reference method, the processing time can be reduced.

As explained above, according to the decoder in the second embodiment, it is possible to restore the code information coded in the coder 402 according to the second embodiment.

Third Embodiment

Figure 18:
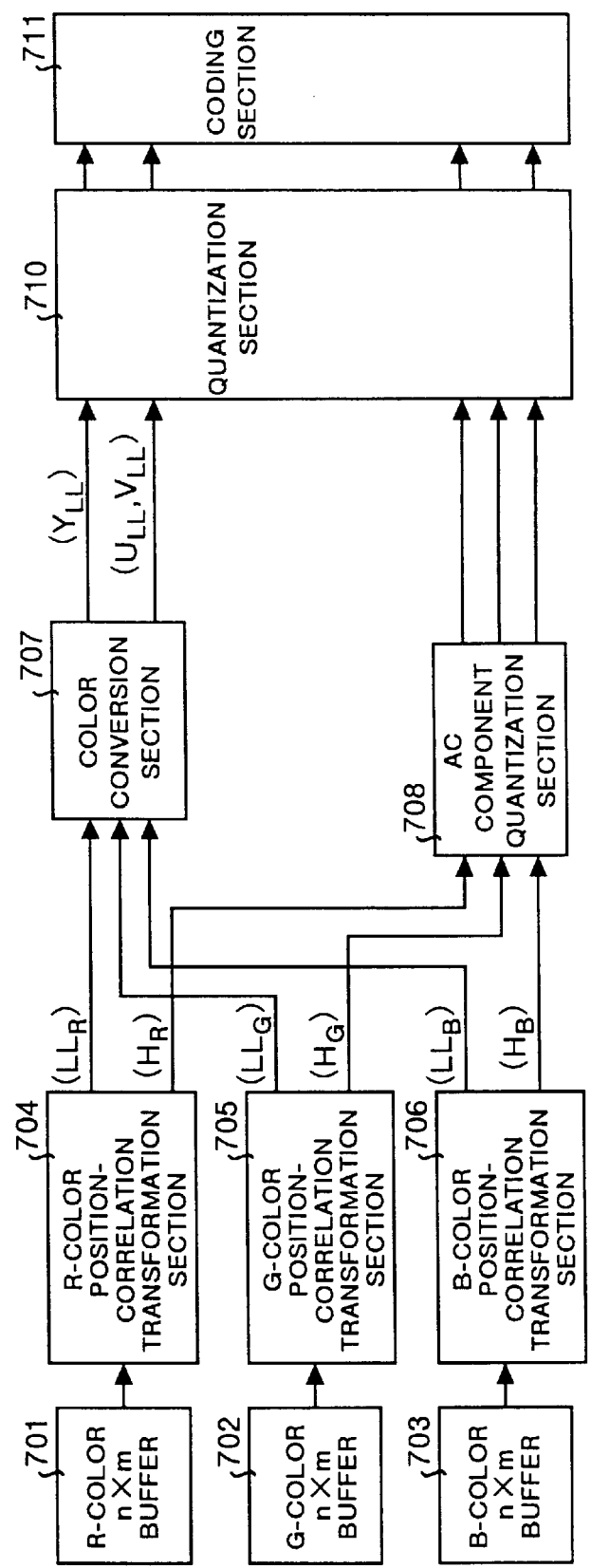
FIG. 18 is a block diagram showing a coder of a third embodiment.

FIG. 18 is a block diagram showing a third embodiment of the coder 402. The different points of the coder 402 in the third embodiment from the coder 402 (FIG. 2) in the first embodiment are as follows. The coder 402 in the first embodiment is configured to separate an AC component into a lightness signal and color signals, whereas, the coder 402 in the third embodiment is configured not to separate an AC component into a lightness signal and color signals but to perform quantization on the AC component. The coder 402 in the third embodiment has a configuration in which the color conversion section 509 is removed from the coder in the first embodiment (FIG. 2), but the functions of the other sections are the substantially same as those of the coder 402 in the first embodiment (FIG. 2).

The coder 402 shown in FIG. 18 comprises a R-color n×m buffer 701, a G-color n×m buffer 702, and a B-color n×m buffer 703 that temporarily store image data composed of R-, G-, B-color components (e.g., 1 pixel consists of 8 bits for each color) that is input from the scanner 401 in units of n×m (e.g., in units of 2×2-pixel block). The coder 402 further comprises a R-color position-correlation transformation section 704, a G-color position-correlation transformation section 705, and a B-color position-correlation transformation section 706 that perform transformation using position correlation for each of the components (RGB) stored in the R-, G-, B-color n×m buffers 701, 702, and 703 to separate each data into a DC component and AC components for each color, output DC components to a color conversion section 707, and also output AC components to an AC component quantization section 708.

The coder 402 shown in FIG. 18 further comprises the color conversion section 707 that performs color conversion on the DC component of each of the components input from the R-color, G-color, and B-color position-correlation transformation sections 704, 705, and 706 to separate the data into a DC lightness signal and DC color signals, and outputs the signals to a quantization section 710. The coder 402 further comprises the AC component quantization section 708 that performs quantization in the first step on the AC components of the components input from the R-color, G-color, and B-color position-correlation transformation sections 704, 705, and 706 to output the quantized values to the quantization section 710. The coder 402 also comprises the quantization section 710 that performs quantization on the DC lightness signal and DC color signals input from the color conversion section 707, and also performs quantization in the second step on the AC signals input from the AC component quantization section 708 to output the quantized values to a coding section 711. The coder 402 also comprises the coding section 711 that puts together the information (units of 2×2-pixel block) quantized in the quantization section 710 to create a fixed-length code, and stores the code in the page memory 403.

Operation of the coder 402 in FIG. 18 is explained in detail below. In FIG. 18, the image data composed of the R-, G-, and B-color components (e.g., units of 2×2-pixel block, 1 pixel consists of 8 bits for each color) read from the scanner 401 is input to the R-, G-, B-color n×m buffers 701, 702, and 703 for temporary storage.

The R-color, G-color, and B-color position-correlation transformation sections 704, 705, and 706 perform transformation using position correlation on the components (RGB) stored in the R-, G-, B-color n×m buffers 701, 702, and 703, and separate signals into DC components LLR, LLG, and LLB and AC components HR, HG, and HB for each color. The sections 704, 705, and 706 then output the DC components LLR, LLG, and LLB to the color conversion section 707, and also output the AC components HR, HG, and HB to the AC component quantization section 708. As position-correlation transformation, the Haar transform is used as is in the first embodiment.

The AC component quantization section 708 performs quantization in the first step on the AC components HR, HG, and HB of the input components to output the quantized values to the quantization section 710. In the first-step quantization executed in the AC component quantization section 708, the low-order bits of the coefficients HL, LH, and HH that have originally 9 bits, 9 bits, and 10 bits are reduced by 2 bits for the coefficients HL and LH, whereas, by 3 bits for the coefficient HH (see FIG. 11C).

The color conversion section 707 performs color conversion (separation of lightness from color) on the DC components LLR, LLG, and LLB of the components input from the R-color, G-color, and B-color position-correlation transformation sections 704, 705, and 706 to generate a DC lightness signal YLL and DC color signals ULL and VLL, and outputs the signals to the quantization section 710.

The quantization section 710 performs quantization on the DC lightness signal YLL and the DC color signals ULL, VLL input from the color conversion section 707. The quantization section 710 also performs quantization in the second step on the AC signals HR, HG, and HB input from the AC component quantization section 708, and outputs the quantized values to the coding section 711. Referring to the second-step quantization performed on the AC components at this step, the AC component HG for G color is vector-quantized, whereas, the AC components HR, HB for R and B colors are quantized using the ratio between the AC component for G color and each of the AC components for R and B colors.

Figure 19:
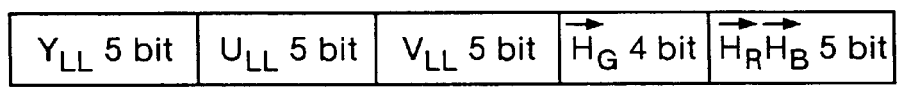
FIG. 19 shows a fixed-length code obtained in the third embodiment.

The coding section 711 puts together the information (units of 2×2-pixel) quantized in the quantization section 710 to create a fixed-length code, and stores the code in the page memory 403. FIG. 19 shows a format example of a fixed-length code. A 24-bit fixed-length code is created as is in the first embodiment.

Figure 20:
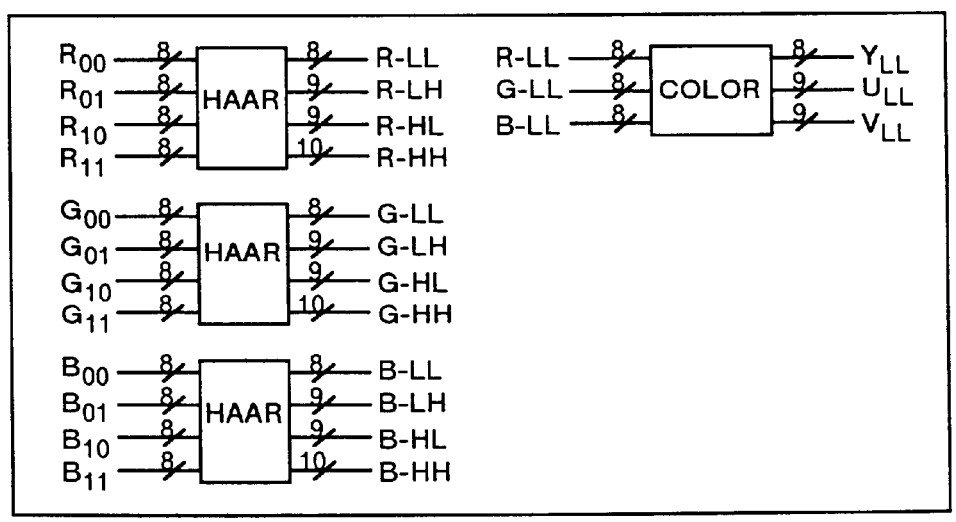
FIG. 20 shows a circuit scale of the third embodiment.

As explained above, according to the coder in the third embodiment, since the AC components are not separated into lightness signals and color signals, in addition to the effect due to the first embodiment (the high degree of bias in information occurs in the upstream side), a circuit scale can be reduced by eliminating the need for a color conversion circuit for AC components. FIG. 20 shows the necessary number of color conversion circuits and Haar transform circuits in the coder of the third embodiment. As shown in the figure, the color conversion circuits for AC components are not required.

The proportional relationship of an AC component vector between "AC lightness signals" and "AC color signals" that exist in the first embodiment is originally derived from the proportional relationship of an AC component vector for each of the R, G, B colors. Therefore, this proportional relationship always holds as well on condition that the number of colors within a block is two colors or less as explained in the first embodiment. Thus, the AC components can also efficiently be compressed also by using the proportional relationship between AC components in the same manner as that in the first embodiment.

In the third embodiment, the AC components HG for a G color are vector-quantized in the quantization section 710, whereas the ratio between the AC component for a G color and each of the AC components for R and B colors is quantized therein for the AC components HR and HB for R and B colors. However, when the G color has no edge but the R and B colors have edges, there comes up a problem that all the edges in three colors disappear. To solve the problem, any color (called a specific color) that has an edge with the largest value of the three colors may be vector-quantized, whereas, in regard to the other colors, the ratio between each of the AC components of the other colors and the vector of the specific color may be quantized.

In this case, it is required to show which color becomes a specific color by adding 2 bits to the fixed-length code. Further, a specific color can be determined using any block larger than a 2×2 block, for example, a 4×4 block. In this case, a 2-bit code representing a specific color is added to four 2×2 blocks, therefore, the fixed-length codes are resultantly created in four units of 2×2 block.

Fourth Embodiment

Figure 21:
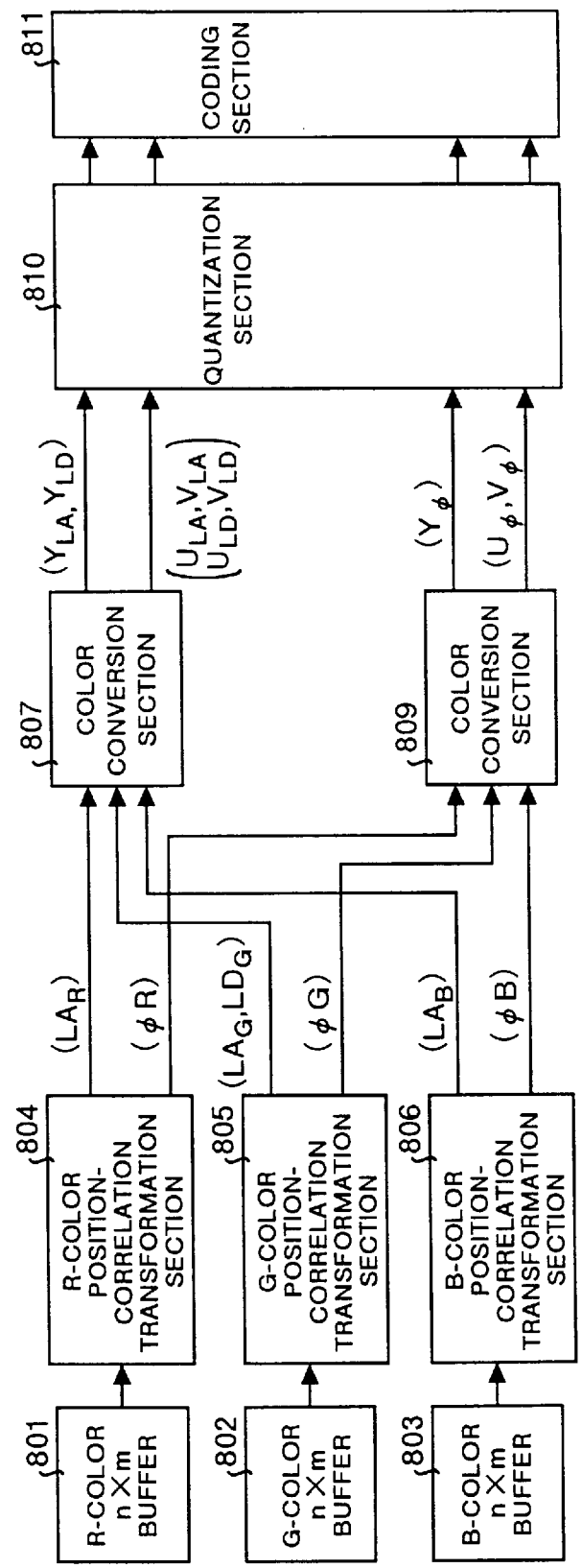
FIG. 21 is a block diagram showing a configuration of a coder of a fourth embodiment.

FIG. 21 is a block diagram showing a fourth embodiment of the coder in FIG. 1. In the fourth embodiment, the case where BTC-transformation is performed is explained, although it is explained in the first embodiment that the coder (FIG. 2) in the first embodiment has a configuration that the R-color, G-color, and B-color position-correlation transformation sections 504, 505, and 506 perform frequency transformation (Haar transform or the like) as position-correction transformation.

FIG. 21 is a block diagram showing the fourth embodiment of the coder 402. The coder 402 shown in FIG. 21 comprises R-color, G-color, and B-color n×m buffers 801, 802, and 803, and R-color, G-color, B-color position-correlation transformation sections 804, 805, and 806. The coder 402 further comprises a color conversion section 807, a color conversion section 809, a quantization section 810, and a coding section 811.

The BTC-transformation (Block Truncation Coding-transformation) is the known technology of fixed-length compression as disclosed in the paragraph No. [0151] in JP10-0257331A. This is a method for transforming an image for every 4×4-pixel block, for example, to an average density data LA (8 bits), a gradation width index data LD (8 bits), and quantized value data ϕ(2 bits each) when each pixel value is quantized within a 4×4-pixel block.

The coding method of the coder 402 in FIG. 21 is explained below. The image data for each color read into the R-color, G-color, and B-color n×m buffers 801, 802, and 803 in units of 4×4 pixels are BTC-transformed in the R-color, G-color, B-color position-correlation transformation sections 804, 805, and 806, respectively, to generate LA, LD, and ϕ. The coefficient LA of a X color is abbreviated as LAX, the coefficient LD of a X color as LDX, and the coefficient ϕ of a X color as ϕX (X=R, G, B).

The color conversion section 807 performs LD-color conversion on (LAR), (LAG, LDG), (LAB) input from the R-color, G-color, B-color position-correlation transformation sections 804, 805, and 806, and outputs (YLA, YLD), (ULA, VLA), (ULD, VLD) to the quantization section 810. The color conversion section 809 performs color conversion on (ϕR), (ϕG), (ϕB) input from the R-color, G-color, B-color position-correlation transformation sections 804, 805, and 806, and outputs (Yϕ), (Uϕ, Vϕ) to the quantization section 810.

The color conversion is executed using the following equations, and the coefficients obtained after color conversion are abbreviated as follows.

$$YZ=(ZR+2*ZG+ZB)/4$$

$$UZ=ZR-ZG$$

$$VZ=ZB-ZG$$

$$(Z=LA, LD, \phi)$$

The quantization section 810 performs quantization on the input (YLA, YLD), (ULA, VLA), (ULD, VLD), (Yϕ), (Uϕ, Vϕ) to output the values to the coding section 811. More specifically, YLA and YLD are sent to the coding section 811 as they are with 8 bits each without being quantized. ULA, ULD, VLA, and VLD are quantized to 6 bits each in the same manner as that for executing non-linear quantization to ULL and VLL to 6 bits in the non-edge section shown in FIG. 25, which is explained later. Yϕ is sent to the coding section 811 as it is with 32 bits without being quantized. Uϕ and Vϕ are handled as a 16-dimensional vector. When an absolute value of a normalized inner product with Yϕ is sufficiently close to 1, and if Uϕ is |Yϕ·Uϕ|>0.8×|Yϕ|Uϕ|, it is regarded as that there is a proportional relationship between these two, namely, it is regarded as Yϕ=nu×Uϕ. The proportional constant nu=|Uϕ|/|Yϕ| is then quantized. On the other hand, when |Yϕ·Uϕ| is 0.8 or less, it is not regarded as that these two are not proportional to each other, and then the proportional constant as nu=0 is quantized. The similar processing is executed to Vϕ. It is assumed that each of the proportional constants nu and nv takes values of 201 values 8 bits in which values in a range from −2.0 to 2.0 is split by 0.02 such as −2.0, −1.98, −1.96, . . . , 0, . . . , 1.96, 1.98, 2.0.

The coding section 811 puts together the information (units of 4×4-pixel block) quantized in the quantization section 810 to create a fixed-length code, and stores the code in the page memory 403. As explained above, coding is executed as follows: YLA, YLD=8 bits each, ULA, ULD, VLA, and VLD=6 bits each, Yϕ=32 bits, Uϕ, Vϕ=8 bits each. Therefore, a 4×4-pixel block is compressed to 88 bits over the entire fixed-length code, thus fixed-length compression by about one-fourth is achieved.

According to the coder of the fourth embodiment, the BTC-transformation itself includes quantization, therefore, no quantization section is provided in the upstream side of the processing for color conversion. However, BTC as position-correction transformation is executed in the upstream side of the processing, thus, the number of bits of ϕ to be sent to the color conversion section is reduced to 2 bits. Based on this feature, the number of bits to be input to a color conversion section can be reduced.

Figure 22:
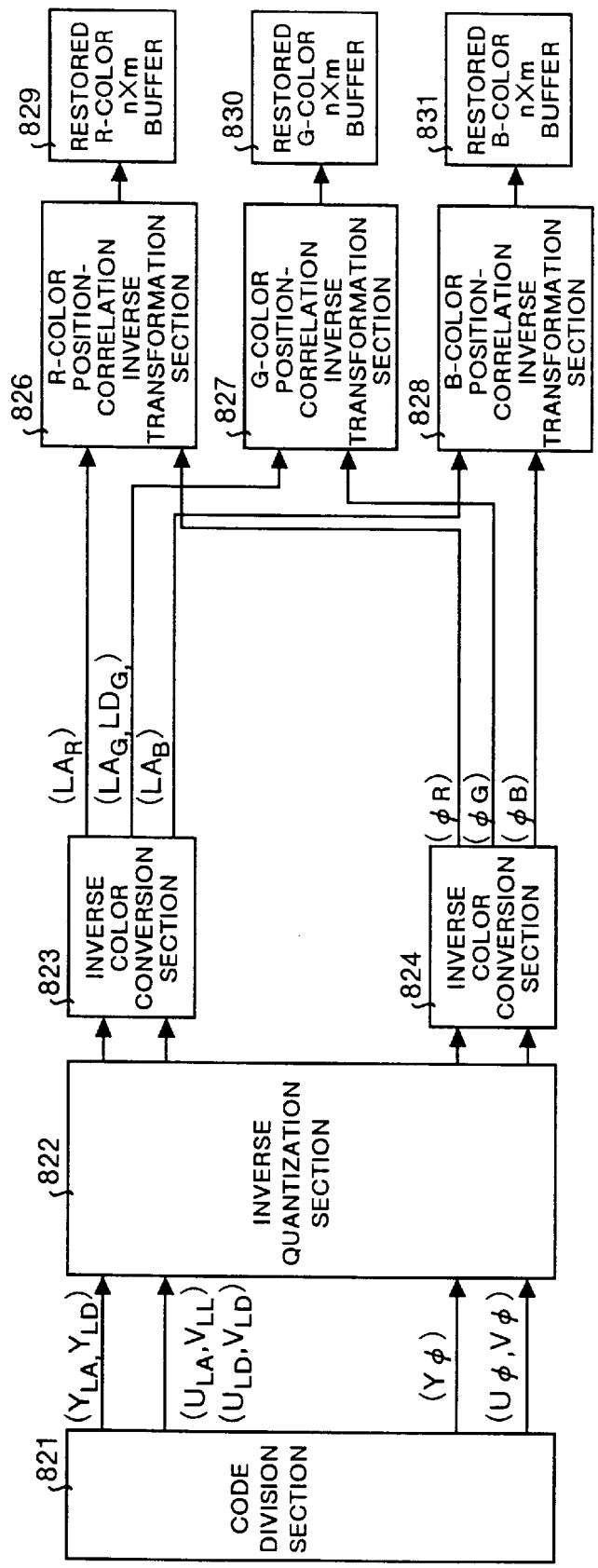
FIG. 22 is a block diagram showing a configuration of a decoder of the fourth embodiment.

FIG. 22 is a block diagram showing a fourth embodiment of the decoder 404. The decoder 404 in the fourth embodiment shown in FIG. 22 decodes compression codes coded in the coder 402 in the fourth embodiment. The decoder 404 shown in FIG. 22 comprises a code division section 821, an inverse quantization section 822, an inverse color conversion section 823, an inverse color conversion section 824, a R-color position-correlation inverse transformation section 826, a G-color position-correlation inverse transformation section 827, a B-color position-correlation inverse transformation section 828, a restored R-color n×m buffer 829, a restored G-color n×m buffer 830, and a restored B-color n×m buffer 831.

The decoding method of the decoder 404 shown in FIG. 22 is explained below. The code division section 821 divides the code information (units of 4×4-pixel block) stored in the page memory 403 into (YLA, YLD), (ULA, VLA), (ULD, VLD), (Yϕ), and (Uϕ, Vϕ) and outputs the divided codes to the inverse quantization section 822. The inverse quantization section 822 performs inverse quantization on (YLA, YLD), (ULA, VLA), (ULD, VLD), (Yϕ), and (Uϕ, Vϕ), outputs the inverse-quantized (YLA, YLD), (ULA, VLA), and (ULD, VLD) to the inverse color conversion section 823, and outputs the inver-sequantized (Yϕ) and (Uϕ, Vϕ) to the inverse color conversion section 824.

The inverse color conversion section 823 performs inverse color conversion, of the color conversion executed in the color conversion section 807, on the input (YLA, YLD), (ULA, VLA), and (ULD, VLD) to restore (LAR), (LAG, LDG), and (LAB). The restored data is then output to the R-color position-correlation inverse transformation section 826, the G-color position-correlation inverse transformation section 827, and the B-color position-correlation inverse transformation section 828, respectively. The inverse color conversion section 824 performs inverse color conversion, of the color conversion executed in the color conversion section 809, on the input (Yϕ) and (Uϕ, V ϕ) to restore (ϕR), (ϕG), and (ϕB), and outputs the restored data to the R-color position-correlation inverse transformation section 826, the G-color position-correlation inverse transformation section 827, and the B-color position-correlation inverse transformation section 828, respectively.

The R-color position-correlation inverse transformation section 826, the G-color position-correlation inverse transformation section 827, and the B-color position-correlation inverse transformation section 828 perform inverse BTC-transformation on (LAR) and (φR), (LAG, LDG) and (φAG), and (LAB) and (φB) to be stored in the restored R-color, restored G-color, and restored B-color n×m buffers 829, 830, and 31, respectively. Thus, the restoration is executed by 4×4-pixel block.

According to the decoder of the fourth embodiment, it is possible to restore the code information coded in the coder 402 of the fourth embodiment.

Fifth Embodiment

Figure 23:
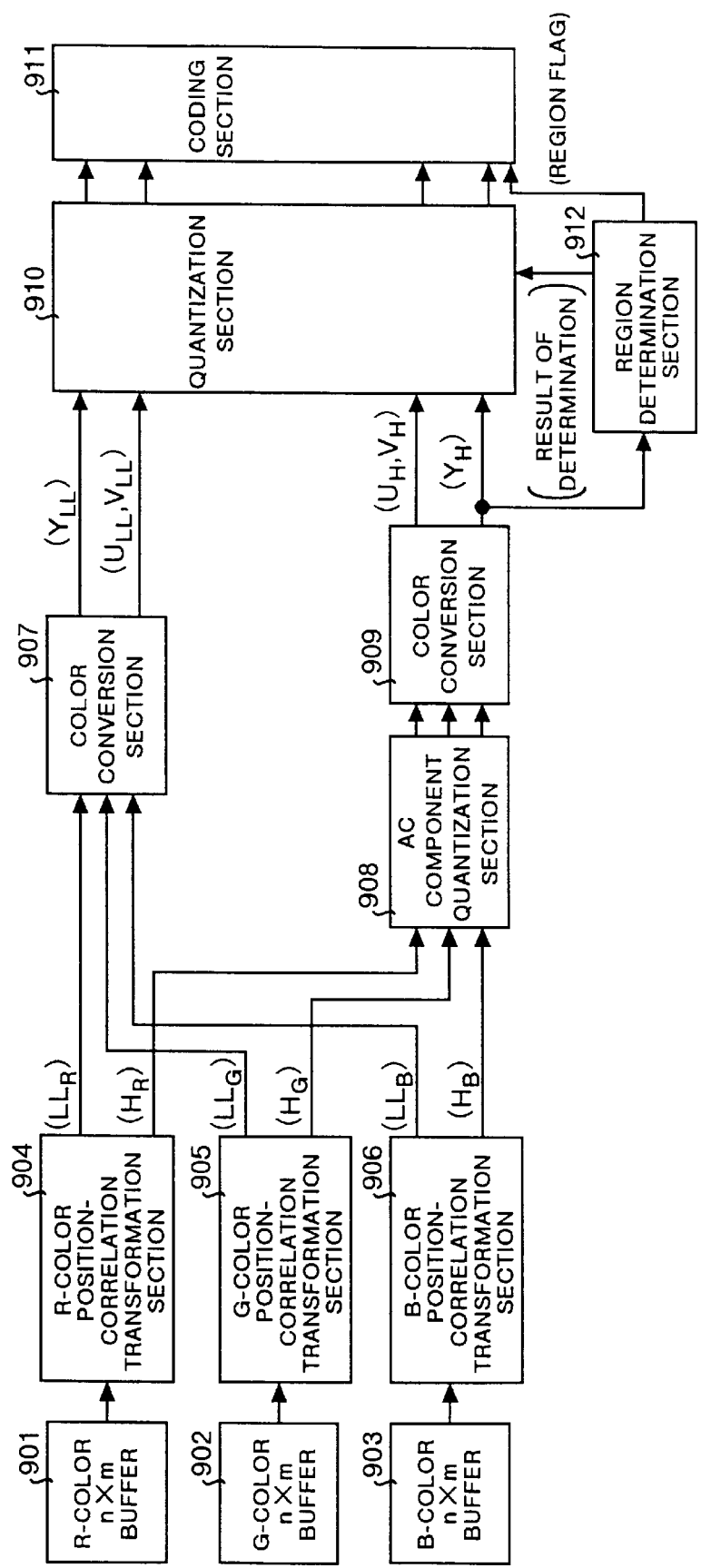
FIG. 23 is a block diagram showing a configuration of a coder of a fifth embodiment.

FIG. 23 is a block diagram showing a fifth embodiment of the coder 402. The coder 402 of the fifth embodiment is obtained by adding a region determination section to the coder 402 (FIG. 2) of the first embodiment.

The coder 402 shown in FIG. 23 comprises a R-color n×m buffer 901, a G-color n×m buffer 902, and a B-color n×m buffer 903 that temporarily store image data composed of the R-, G-, B-color components (e.g., 1 pixel consists of 8 bits for each color) that is input from the scanner 401 in units of n×m (e.g., in units of 2×2-pixel block). The coder 402 further comprises a R-color position-correlation transformation section 904, a G-color position-correlation transformation section 905, and a B-color position-correlation transformation section 906 that perform transformation using position correlation on the components (RGB) stored in the R-, G-, B-color n×m buffers 901, 902, and 903 to separate each data into a DC component and AC components for each color, output DC components to a color conversion section 907, and also output AC components to an AC component quantization section 908. The coder 402 also comprises a color conversion section 907 that performs color conversion (separation of lightness from color) on the DC components of the components input from the R-color, the G-color, and the B-color position-correlation transformation sections 904, 905, and 906, and generates DC lightness signals and DC color signals to output the signals to a quantization section 910.

Further, the coder 402 shown in FIG. 23 comprises the AC component quantization section 908 that performs the quantization in the first step on the AC component of each component input from the R-color, G-color, and B-color position-correlation transformation sections 904, 905, and 906, and outputs the quantized values to a color conversion section 909. The coder 402 further comprises the color conversion section 909 that performs color conversion (separation of lightness from color) on the AC component of each component, quantized in the first step, input from the AC component quantization section 908 to generate an AC lightness signal and AC color signals, and outputs the generated signals to the quantization section 910. The coder 402 further comprises a region determination section 912 that determines any region based on the AC lightness signal input from the color conversion section 909, outputs the result of region determination to the quantization section 910, and also outputs a region flag to a coding section 911. The coder 402 further comprises the quantization section 910 that performs quantization on the DC lightness signals and DC color signals input from the color conversion section 907 based on the result of region determination, and also performs quantization in the second step on the AC lightness signals and the AC color signals input from the color conversion section 909 to output the quantized values to the coding section 911. The coder 402 also comprises the coding section 911 that puts together the information (units of 2×2-pixel block) quantized in the quantization section 910 to create a fixed-length code, and stores the code in the page memory 403.

The coding method of the coder 402 in FIG. 23 is explained in detail below. The image data consisting of R-, G-, B-color components (e.g., units of 2×2-pixel block, 1 pixel consists of 8 bits for each color), that is read from the scanner 401 is input into the R-, G-, and B-color n×m buffers 901, 902, and 903 for temporary storage.

The R-color, G-color, and B-color position-correlation transformation sections 904, 905, and 906 perform transformation of position correlation on the components (RGB) stored in the R-, G-, and B-color n×m buffers 901, 902, and 903, separate the components into DC components LLR, LLG, and LLB and AC components HR, HG, and HB for each color. The DC components LLR, LLG, and LLB are then output to the color conversion section 907, whereas the AC components HR, HG, and HB are output to the AC component quantization section 908. As position-correlation transformation, the Haar transform is used as is in the first embodiment.

The AC component quantization section 908 performs quantization in the first step on the AC components HR, HG, and HB of the input components to output the quantized values to the color conversion section 909. In the first-step quantization executed in the AC component quantization section 908, HH of the AC components HL, LH, HH is cut off.

The color conversion section 909 performs color conversion (separation of lightness from color) on the AC components of the components, quantized in the first step, input from the AC component quantization section 908, generates an AC lightness signal YH and AC color signals UH, VH, and outputs the AC lightness signal YH and the AC color signals UH, VH to the quantization section 910, and also outputs the AC lightness signal YH to the region determination section.

The color conversion section 907 performs color conversion (separation of lightness from color) on the DC components LLR, LLG, and LLB of the components input from the R-color, G-color, and B-color position-correlation transformation sections 904, 905, and 906, and generates a DC lightness signal YLL and DC color signals ULL, VLL to output the signals to the quantization section 910.

The region determination section 912 determines any region using the AC lightness signal YH input from the color conversion section 909. More specifically, region determination is carried out by determining, when an amplitude of YH is more than a predetermined value, that the 2×2 block of YH is an edge region, and that it is not an edge region in any case other than the above case. The edge region is a region in which the densities within a block largely change, and in such region, preservation of a resolution is more important than preservation of an average-level gray scale within a block. On the other hand, the non-edge region is a region in which gray scales within a block change smoothly, and in such region, preservation of an average-level gray scale within a block is more important than preservation of a resolution.

Whether "the amplitude of YH is more than a predetermined value" is determined by the following steps. More specifically, when the absolute value of either one of coefficients YHL and YLH that form YH is 16 or more, the corresponding block is determined as an "edge region", and any region other than the block is determined as a "non-edge region". The reason that UH and VH are not used but only YH is used for the determination is that YH is the coefficient, close to an average value of AC components, to which the edges of HR, HG, and HB are reflected. When the region is determined by using only YH, only two conditions of "|YHL|>15?" and "|YLH|>15?" are required for determination, which allows determination to easily be carried out. By the way, the expression |a| is the absolute value of a. The region determination section 912 outputs the result of region determination to the quantization section 910, and at the same time outputs a region flag to the coding section 911.

The quantization section 910 receives the result of region determination from the region determination section 912, and performs different quantization on the edge section and the non-edge section, and the coding section 911 puts together the quantized bits to generate a compression code. FIG. 25 shows a format of each compression code. More specifically, the edge section has 5 bits each for YLL, ULL, and VLL, 4 bits 13 values for YH, and 25 values 5 bits for UH and VH in total. However, the amplitude of a high frequency component is always 16 or more, therefore, (YHL, YLH, YHH)=(0, 0, 0) is not required in the edge region. Therefore, the 16 values as shown in FIG. 24 may be selected for vectors of the high frequency components, thus high efficiency is obtained because of no unused code.

As a result, the edge region is transformed to a 24-bit compression code in which the gradation is rough yet the resolution is comparatively well preserved. On the other hand, in the non-edge section, as shown in FIG. 25, the low-order one bit for YLL is cut off to obtain 7 bits, and ULL and VLL are non-linear-quantized in the same manner as ULL and VLL in the edge section to put the bits together to 6 bits each.

The non-linear quantization is executed using a table reference system, and a different table is used as a non-linear quantization table for each of the edge section and the non-edge section. Further, the non-edge section is a region where a high frequency component whose amplitude is 16 or more does not exist within a block, therefore, it can be regarded as a substantially plane region. Based on this idea, all the high frequency components are cut off. Lastly, the remaining 5 bits are used as a region flag to recognize, in the decoding side, which of the edge region and the non-edge region a remarked block belongs to.

More specifically, any value that is not used for 25 values representing UH and VH in the edge region is used as a region flag at the same position as the position where the 5-bit code representing UH and VH are present in the edge region (the low-order 5 bits in the 24-bit compression code, as shown in FIG. 25). In this embodiment, "00000" is used as a region flag, whereas "00001–11001" are used as 25 values representing UH and VH. Based on this configuration, by checking the low-order 5 bits of the compression code, the decoding side can determine the region. The non-edge region is coded to a 24-bit compression code in which the resolution is low yet the gradation is comparatively well preserved.

As a result, the codes which store important information can be obtained in the edge region and the non-edge region, thus compression with less degradation in image quality can be achieved. A 24-bit fixed-length code can be obtained regardless of any region, thus a compression code that is easy to access memory and is excellent in editing such as rotation can be obtained. Further, a code is generally transferred by one or several bytes, therefore, the simple code such as 24 bits=3 bytes according to this embodiment is easy to control when it is transferred.

Referring to how to select a region flag, as shown in this embodiment, a code value corresponding to any value that has high frequency of occurrence among 25 values representing UH, VH and a region flag are selected as code values having a direct correlation. If so, these codes are useful when secondary compression is required to be carried out. To be more specific, there is sometimes provided a HDD other than a page memory in some printer for the purpose of printing a plurality pages of images a plurality copies. Based on this configuration, fixed-length codes stored in the page memory are stored in the HDD in a state of those subjected to secondary compression or as they are, and by successively reading these codes, it is possible to output a plurality of copies of the images while the plurality pages of images are sorted electronically.

Such configuration is realized by combining a RAM, that is quick in access yet expensive, with a HDD that is slow in access yet has an inexpensive memory, thus the processing for a large amount of and high-speed electronic sorting can be achieved. When the secondary compression is executed to a fixed-length code in this configuration, the correlation between codes is decreased due to existence of regions by using region-separated type of fixed-length codes. Thus, the secondary compression ratio tends to be decreased. In contrast, any codes, such as a code value corresponding to a small proportional value that is comparatively high frequency of occurrence in the edge region and a region flag that appears in the non-edge region, are selected as code shaving a direct correlation between the two. Thereby decrease in this secondary compression ratio can be minimized even in small quantity.

As a region flag, one bit for a flag may be prepared in a compression code, or, like in this embodiment, any unused value of bits that are used as a meaningful coefficient in another region may be determined as a flag. Namely, as a region flag, a bit or bits dedicated to a flag may be used, or a flag may be integrally formed with a code representing a coefficient value. The term of integral formation means here the structure of a code in which a bit string represents a region and also a coefficient value. More specifically, if the code value indicating a flag of a code with 3 bits 8 values is 0, for example, it represents the region A, the code value of 1 represents the region B, and the code value of any of 2 to 7 represents the region C and also each of the values of 2 to 7 represents a coefficient value. Which bit is used depends on how bits are allocated to each region. This bit distribution differs depending on each system because the bit distribution is affected by γ characteristics of a development device or the like. Therefore, the most appropriate way of embedding a region flag in a code may be selected based on the bit distribution optimal to the system.

Figure 26:
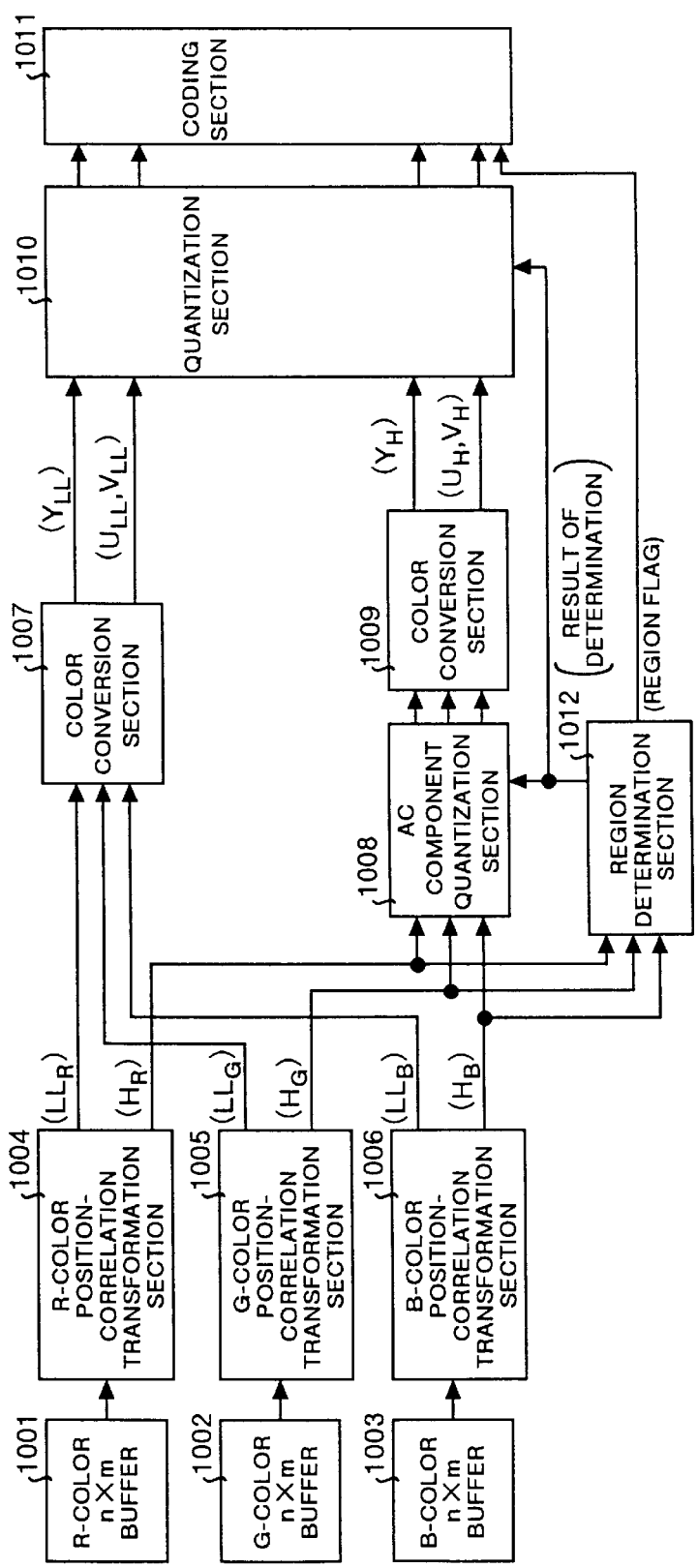
FIG. 26 is a block diagram showing another configuration of the coder of the fifth embodiment.

When a result of region determination is required to be reflected to quantization in an AC component quantization section, HR, HG, HB may be used for the determination. FIG. 26 is a block diagram showing a configuration of a coder when a region is determined using HR, HG, HB. The configuration and the functions of the coder shown in FIG. 26 are the substantially same as those of the coder in FIG. 23. Therefore, only different points are explained below. In FIG. 26, a region determination section 1012 determines a region (edge region, non-edge region) of a 2×2-pixel block based on the AC components HR, HG, and HB input from R-color, G-color, B-color position-correlation transformation sections 1004, 1005, and 1006, and outputs the result of determination to a quantization section 1010 and also to an AC component quantization section 1008. The AC component quantization section 1008 performs quantization on AC components based on the result of region determination.

Although the region determination section 912 of the coder in FIG. 23 determines regions in two steps for an edge region and a non-edge region, multiple steps (three or more steps) may be employed for region determination. The case where the region determination section 912 determines regions in multiple steps is explained below.

For example, in the image as shown in FIG. 27A, some block is determined as non edge as shown in FIG. 27B, whereas some other block is determined as edge as shown in FIG. 27C. Therefore, the two types of region exist together in the complicated manner in the image. When there is such existence in the image, as understood from FIG. 27B and FIG. 27C, values are different such that the density in a dots section of the restored image is "46" in the non-edge section and "36" in the edge section. The average density of the whole block is decreased from "23. 5" to "20". As a result, some parts in a dark color are spotted over the part of the dots section, or nonuniformity occurs. This nonuniformity is easily recognizable because it appears with changes in color of a color document. The example without considering color conversion is explained in FIG. 27, but by performing color conversion and executing quantization to a color-converted coefficient, the difference is generally more widened.

To solve the problem, there is provided a "smaller-value edge region" between an edge region and a non-edge region", and by allowing the regions to exist in multiple levels, such degradation is reduced. The smaller-value edge region is a region in which there is an edge within a block but the amplitude of a high frequency component is not so large. In this embodiment, three regions are determined as follows.

|YHL|>60 or |YLH|>60→edge region

|YHL|<16 or |YLH|<16→non-edge region

Other than these→smaller-value edge region

FIG. 28 shows allocation of bits (format) of a fixed-length code in each region in this embodiment. FIG. 29A and FIG. 29B show examples of vector tables for an edge region and a smaller-value edge region. The allocation of bits and the contents of each bit in the non-edge region are the same as shown in FIG. 25. The allocation of bits in the edge region is also the same as shown in FIG. 25. However, the contents of the vector YH is as shown in FIG. 29A. In the edge region of this embodiment, a vector component also includes a large value because the amplitude of a high frequency coefficient is large. The allocation of bits of a fixed-length code in the "smaller-value edge region" is an intermediate type between the edge region and the non-edge region as shown in FIG. 28. Namely, it is shown that YLL has 6 bits, and 1 bit of the 6 bits is absorbed by allocating 3 bits to the vector YH. YLL consists of 6 bits here by cutting off the low-order 2 bits of 8-bit YLL obtained through color conversion. Further the vector YH consists of 3 bits by subjecting it to quantization to the vector shown in FIG. 29B. In this embodiment, the edge region is separated from the smaller-value edge region and a different table is used for each of the regions, therefore, there is also a merit that vectors can be set so as to be suitable to each region.

Each region is determined by using the low-order 5 bits of a fixed-length code in this embodiment, and any value that is not used in 25 values representing UH and VH is used as a region flag. In this embodiment, "00000" is used as a region flag of the non-edge region, whereas "00001" is used as a region flag of a smaller-value edge region, and "00010-11010" are used, on the other hand, as 25 values representing UH and VH. Based on this configuration, by checking the low-order 5 bits of the compression code, the decoding side can determine the region. The configuration of blocks for the coder when the three-level regions are determined can be made as shown in FIG. 23.

Figure 30:
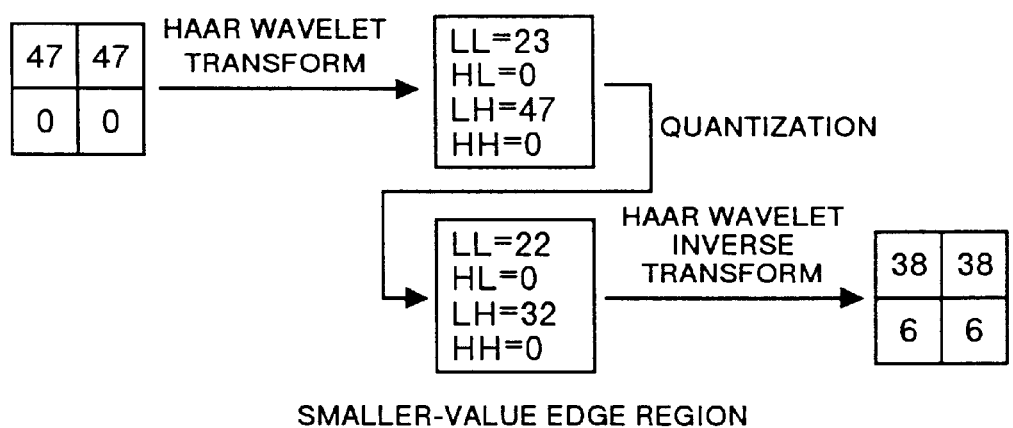
FIG. 30 shows how to decrease degradation in image quality due to existence of the regions.

The case, where degradation in image quality due to existence of different types of region in the image can be decreased by separating the regions into multiple levels as shown in this embodiment, is explained with reference to FIG. 30. The processing of color conversion is not taken into consideration for simplicity in explanation. Since the 2×2-pixel block shown in FIG. 30 is determined as a smaller-value edge region, the component LL is more accurately reproduced as compared to the case where it is determined as an edge region. Therefore, the density in the restored dots section is "38", which is closer to the original image, and also the average density as the overall block is "22", which is close to the average density "23.5" of the original image. Thus, in this embodiment, it is possible to decrease degradation in image quality due to existence of different types of region in the image.

Figure 39:
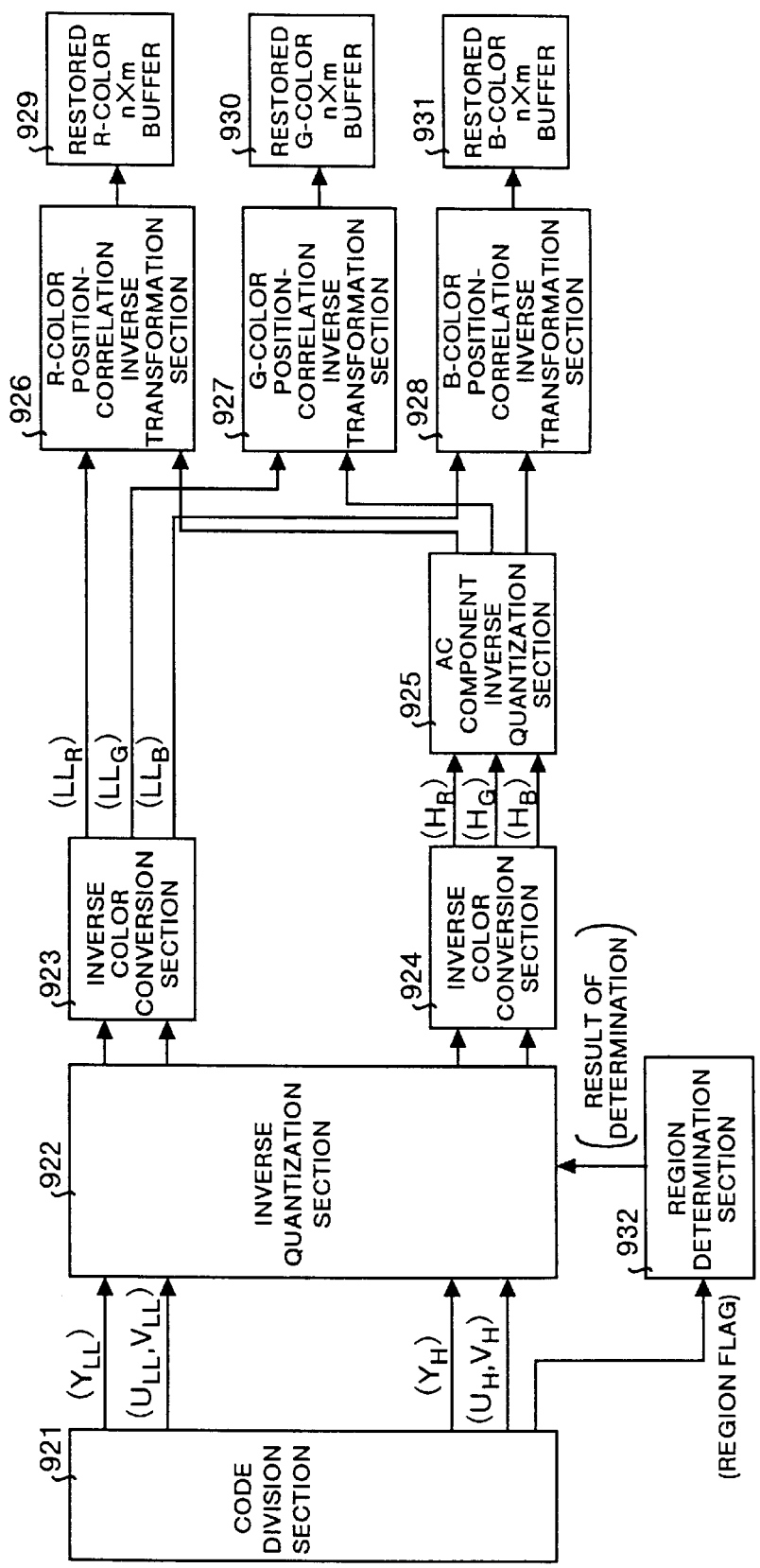
FIG. 39 is a block diagram showing a configuration of the decoder of the fifth embodiment.
Figure 40:
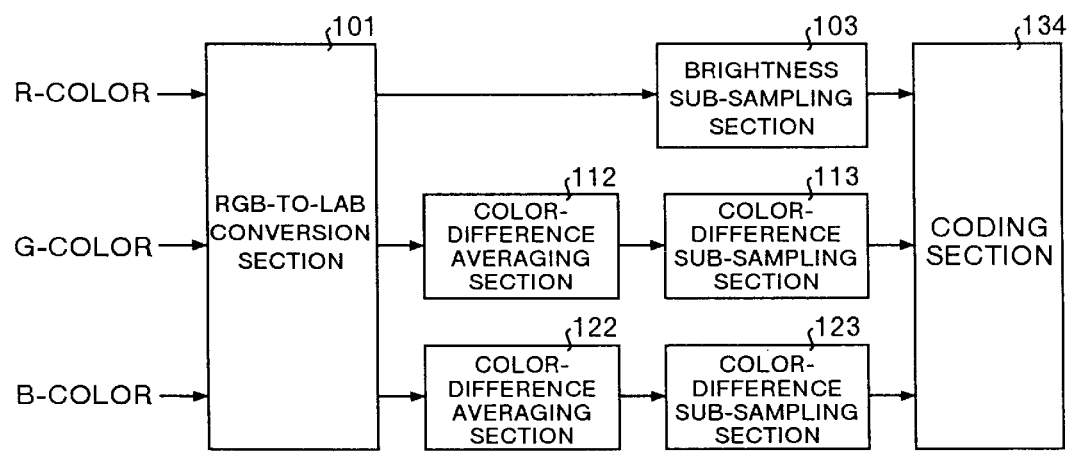
FIG. 40 shows coding of a color image based on the conventional uniform color spaces.
Figure 41:
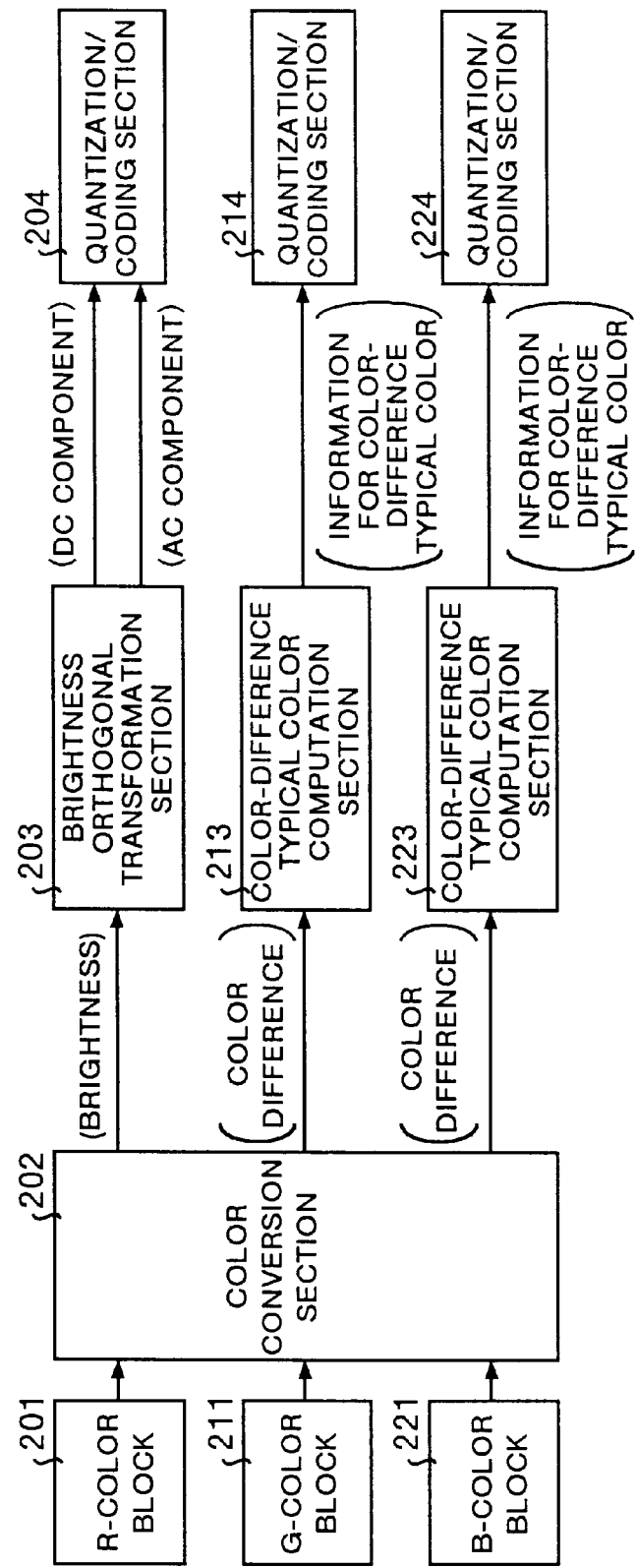
FIG. 41 shows coding of a color image based on the conventional art.
Figure 42:
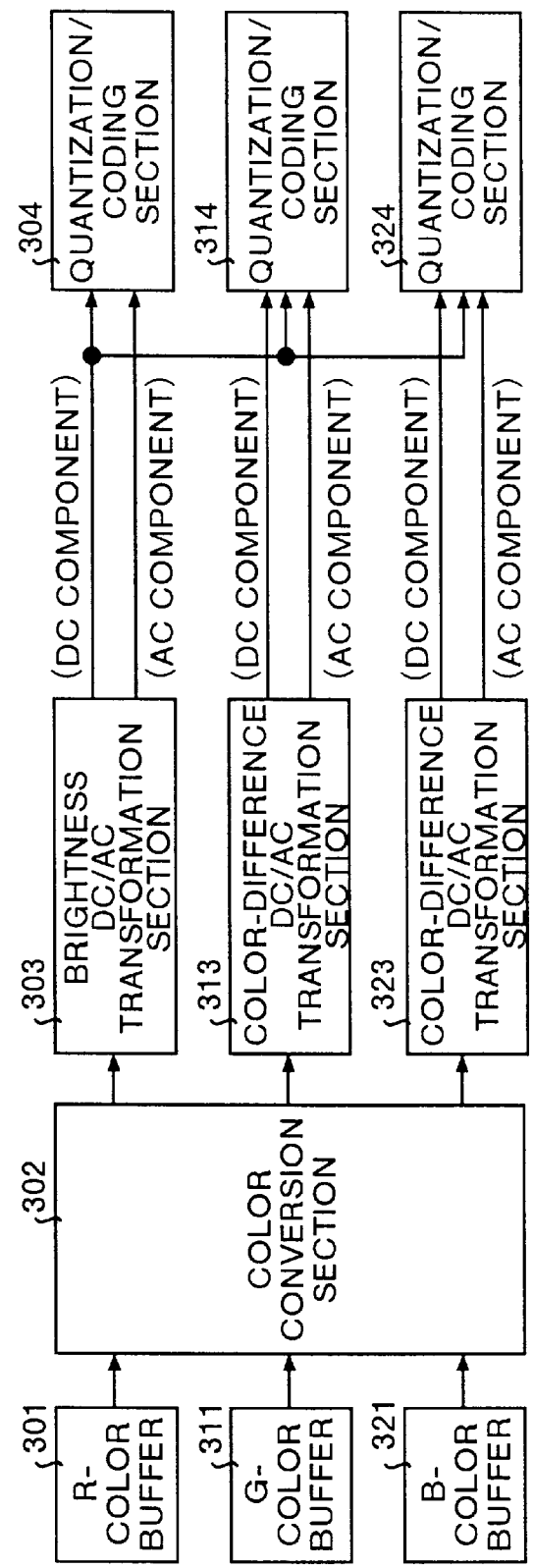
FIG. 42 shows coding of a color image based on the conventional art.

FIG. 39 is a block diagram showing a fifth embodiment of the decoder 404. The decoder 404 of the fifth embodiment shown in FIG. 31 decodes the compression code coded in the coder 402 (FIG. 23) of the fifth embodiment. The decoder 404 shown in FIG. 39 comprises a code division section 921, an inverse quantization section 922, a region determination section 932, an inverse color conversion section 923, an inverse color conversion section 924, and an AC component inverse quantization section 925. The decoder 404 further comprises a R-color position-correlation inverse transformation section 926, a G-color position-correlation inverse transformation section 927, a B-color position-correlation inverse transformation section 928, a restored R-color n×m buffer 929, a restored G-color n×m buffer 930, and a restored B-color n×m buffer 931.

The decoding method of the decoder 404 in FIG. 39 is explained below. The code division section 921 divides the compression code to YLL, ULL, VLL, YH, UH, and VH based on a code structure, by referring to the low-order 5 bits in the compression code for a 2×2-pixel block stored in the page memory 403. More specifically, the code division section 921 carries out code division in such a manner that, when the 5 bits are "00000", the region is determined as a non-edge region and the region is determined as an edge region when the 5 bits are a bit string other the bits. The coding section 921 then outputs the divided codes to the inverse quantization section 922, and also outputs the region flag to the region determination section 932. The region determination section 932 determines whether the region is an edge region or a non-edge region based on the region flag input from the code division section 921 to output the result of region determination to the inverse quantization section 922.

The inverse quantization section 922 performs inverse quantization by referring to the result of region determination in the region determination section 932, outputs the restored DC lightness signal YLL, and DC color signals ULL, VLL to the inverse color conversion section 923, and also outputs the restored AC lightness signal YH and AC color signals UH, VH to the inverse color conversion section 924. More specifically, by adding 3 bits to the low order of YLL 5 bits to be 8 bits in the edge section, and ULL and VLL are restored to 9 bits busing the table for inverse transformation of the non-linear quantization executed in the coding side. When 3 bits are added to the low order of the YLL 5 bits, it is desirable to add "100" as a median value thereto because the density may be decreased simply by adding "000"to the low-order bit through bit shift. As for YH, 13 vectors are restored in FIG. 6 based on the code values. As for UH, VH, nu and nv are restored from the code with 25 values in the inverse order of the processing for decoding.

On the other hand, concerning the non-edge section, 1 bit is added to the low order of YLL 7 bits to be 8 bits, and ULL and VLL are restored to 9 bits using the table for inverse transformation of the non-linear quantization executed in the coding side.

The inverse color conversion section 923 performs inverse conversion of YUV transform on the restored DC lightness signal YLL and DC color signals ULL and VLL, and outputs the restored LLR, LLG, and LLB to the R-color position-correlation inverse transformation section 926, the G-color position-correlation inverse transformation section 927, and the B-color position-correlation inverse transformation section 928, respectively.

The inverse color conversion section 924 performs inverse conversion of YUV transform on the restored AC lightness signal YH and AC color signals UH and VH, and outputs the restored HR, HG, and HB to the AC component inverse quantization section 925. The AC component inverse quantization section 925 performs inverse quantization on the restored HR, HG, and HB (in this case, HH=0 is added to each color), and outputs the values to the R-color position-correlation inverse transformation section 926, the G-color position-correlation inverse transformation section 927, and the B-color position-correlation inverse transformation section 928, respectively.

The R-color, the G-color, and the B-color position-correlation inverse transformation sections 926, 927, and 928 perform inverse transformation of the Haar wavelet transform on the restored (LLR, HR), (LLG, HG), and (LLB, HB), and store the values in the restored R-color, the restored G-color, and the restored B-color n×m buffers 929, 930, and 931, respectively. Thus, restoration is made in units of 2×2-pixel block. Further, when a large capacity of memory is available, by performing each inverse transformation using a table reference method, the processing time can be reduced.

Figure 31:
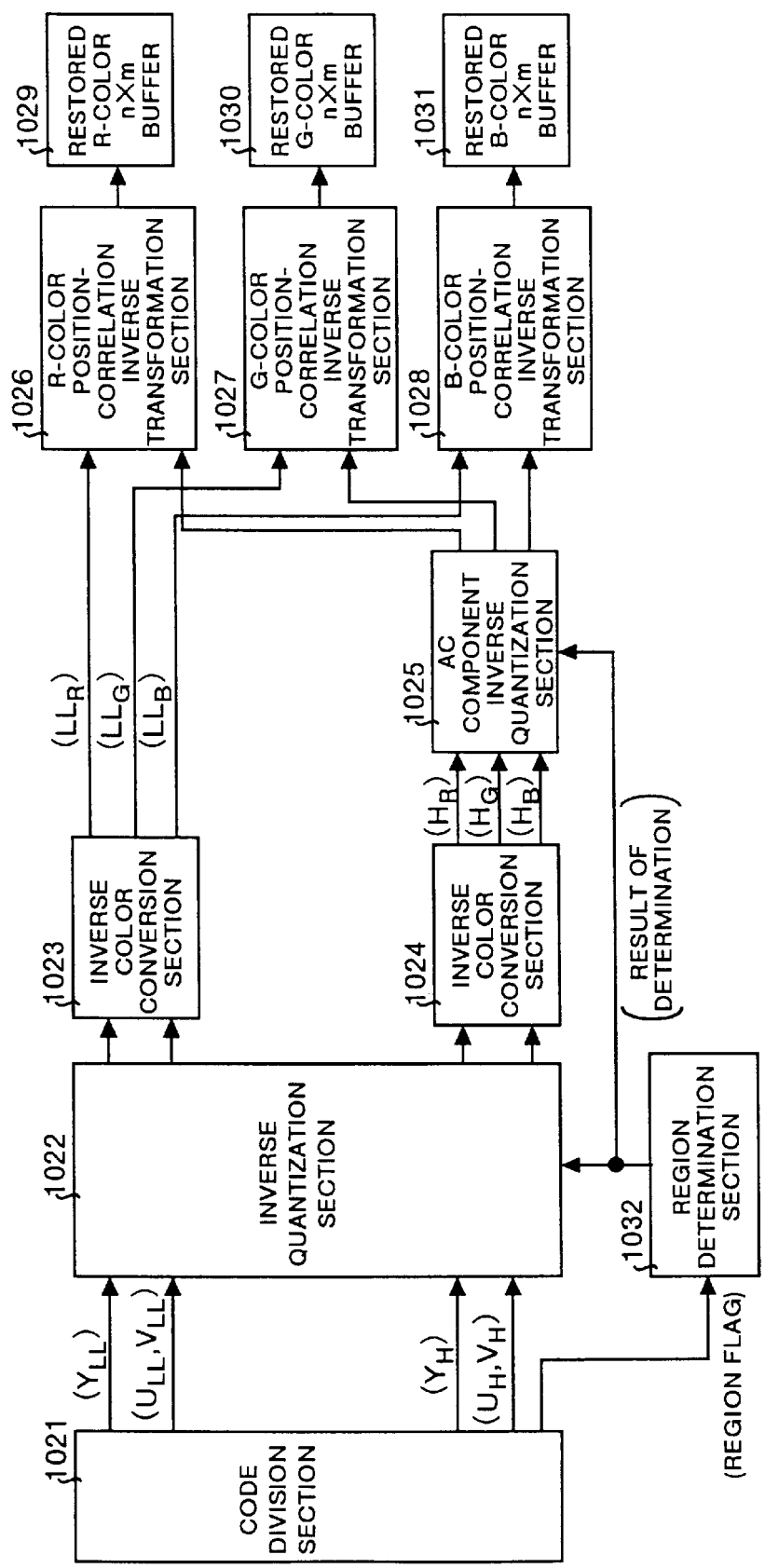
FIG. 31 is a block diagram showing another configuration of a decoder of the fifth embodiment.

As explained above, according to the decoder of the fifth embodiment, it is possible to restore the code information coded in the coder 402 of the fifth embodiment. FIG. 31 is a block diagram showing a configuration of a coder to restore the information coded in the coder in FIG. 26.

Sixth Embodiment

Figure 32:
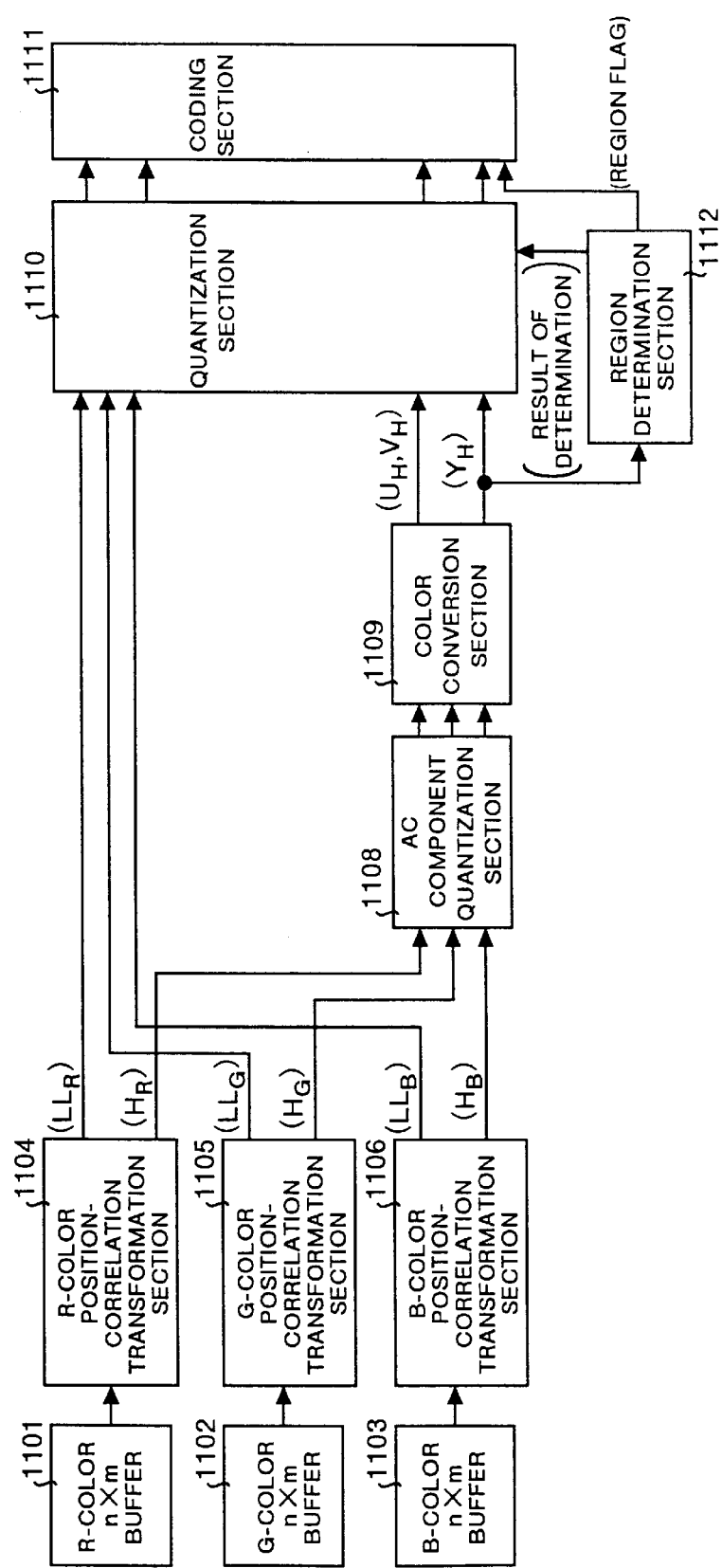
FIG. 32 is a block diagram showing a configuration of a coder of a sixth embodiment.

FIG. 32 is a block diagram showing a sixth embodiment of the coder 402. The coder 402 of the sixth embodiment is obtained by adding a region determination section to the coder 402 (FIG. 13) of the second embodiment (the configuration in which one of the color conversion sections in the fifth embodiment is removed). The sixth embodiment has the same configuration as that of the fifth embodiment except the fact that the DC component is not separated into a DC lightness signal and DC color signals. Therefore, explanation in detail is omitted.

The coder 402 shown in FIG. 32 comprises a R-color n×m buffer 1101, a G-color n×m buffer 1102, and a B-color n×m buffer 1103 that temporarily store image data composed of the R-, G-, B-color components (e.g., 1 pixel consists of 8 bits for each color) that is input from the scanner 401 in each n×m unit (e.g., in units of 2×2-pixel block). The coder 402 further comprises a R-color position-correlation transformation section 1104, a G-color position-correlation transformation section 1105, and a B-color position-correlation transformation section 1106 that perform transformation using position correlation on the components (RGB) stored in the R-, G-, B-color n×m buffers 1101, 1102, and 1103, separate each data into a DC component and AC components for each color, output DC components to a quantization section 1110, and output AC components to an AC component quantization section 1108.

The coder 402 shown in FIG. 32 also comprises the AC component quantization section 1108 that performs the quantization in the first step on the AC components of the components input from the R-color, G-color, and B-color position-correlation transformation sections 1104, 1105, and 1106, and outputs the quantized values to a color conversion section 1109. The coder 402 further comprises the color conversion section 1109 that performs color conversion (separation of lightness from color) on the AC components of the components, quantized in the first step, input from the AC component quantization section 1108 to generate an AC lightness signal and AC color signals, outputs the AC lightness signal and the AC color signals to the quantization section 1110, and also outputs the AC lightness signal to a region determination section 1112. The coder 402 further comprises the region determination section 1112 that determines any region based on the AC lightness signal input from the color conversion section 1109, outputs the result of region determination to the quantization section 1110, and also output a region flag to a coding section 1111. The coder 402 further comprises the quantization section 1110 that performs quantization on the DC signals input from the R-color, G-color, B-color position-correlation transformation sections 1104, 1105, and 1106 based on the result of region determination, and also performs quantization in the second step on the AC lightness signals and the AC color signals input from the color conversion section 1109 to output the quantized values to the coding section 1111. The coder 402 also comprises the coding section 1111 that puts together the information (units of 2×2-pixel) quantized in the quantization section 1110 to create a fixed-length code, and stores the code in the page memory 403.

According to the coder 402 of the sixth embodiment, since quantization is performed without color conversion executed to a DC component, the non-linear quantization table is not required not only in the coding side but also in the decoding side. Only bit shift may be required for quantization/inverse quantization performed on the DC component, thus a circuit configuration can be simplified.

Figure 33:
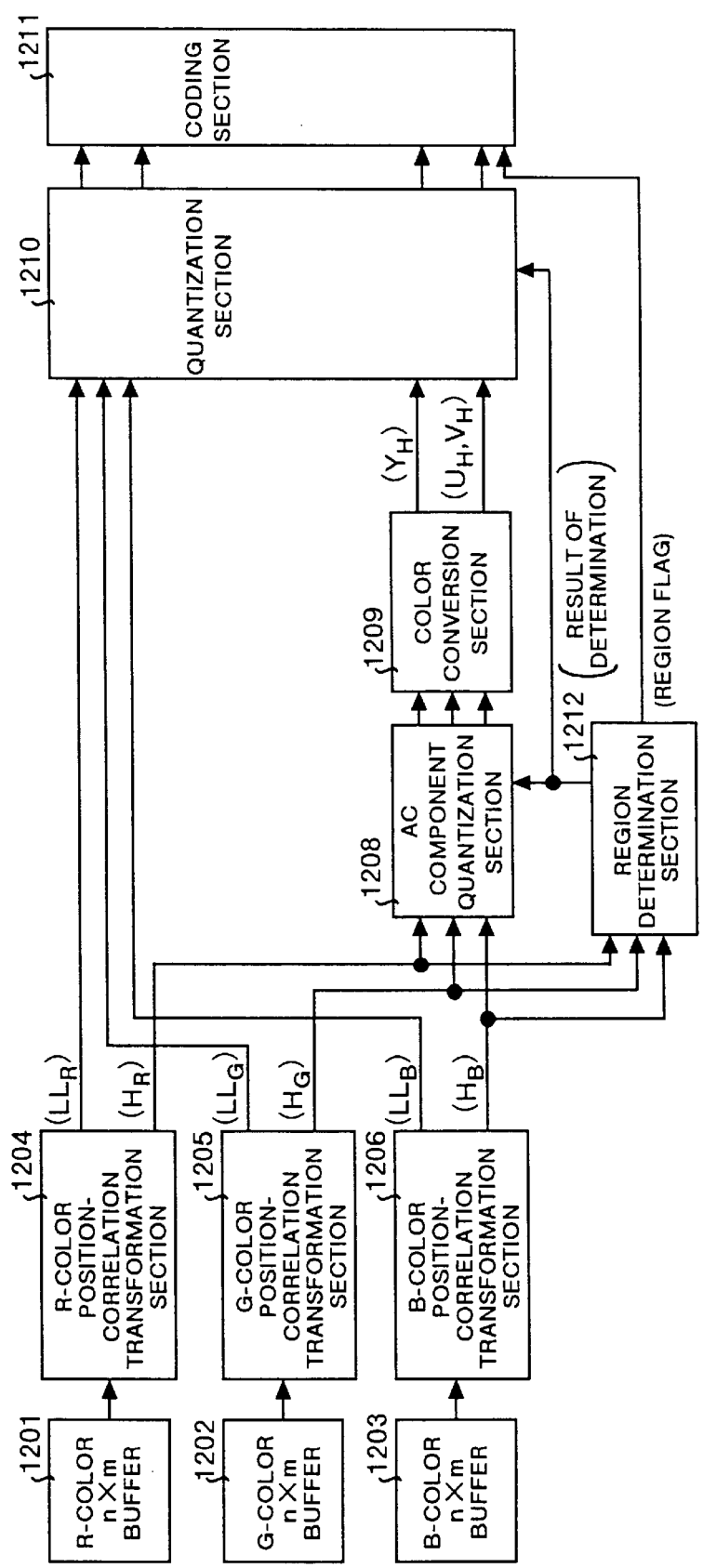
FIG. 33 is a block diagram showing another configuration of the coder of the sixth embodiment.

When the result of region determination is required to be reflected to quantization in an AC component quantization section, HR, HG, HB may be used for the determination. FIG. 33 is a block diagram showing a configuration of a coder when a region is determined using HR, HG, HB. The configuration and the functions of the coder shown in FIG. 33 are the substantially same as those of the coder in FIG. 32. Therefore, only different points are explained below. In FIG. 33, a region determination section 1212 determines a region (edge region, non-edge region) of a 2×2-pixel block based on the AC components HR, HG, and HB input from R-color, G-color, B-color position-correlation transformation sections 1204, 1205, and 1206, and outputs the result of determination to a quantization section 1210 and also to an AC component quantization section 1208. The AC component quantization section 1208 performs quantization on AC components based on the result of region determination.

Figure 34:
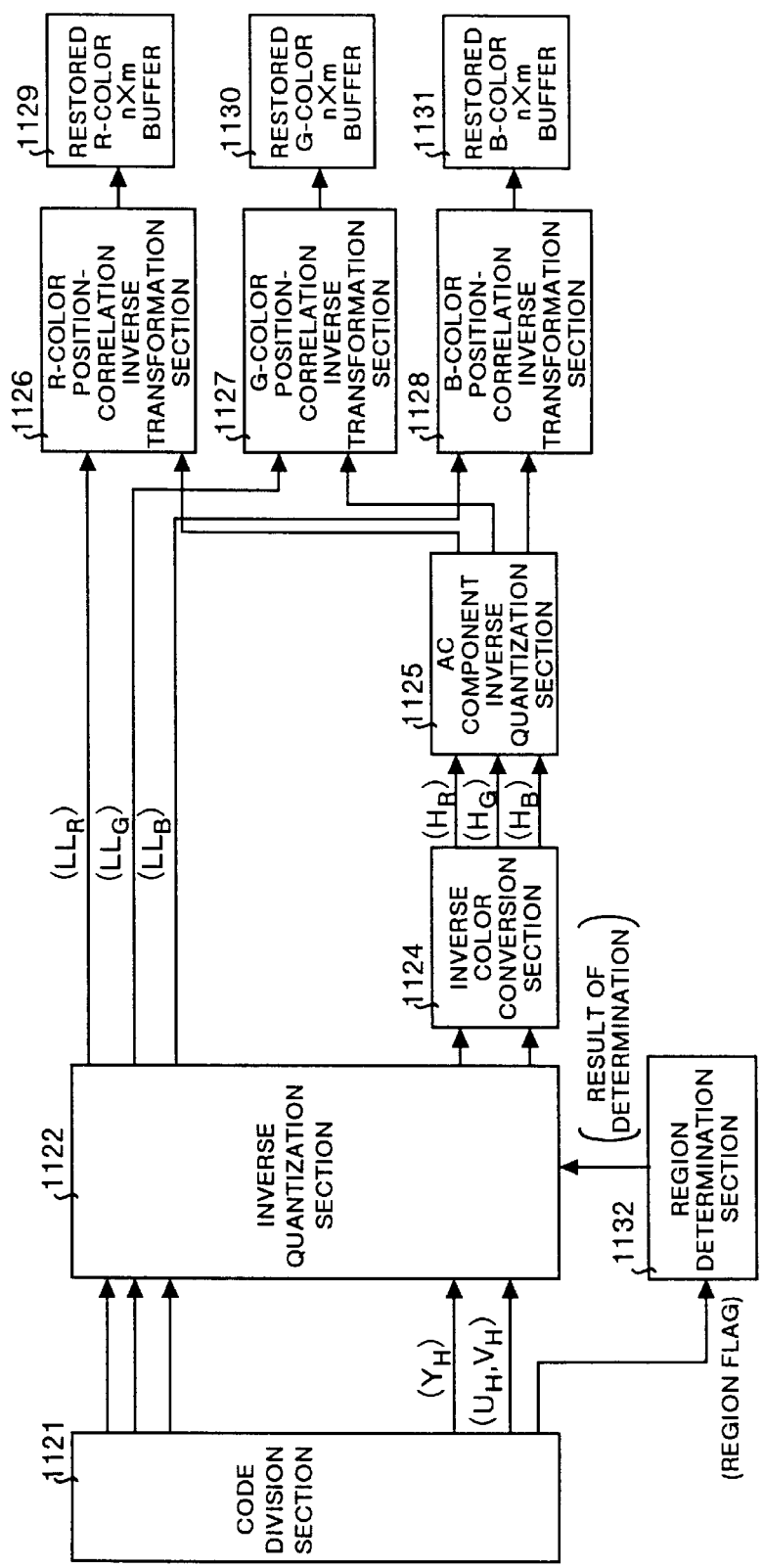
FIG. 34 is a block diagram showing a configuration of a decoder of the sixth embodiment.
Figure 35:
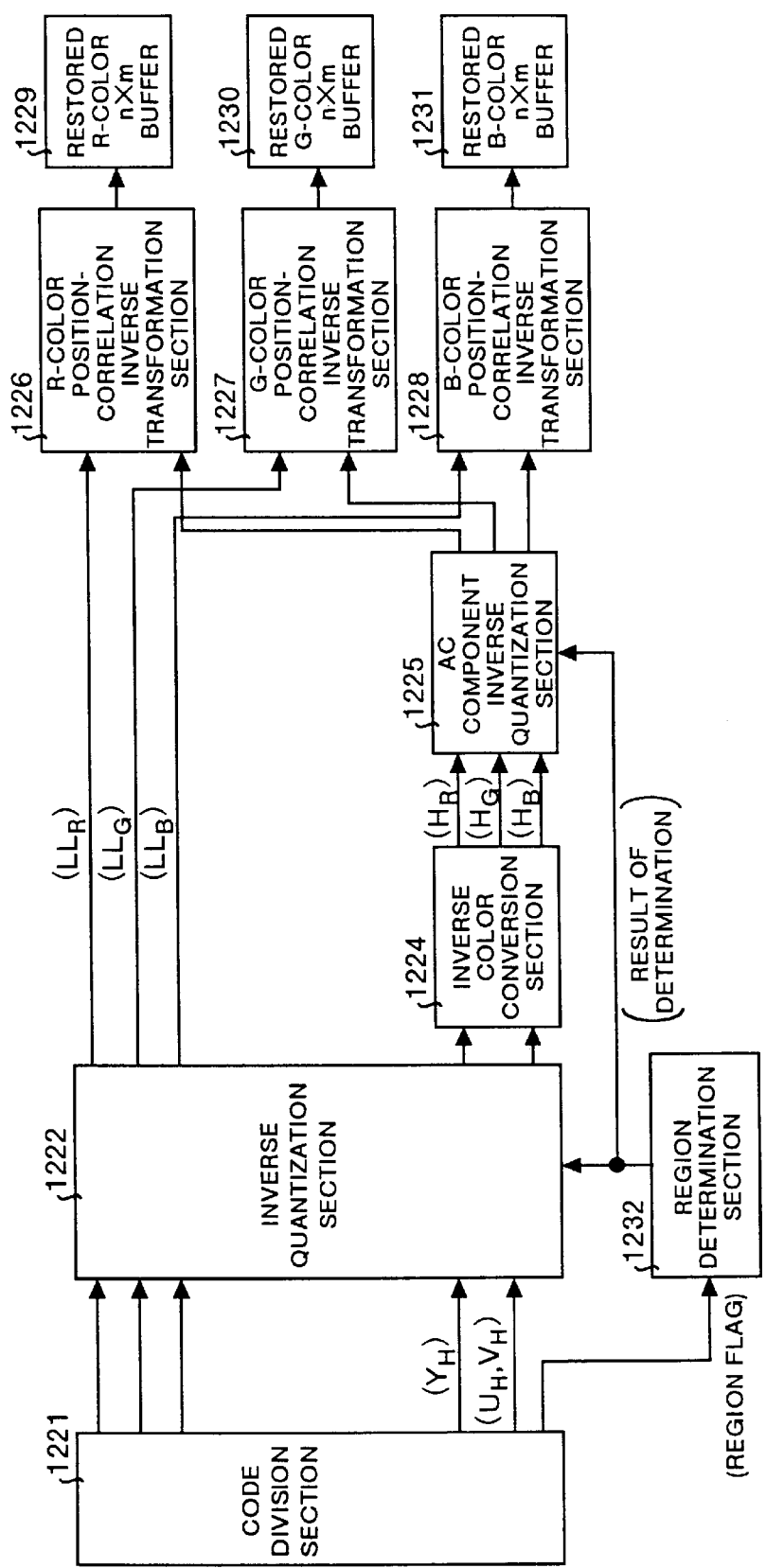
FIG. 35 is a block diagram showing another configuration of the decoder of the sixth embodiment.

FIG. 34 is a block diagram showing a sixth embodiment of the decoder 404. The decoder 404 of the sixth embodiment shown in FIG. 34 decodes the compression code coded in the coder 402 of the sixth embodiment. The decoder 404 shown in FIG. 34 comprises a code division section 1121, an inverse quantization section 1122, a region determination section 1132, an inverse color conversion section 1124, and an AC component inverse quantization section 1125. The decoder 404 further comprises a R-color position-correlation inverse transformation section 1126, a G-color position-correlation inverse transformation section 1127, a B-color position-correlation inverse transformation section 1128, a restored R-color n×m buffer 1129, a restored G-color n×m buffer 1130, and a restored B-color n×m buffer 1131. FIG. 35 is a block diagram showing a configuration of a decoder to restore the information coded in the coder in FIG. 33.

The coding method and the decoding method for the coder 402 and the decoder 404 according to the first embodiment to the sixth embodiment may be realized by executing a prepared program by a personal computer or any computer (CPU and so forth) such as a work station or an image formation device. This program is executed by being read from a computer-readable recording medium such as a hard disk, a floppy disk, a CD-ROM, an MO, and a DVD. Further, this program can be distributed through the recording medium as a transmission medium via a network such as the Internet.

It is to be understood that the present invention is not limited by the embodiments and may be embodied in modified forms without departing from the spirit of the invention.

As explained above, according to one aspect of this invention, the first transformation unit transforms the information for each component by using a one-dimensional or two-dimensional position correlation of an image so that bias is generated in the amount of information, and the second transformation unit transforms the information transformed by the first transformation unit to obtain a lightness signal and color signals. The quantization unit then performs quantization on the coefficients obtained through transformation by the first transformation unit and/or the second transformation unit. Therefore, by utilizing a position correlation of each component before color conversion is executed and then performing color conversion, it is possible to simplify the coding circuit and also simplify the processing for quantization.

According to another aspect of this invention, the separation unit separates the information for each component into a DC component and AC components by predetermined block, the transformation unit transforms the AC component separated by the separation unit to a lightness signal and color signals to obtain an AC lightness signal and AC color signals. The quantization unit then performs quantization on the AC lightness signal and/or the AC color signals obtained by the transformation unit. Therefore, since color conversion is not executed to DC components of colors, all the quantization to the DC components can be performed in a simple bit cutting-off method, thus, the table for non-linear quantization or the like is not required to be prepared. Further, since the DC component is not color-converted, a color conversion circuit for a DC component can be reduced.

According to still another aspect of this invention, the separation unit separates the information for each component into a DC component and AC components by predetermined block, and the AC component quantization unit performs quantization on the AC component separated by the separation unit. The first transformation unit transforms the DC component separated by the separation unit to a lightness signal and color signals to obtain a DC lightness signal and DC color signals, and the second transformation unit transforms the AC component quantized by the first quantization unit to a lightness signal and color signals to obtain an AC lightness signal and AC color signals. The quantization unit then performs quantization on the AC lightness signal and/or the AC color signals transformed by the second transformation unit. Therefore, the circuit scale can be reduced without decreasing in coding efficiency as compared to the conventional method.

According to still another aspect of this invention, the separation unit separates the information for each component into a DC component and AC components by predetermined block, the transformation unit transforms the DC component separated by the separation unit to a lightness signal and color signals to obtain a DC lightness signal and DC color signals, and the quantization unit performs quantization on the AC component separated by the separation unit. Therefore, the AC component separated by the separation unit is quantized as it is, thus, it is possible to simplify the coding section and also simplify the processing of quantization.

Further, when an AC lightness signal and/or AC color signals are quantized, the quantization unit performs vector quantization on the signals. Therefore, in addition to the above explained effect due to the invention, processing efficiency can be improved.

Further, when an AC lightness signal and AC color signals are quantized, the quantization unit performs quantization on the ratio between the AC lightness signal and each of the AC color signals. Therefore, in addition to the above explained effect due to the invention, processing efficiency can be improved.

Further, the quantization unit performs vector quantization on a specific color that has an edge with the largest value of the AC components, and performs, concerning the other colors, quantization on the ratio between the AC component of the other color and the vector of the specific color. Therefore, in addition to the above explained effect due to the invention, the inconvenience that the edge disappears at the time of compression can be resolved.

Further, the quantization unit sets a threshold value to a value larger than a median of quantized values when vector quantization is performed. Therefore, in addition to the above explained effect due to the invention, occurrence of Moire in a dots section can be prevented.

Further, the AC component quantization unit performs quantization by cutting off low-order bits of one coefficient or all coefficients of the AC component. Therefore, in addition to the above explained effect due to the invention, the scale of color conversion circuits can be minimized.

Further, the AC component quantization unit cuts off any coefficient corresponding to a slant edge of an image. Therefore, in addition to the above explained effect due to the invention, the amount of data can be reduced with no degradation in image quality.

Further, the separation unit performs transformation by referring to only pixels within a predetermined block as a unit to be transformed. Therefore, in addition to the above explained effect due to the invention, the number of access times to the memory can be reduced, which allows transfer efficiency to be enhanced.

Further, the separation unit performs Haar wavelet transform. Therefore, in addition to the above explained effect due to the invention, transformation can be easier.

According to still another aspect of this invention, the transformation unit performs BTC-transformation on the information for each component by predetermined block, the color conversion unit performs color conversion on the BTC-transformed information, and the quantization unit performs quantization on the information color-converted by the color conversion unit. Therefore, it is possible to simplify the coding circuit and also simplify the processing for quantization.

According to still another aspect of this invention, the first transformation unit transforms the information for each component by using a one-dimensional or two-dimensional position correlation of an image in each predetermined block so that bias is generated in the amount of information. The second transformation unit transforms the information transformed by the first transformation unit to obtain a lightness signal and color signals. The region determination unit then determines any region of the image in each of the predetermined blocks. The quantization unit performs different quantization for each region on the coefficients obtained through transformation by the first transformation unit and/ or the second transformation unit based on the result of determination in the region determination unit. The flag information creation unit then creates flag information to identify the region determined by the region determination unit. Therefore, it is possible to simplify the coding circuit and also simplify the processing for quantization, which allows compression with less degradation in image quality to be performed.

According to still another aspect of this invention, the separation unit separates the information for each component into a DC component and AC components by predetermined block, and the first quantization unit performs quantization on the AC component separated by the separation unit. The transformation unit transforms the AC component quantized by the first quantization unit to a lightness signal and color signals to obtain an AC lightness signal and AC color signals. The region determination unit determines which region of a plurality of regions the predetermined block belongs to based on the magnitude of at least one amplitude of the AC component, the AC lightness signal, and the AC color signals in each predetermined block. The second quantization unit performs different quantization for each region on the AC lightness signal and/or the AC color signals based on the result of determination in the region determination unit. The flag information creation unit then creates flag information to identify the region determined by the region determination unit. Therefore, it is possible to simplify the coding circuit, simplify the processing for quantization, and also accurately determine a region, which allows compression with less degradation in image quality to be achieved.

Further, the second quantization unit performs quantization on the AC lightness signal or the AC color signals more roughly in the region whose amplitude is smaller. Therefore, in addition to the above explained effect due to the invention, compression with less degradation in image quality according to a region can be performed.

Further, the region determination unit determines an edge region and a non-edge region. Therefore, in addition to the above explained effect due to the invention, compression according to an edge region and a non-edge region becomes possible.

Further, the region determination unit determines regions in n-levels (n: integer of 3 or more). Therefore, it is possible to decrease degradation in image quality due to existence of the regions in the image.

Further, the flag information may be bits dedicated to a flag, or may be formed together with a code that represents a coefficient value. Therefore, in addition to the above explained effect due to the invention, the flag information can be simplified.

Further, a fixed-length code is generated as code information. Therefore, in addition to the above explained effect due to the invention, processing efficiency can be improved.

According to still another aspect of this invention, the inverse quantization unit performs inverse quantization on code information to restore an AC lightness signal, AC color signals, a DC lightness signal, and DC color signals. The first inverse color conversion unit performs inverse color conversion on the AC lightness signal and the AC color signals to restore an AC signal, and the second inverse color conversion unit performs inverse color conversion on the DC lightness signal and the DC color signals to restore a DC signal. The AC inverse quantization unit performs inverse quantization on the AC signal restored in the first inverse color conversion unit, and the position-correlation inverse transformation unit performs inverse transformation of position correlation on the DC signal restored in the second inverse color conversion unit and the AC signal inverse-quantized in the AC inverse quantization unit to restore each component of a color image. Therefore, the code information can be restored with a simple circuit configuration and restoration method.

According to still another aspect of this invention, the inverse quantization unit performs inverse quantization on code information to restore an AC lightness signal, AC color signals, and a DC signal, and the first inverse color conversion unit performs inverse color conversion on the AC lightness signal and the AC color signals to restore an AC signal. The AC inverse quantization unit performs inverse quantization on the AC signal restored in the first inverse color conversion unit, and the position-correlation inverse transformation unit performs inverse transformation of position correlation on the DC signal and the AC signal inverse-quantized in the AC inverse quantization unit to restore each component of a color image. Therefore, the code information can be restored with a simple circuit configuration and restoration method.

According to still another aspect of this invention, the inverse quantization unit performs inverse quantization on code information, the inverse color conversion unit performs inverse color conversion on the information inverse-quantized in the inverse quantization unit, and an inverse BTC unit performs inverse BTC-transformation on the information inverse-color-converted in the inverse color conversion unit to restore each component of a color image. Therefore, the code information can be restored with a simple circuit configuration and restoration method.

According to still another aspect of this invention, the region determination unit determines any region to which code information belongs from flag information, and the inverse quantization unit performs different inverse quantization for each region on the code information for the predetermined block based on the result of determination in the region determination unit to restore a DC lightness signal, DC color signals, an AC lightness signal, and AC color signals. The first inverse color conversion unit performs inverse color conversion on the AC lightness signal and the AC color signals to restore an AC signal, and the second inverse color conversion unit performs inverse color conversion on the DC lightness signal and the DC color signals to restore a DC signal. The AC inverse quantization unit performs inverse quantization on the AC signal restored in the first inverse color conversion unit, and the position-correlation inverse transformation unit performs inverse transformation of position correlation on the DC signal restored in the second inverse color conversion unit and the AC signal inverse-quantized in the AC inverse quantization unit to restore each component of a color image. Therefore, the code information can be restored with a simple circuit configuration and restoration method.

According to still another aspect of this invention, the region determination unit determines any region to which code information belongs from flag information, and the inverse quantization unit performs different inverse quantization for each region on the code information for the predetermined block based on the result of determination in the region determination unit to restore a DC lightness signal, DC color signals, an AC lightness signal, and AC color signals. The first inverse color conversion unit performs inverse color conversion on the AC lightness signal and the AC color signals to restore an AC signal. The position-correlation inverse transformation unit performs inverse transformation of position correlation on the DC signal restored in the inverse quantization unit and the AC signal restored in the first inverse color conversion unit to restore each component of a color image. Therefore, the code information can be restored with a simple circuit configuration and restoration method.

Further, the inverse quantization unit uses a median value when a DC lightness signal is to be restored. Therefore, in addition to the above explained effect due to the invention, changes in density can be reduced, which allows an S/N ratio to be enhanced.

According to still another aspect of this invention, the information for each component is transformed by using a one-dimensional or two-dimensional position correlation of an image so that bias is generated in the amount of information, the transformed information is further transformed to obtain a lightness signal and color signals, and the obtained coefficients are quantized. Therefore, it is possible to simplify the coding steps and also simplify the processing for quantization.

According to still another aspect of this invention, the information for each component is separated into a DC component and AC components by predetermined block, the separated AC components are transformed to a lightness signal and color signals to obtain an AC lightness signal and AC color signals, and the AC lightness signal and/or the AC color signals are quantized. Therefore, since the DC component is not color-converted, the color converting step of the DC component can be reduced.

According to still another aspect of this invention, the information for each component is separated into a DC component and AC components by predetermined block, the separated AC components are quantized, and the separated DC component is transformed to a lightness signal and color signals to obtain a DC lightness signal and DC color signals. The quantized AC components are transformed to a lightness signal and color signals to obtain an AC lightness signal and AC color signals, and the transformed AC lightness signal and/or AC color signals are further quantized. Therefore, the number of processing steps can be reduced without decreasing in coding efficiency as compared to the conventional method.

According to still another aspect of this invention, the information for each component is separated into a DC component and AC components by predetermined block, the separated DC component is transformed to a lightness signal and color signals to obtain a DC lightness signal and DC color signals, and the separated AC signal is quantized. Therefore, it is possible to simplify the coding steps and also simplify the processing for quantization.

According to still another aspect of this invention, the information for each component is BTC-transformed by predetermined block, the BTC-transformed information is color-converted, and the color-converted information is quantized. Therefore, it is possible to simplify the coding steps and also simplify the processing for quantization.

According to still another aspect of this invention, the information for each component is transformed by using a one-dimensional or two-dimensional position correlation of an image in each predetermined block so that bias is generated in the amount of information. The transformed information is further transformed to obtain a lightness signal and color signals, any region of the image is determined in each of the predetermined blocks, different quantization for each region is performed on the coefficients obtained through transformation based on the result of determination on the region, and flag information to identify the determined region is created. Therefore, it is possible to simplify the coding steps and also simplify the processing for quantization, which allows compression with less degradation in image quality to be performed.

According to still another aspect of this invention, the information for each component is separated into a DC component and AC components by predetermined block, the separated AC components are quantized, the quantized AC components are transformed to a lightness signal and color signals to obtain an AC lightness signal and AC color signals. It is determined which region of a plurality of regions the predetermined block belongs to based on the magnitude of at least one amplitude of the AC components, the AC lightness signal, and the AC color signals in each of the predetermined blocks. Different quantization for each region is performed on the AC lightness signal and/or the AC color signals based on the result of determination on the region, and flag information to identify the determined region is created. Therefore, it is possible to simplify the coding steps, simplify the processing for quantization, and also accurately determine the region, which allows compression with less degradation in image quality to be performed.

According to still another aspect of this invention, code information is inversely quantized to restore an AC lightness signal, AC color signals, a DC lightness signal, and DC color signals. Inverse color conversion is performed on the AC lightness signal and the AC color signals to restore an AC signal, and inverse color conversion is performed on the DC lightness signal and the DC color signals to restore a DC signal. Inverse quantization is performed on the restored AC signal, and inverse transformation of position correlation is performed on the restored the DC signal and the inverse-quantized AC signal to restore each component of a color image. Therefore, the code information can be restored by the simple decoding steps and restoration method.

According to still another aspect of this invention, code information is inversely quantized to restore an AC lightness signal, AC color signals, and a DC signal. Inverse color conversion is performed on the AC lightness signal and the AC color signals to restore an AC signal, and the restored AC signal is inversely quantized. Inverse transformation of position correlation is performed on the restored DC signal and the inverse-quantized AC signal to restore each component of a color image. Therefore, the code information can be restored by the simple decoding steps and restoration method.

According to still another aspect of this invention, code information is inversely quantized, inverse color conversion is performed on the inverse-quantized information, and inverse BTC-transformation is performed on the inverse-color-converted information to restore each component of a color image. Therefore, the code information can be restored by the simple decoding steps and restoration method.

According to still another aspect of this invention, any region to which code information belongs is determined from flag information, and different inverse quantization for each region is performed on the code information for the predetermined block based on the result of determination on the region to restore a DC lightness signal, DC color signals, an AC lightness signal, and AC color signals. Inverse color conversion is performed on the AC lightness signal and the AC color signals to restore an AC signal, and inverse color conversion is performed on the DC lightness signal and the DC color signals to restore a DC signal. The restored AS signal is further inversely quantized, and inverse transformation of position correlation is performed on the inverse-quantized AC signal and the restored DC signal to restore each component of a color image. Therefore, the code information can be restored by the simple decoding steps and restoration method.

According to still another aspect of this invention, any region to which code information belongs is determined from flag information, and different inverse quantization for each region is performed on the code information for the predetermined block based on the result of determination on the region to generate a DC signal, an AC lightness signal, and AC color signals. Inverse color conversion is performed on the AC lightness signal and the AC color signals to restore an AC signal, and the restored AC signal is inversely quantized. Inverse transformation of position correlation is performed on the restored DC signal and the inverse-quantized AC signal to restore each component of a color image. Therefore, the code information can be restored by the simple decoding steps and restoration method.

According to still another aspect of this invention, the program recorded in a recording medium is executed by a computer to realize the steps of the above explained invention. Therefore, by executing the program recorded in the recording medium, the steps of the invention can be realized.

The present document incorporated by reference the entire contents of Japanese priority document, 11-129147 filed in Japan on May 10, 1999 and 2000-131322 filed in Japan on Apr. 28, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A coding apparatus which compresses a color image including a plurality of components as color components that form a color image to generate code information, said apparatus comprising:
   a first transformation unit which transforms information for each component by using a one-dimensional or two-dimensional position correlation of an image so that bias is generated in the amount of information;
   a second transformation unit which transforms the information transformed by said first transformation unit to obtain a lightness signal and color signals; and
   a quantization unit which performs quantization on a plurality of coefficients obtained through transformation by said first transformation unit and/or said second transformation unit,
   wherein at least one of the coefficients that corresponds to a slant edge of the color image is not transformed by the second transformation unit.

2. The coding apparatus according to claim 1, wherein a fixed length code is generated as the code information.

3. A coding apparatus which compresses a color image including a plurality of components as color components that form a color image to generate code information, said apparatus comprising:
   a separation unit which separates information for each component into a DC component and AC components in each predetermined block;
   a transformation unit which transforms the AC components separated by said separation unit to a lightness signal and color signals to obtain an AC lightness signal and AC color signals; and
   a quantization unit which performs quantization on the AC lightness signal and/or the AC color signals obtained by said transformation unit,
   wherein when the AC lightness signal and AC color signals are quantized, said quantization unit performs quantization on a ratio between the AC lightness signal and each of the AC color signals.

4. The coding apparatus according to claim 3, wherein when an AC lightness signal and/or AC color signals are quantized, said quantization unit performs vector quantization on the signals.

5. The coding apparatus according to claim 3, wherein said quantization unit sets a threshold value to a value larger than a median point of quantized values when vector quantization is performed.

6. The coding apparatus according to claim 3, wherein said separation unit performs transformation by referring to only pixels within a predetermined block as a unit to be transformed.

7. The coding apparatus according to claim 3, wherein a fixed length code is generated as the code information.

8. A coding apparatus which compresses a color image including a plurality of components as color components that form a color image to generate code information, said apparatus comprising:
   a separation unit which separates information for each component into a DC component and AC components in each predetermined block;
   an AC component quantization unit which performs quantization on the AC components separated by said separation unit;
   a first transformation unit which transforms the DC component separated by said separation unit to a lightness signal and color signals to obtain a DC lightness signal and DC color signals;
   a second transformation unit which transforms the AC components quantized by said first quantization unit to a lightness signal and color signals to obtain an AC lightness signal and AC color signals; and
   a quantization unit which performs quantization on the AC lightness signal and/or the AC color signals transformed by said second transformation unit.

9. The coding apparatus according to claim 8, wherein when an AC lightness signal and/or AC color signals are quantized, said quantization unit performs vector quantization on the signals.

10. The coding apparatus according to claim 8, wherein when an AC lightness signal and AC color signals are quantized, said quantization unit performs quantization on the ratio between the AC lightness signal and each of the AC color signals.

11. The coding apparatus according to claim 8, wherein said quantization unit sets a threshold value to a value larger than the median point of quantized values when vector quantization is performed.

12. The coding apparatus according to claim 8, wherein said AC component quantization unit performs quantization on the AC component by cutting off a low order bit of one coefficient or all coefficients.

13. The coding apparatus according to claim 8, wherein said AC component quantization unit deletes any coefficient corresponding to a slant edge of an image.

14. The coding apparatus according to claim 8, wherein said separation unit performs transformation by referring to only pixels within a predetermined block as a unit to be transformed.

15. The coding apparatus according to claim 8, wherein a fixed length code is generated as the code information.

16. A coding apparatus for a color image which compresses a color image including a plurality of components as color components that form a color image, said apparatus comprising:
   a separation unit which separates information for each component into a DC component and AC components in each predetermined block;
   a transformation unit which transforms the DC component separated by said separation unit to a lightness signal and color signals to obtain a DC lightness signal and DC color signals; and
   a quantization unit which performs quantization on the AC components separated by said separation unit,
   wherein said quantization unit performs vector quantization on a specific color that has an edge with a largest value of the AC components, and performs quantization on a ratio between a component of another color and a vector of the specific color.

17. The coding apparatus according to claim 16, wherein said quantization unit sets a threshold value to a value larger than a median point of quantized values when vector quantization is performed.

18. The coding apparatus according to claim 16, wherein said separation unit performs transformation by referring to only pixels within a predetermined block as a unit to be transformed.

19. The coding apparatus according to claim 18, wherein said separation unit performs Haar wavelet transform.

20. The coding apparatus according to claim 16, wherein a fixed length code is generated as the code information.

21. A coding apparatus for compressing a color image including a plurality of color components that form the color image, to generate code information, said apparatus comprising:
   a transformation unit configured to perform a block truncation coding transformation on image data for each color component in each predetermined block to produce average density data, gradation width index data, and quantized value data for each color component;
   a color conversion unit configured to perform color conversion on the average density data, the gradation width index data, and the quantized value data for each color component by correlating the color components so as to bias the converted average density data, the converted gradation width index data, and the converted quantized value data; and
   a quantization unit configured to perform quantization on the converted average density data, the converted gradation width index data, and the converted quantized value data to generate said code information.

22. The coding apparatus according to claim 21, wherein a fixed length code is generated as the code information.

23. A coding apparatus for a color image which compresses a color image including a plurality of components as color components that form a color image to generate code information, said apparatus comprising:
   a first transformation unit which transforms information for each component by using a one-dimensional or two-dimensional position correlation of an image in each predetermined block so that bias is generated in the amount of information;
   a second transformation unit which transforms the information transformed by said first transformation unit to obtain a lightness signal and color signals;
   a region determination unit which determines any region of the image in each of said predetermined blocks;
   a quantization unit which performs different quantization for each region on the coefficients obtained through transformation by said first transformation unit and/or said second transformation unit based on the result of determination in said region determination unit; and
   a flag information creation unit which creates flag information to identify the region determined by said region determination unit.

24. The coding apparatus according to claim 23, wherein said region determination unit determines an edge region and a non-edge region.

25. The coding apparatus according to claim 23, wherein said region determination unit determines regions in n levels, wherein n is an integer greater than or equal to three.

26. The coding apparatus according to claim 23, wherein the flag information is bits dedicated to a flag, or is formed together with a code that represents a coefficient value.

27. The coding apparatus according to claim 23, wherein a fixed length code is generated as the code information.

28. A coding apparatus which compresses a color image including a plurality of components as color components that form a color image to generate code information, said apparatus comprising:
   a separation unit which separates information for each component into a DC component and AC components in each predetermined block;
   a first quantization unit which performs quantization on the AC components separated by said separation unit;
   a transformation unit which transforms the AC components quantized by said first quantization unit to a lightness signal and color signals to obtain an AC lightness signal and AC color signals;
   a region determination unit which determines which region of a plurality of regions said predetermined block belongs to based on the magnitude of at least one amplitude of the AC components, the AC lightness signal, and the AC color signals in each of said predetermined blocks;
   a second quantization unit which performs different quantization for each region on the AC lightness signal and/or the AC color signals based on the result of determination in said region determination unit; and a flag information creation unit which creates flag information to identify the region determined by said region determination unit.

29. The coding apparatus according to claim 28, wherein said second quantization unit performs quantization on the AC lightness signal or the AC color signals more roughly in the region whose amplitude is smaller.

30. The coding apparatus according to claim 28, wherein said region determination unit determines an edge region and a non-edge region.

31. The coding apparatus according to claim 28, wherein said region determination unit determines regions in n levels, wherein n is an integer greater than or equal to three.

32. The coding apparatus according to claim 28, wherein the flag information is bits dedicated to a flag, or is formed together with a code that represents a coefficient value.

33. The coding apparatus according to claim 28, wherein a fixed length code is generated as the code information.

34. A decoding apparatus which decodes code information for a color image including a plurality of components as color components that form a color image, said apparatus comprising:
an inverse quantization unit which performs inverse quantization on the code information to restore an AC lightness signal, AC color signals, a DC lightness signal, and DC color signals;
a first inverse color conversion unit which performs inverse color conversion on the AC lightness signal and the AC color signals to restore an AC signal;
a second inverse color conversion unit which performs inverse color conversion on the DC lightness signal and the DC color signals to restore a DC signal;
an AC inverse quantization unit which performs inverse quantization on the AC signal restored in said first inverse color conversion unit; and
a position-correlation inverse transformation unit which performs inverse transformation of position correlation on the DC signal restored in said second inverse color conversion unit and the AC signal inverse-quantized in said AC inverse quantization unit to restore each component of said color image.

35. The decoding apparatus according to claim 34, wherein said inverse quantization unit uses a median value when a DC lightness signal is restored.

36. A decoding apparatus which decodes code information for a color image including a plurality of components as color components that form a color image, said apparatus comprising:
an inverse quantization unit which performs inverse quantization on the code information to restore an AC lightness signal, an AC color signal, and a DC signal;
a first inverse color conversion unit which performs inverse color conversion on the AC lightness signal and the AC color signals to restore an AC signal;
an AC inverse quantization unit which performs inverse quantization on the AC signal restored in said first inverse color conversion unit; and
a position-correlation inverse transformation unit which performs inverse transformation of position correlation on the DC signal and the AC signal inverse-quantized in said AC inverse quantization unit to restore each component of said color image.

37. The decoding apparatus according to claim 36, wherein said inverse quantization unit uses a median value when a DC lightness signal is restored.

38. A decoding apparatus which decodes code information for a color image including a plurality of color components that form the color image, said apparatus comprising:
an inverse quantization unit configured to perform inverse quantization on the code information to generate converted average density data, converted gradation width data, and converted quantized value data;
an inverse color conversion unit configured to perform inverse color conversion on the converted average density data, the converted gradation width data, and the converted quantized value data to generate average density data, gradation width index data, and quantized value data for each color component; and
an inverse block truncation coding unit which performs an inverse block truncation coding transformation on the quantized value data the average density data, and the gradation width index data to restore each color component of said color image.

39. A decoding apparatus which decodes code information for a color image including a plurality of components as color components that form a color image, said apparatus comprising:
a region determination unit which determines any region to which code information belongs from flag information;
an inverse quantization unit which performs different inverse quantization for each region on the code information for said predetermined block based on the result of determination in said region determination unit to restore a DC lightness signal, DC color signals, an AC lightness signal, and AC color signals;
a first inverse color conversion unit which performs inverse color conversion on the AC lightness signal and the AC color signals to restore an AC signal;
a second inverse color conversion unit which performs inverse color conversion on the DC lightness signal and the DC color signals to restore a DC signal;
an AC inverse quantization unit which performs inverse quantization on the AC signal restored in said first inverse color conversion unit; and
a position-correlation inverse transformation unit which performs inverse transformation of position correlation on the DC signal restored in said second inverse color conversion unit and the AC signal inverse-quantized in said AC inverse quantization unit to restore each component of said color image.

40. The decoding apparatus according to claim 39, wherein said inverse quantization unit uses a median value when the DC lightness signal is restored.

41. A decoding apparatus which decodes code information for a color image including a plurality of components as color components that form a color image, said apparatus comprising:
a region determination unit which determines any region to which code information belongs from flag information;
an inverse quantization unit which performs different inverse quantization for each region on the code information for said predetermined block based on the result of determination in said region determination unit to restore a DC signal, an AC lightness signal, and AC color signals;
a first inverse color conversion unit which performs inverse color conversion on the AC lightness signal and the AC color signals to restore an AC signal; and
a position-correlation inverse transformation unit which performs inverse transformation of position correlation on the DC signal restored in said inverse quantization unit and the AC signal restored in said first inverse color conversion unit to restore each component of said color image.

42. The decoding apparatus according to claim 41, wherein said inverse quantization unit uses a median value when a DC lightness signal is restored.

43. A coding method for compressing a color image including a plurality of components as color components that form a color image to generate code information, said method comprising:

a first step of transforming information for each component by using a one-dimensional or two-dimensional position correlation of an image so that bias is generated in the amount of information;

a second step of transforming the information transformed in said first step to obtain a lightness signal and color signals; and a third step of performing quantization on a plurality of coefficients obtained through transformation in said first step and/or said second step, wherein at least one of the coefficients that correspond to a slant edge of the color image is not transformed by the second step.

44. A computer-readable recording medium in which a program for executing the steps according to claim 43 is recorded.

45. A coding method for compressing a color image including a plurality of components as color components that form a color image to generate code information, said method comprising:

a first step of separating information for each of said components into a DC component and AC components in each predetermined block;

a second step of transforming the separated AC components to a lightness signal and color signals to obtain an AC lightness signal and AC color signals; and a third step of performing quantization on the AC lightness signal and/or the AC color signals, wherein when the AC lightness signal and AC color signals are quantized, said quantization unit performs quantization on a ratio between the AC lightness signal and each of the AC color signals.

46. A computer-readable recording medium in which a program for executing the steps according to claim 45 is recorded.

47. A coding method for compressing a color image including a plurality of components as color components that form a color image to generate code information, said method comprising:

a first step of separating information for each of said components into a DC component and AC components in each predetermined block;

a second step of performing quantization on the separated AC components;

a third step of transforming the separated DC component to a lightness signal and color signals to obtain a DC lightness signal and DC color signals;

a fourth step of transforming the quantized AC components to a lightness signal and color signals to obtain an AC lightness signal and AC color signals; and a fifth step of performing quantization on the transformed AC lightness signal and/or the AC color signals.

48. A computer-readable recording medium in which a program for executing the steps according to claim 47 is recorded.

49. A coding method for compressing a color image including a plurality of color components that form the color image, to generate code information, said method comprising:

a first step of separating information for each component into a DC component and AC components in each predetermined block;

a second step of transforming the separated DC component into a lightness signal and color signals to obtain a DC lightness signal and DC color signals; and a third step of performing quantization on the separated AC components, wherein said first step includes performing a Haar wavelet transformation.

50. A computer-readable recording medium in which a program for executing the steps according to claim 49 is recorded.

51. A coding method for compressing a color image including a plurality of color components that form the color image, to generate code information, said method comprising:

a first step of performing a block truncation coding transformation on image data for each color component in each predetermined block to produce average density data, gradation width index data, and quantized value data for each color component;

a second step of performing color conversion on the average density data the gradation width index data, and the quantized value data for each color component by correlating the color components so as to bias the converted average density data, the converted gradation width index data, and the converted quantized value data; and a third step of performing quantization on the converted average density data, the converted gradation width index data, and the converted quantized value data to generate said code information.

52. A computer-readable recording medium in which a program for executing the steps according to claim 51 is recorded.

53. A coding method for compressing a color image including a plurality of components as color components that form a color image to generate code information, said method comprising:

a first step of transforming information for each component by using a one-dimensional or two-dimensional position correlation of an image in each predetermined block so that bias is generated in the amount of information;

a second step of transforming the information transformed in the first step to obtain a lightness signal and color signals;

a third step of determining any region of the image in each of said predetermined blocks;

a fourth step of performing different quantization for each region on the coefficients obtained through transformation in the first step and/or the second step based on the result of determination on said region; and a fifth step of creating flag information to identify the determined region.

54. A computer-readable recording medium in which a program for executing the steps according to claim 53 is recorded.

55. A coding method for compressing a color image including a plurality of components as color components that form a color image to generate code information, said method comprising:
- a first step of separating information for each component into a DC component and AC components in each predetermined block;
- a second step of performing quantization on the separated AC components;
- a third step of transforming the quantized AC components to a lightness signal and color signals to obtain an AC lightness signal and AC color signals;
- a fourth step of determining which region of a plurality of regions said predetermined block belongs to based on the magnitude of at least one amplitude of the AC components, the AC lightness signal, and the AC color signals in each of said predetermined blocks;
- a fifth step of performing different quantization for each region on the AC lightness signal and/or the AC color signals based on the result of determination on said region; and
- a sixth step of creating flag information to identify the determined region.

56. A computer-readable recording medium in which a program for executing the steps according to claim 55 is recorded.

57. A decoding method for decoding code information for a color image including a plurality of components as color components that form a color image, said method comprising:
- a first step of performing inverse quantization on the code information to restore an AC lightness signal, AC color signals, a DC lightness signal, and DC color signals;
- a second step of performing inverse color conversion on the AC lightness signal and the AC color signals to restore an AC signal;
- a third step of performing inverse color conversion on the DC lightness signal and the DC color signals to restore a DC signal;
- a fourth step of performing inverse quantization on the restored AC signal; and
- a fifth step of performing inverse transformation of position correlation on the restored DC signal and the inverse-quantized AC signal to restore each component of said color image.

58. A computer-readable recording medium in which a program for executing the steps according to claim 57 is recorded.

59. A decoding method for decoding code information for a color image including a plurality of components as color components that form a color image, said method comprising:
- a first step of performing inverse quantization on code information to restore an AC lightness signal, an AC color signal, and a DC signal;
- a second step of performing inverse color conversion on the AC lightness signal and the AC color signals to restore an AC signal;
- a third step of performing inverse quantization on the restored AC signal; and
- a fourth step of performing inverse transformation of position correlation on the restored DC signal and the inverse-quantized AC signal to restore each component of said color image.

60. A computer-readable recording medium in which a program for executing the steps according to claim 59 is recorded.

61. A decoding method for decoding code information for a color image including a plurality of color components that form the color image, said method comprising:
- a first step of performing inverse quantization on the code information to generate converted average density data, converted gradation width data, and converted quantized value data;
- a second step of performing inverse color conversion on the converted average density data, the converted gradation width data, and the converted quantized value data to generate average density data, gradation width index data, and quantized value data for each color component; and
- a third step of performing an inverse block truncation coding transformation on the quantized value data, the average density data, and the gradation width index data to restore each color component of said color image.

62. A computer-readable recording medium in which a program for executing the steps according to claim 61 is recorded.

63. A decoding method for decoding code information for a color image including a plurality of components as color components that form a color image, said method comprising:
- a first step of determining any region to which code information belongs from flag information;
- a second step of performing different inverse quantization for each region on the code information for said predetermined block based on the result of determination on said region to restore a DC lightness signal, DC color signals, an AC lightness signal, and AC color signals;
- a third step of performing inverse color conversion on the AC lightness signal and the AC color signals to restore an AC signal;
- a fourth step of performing inverse color conversion on the DC lightness signal and the DC color signals to restore a DC signal;
- a fifth step of performing inverse quantization on the restored AC signal; and
- a sixth step of performing inverse transformation of position correlation on the inverse-quantized AC signal and the restored DC signal to restore each component of said color image.

64. A computer-readable recording medium in which a program for executing the steps according to claim 63 is recorded.

65. A decoding method for decoding code information for a color image including a plurality of components as color components that form a color image, said method comprising:
- a first step of determining any region to which code information belongs from flag information;
- a second step of performing different inverse quantization for each region on the code information for said predetermined block based on the result of determination on said region to generate a DC signal, an AC lightness signal, and AC color signals;
- a third step of performing inverse color conversion on the AC lightness signal and the AC color signals to restore an AC signal;
- a fourth step of performing inverse quantization on the restored AC signal; and
- a fifth step of performing inverse transformation of position correlation on the restored DC signal and the inverse-quantized AC signal to restore each component of said color image.

66. A computer-readable recording medium in which a program for executing the steps according to claim 65, is recorded.

67. A coding apparatus which compresses a color image including a plurality of components as color components that form a color image to generate code information, said apparatus comprising:

a separation unit which separates information for each component into a DC component and AC components in each predetermined block;

a transformation unit which transforms the AC components separated by said separation unit to a lightness signal and color signals to obtain an AC lightness signal and AC color signals; and a quantization unit which performs quantization on the AC lightness signal and/or the AC color signals obtained by said transformation unit, wherein said quantization unit sets a threshold value to a value larger than a median point of quantized values when vector quantization is performed.

68. The coding apparatus according to claim 67, wherein when an AC lightness signal and/or AC color signals are quantized, said quantization unit performs vector quantization on the signals.

69. The coding apparatus according to claim 67, wherein when the AC lightness signal and AC color signals are quantized, said quantization unit performs quantization on a ratio between the AC lightness signal and each of the AC color signals.

70. The coding apparatus according to claim 67, wherein said separation unit performs transformation by referring to only pixels within a predetermined block as a unit to be transformed.

71. The coding apparatus according to claim 67, wherein a fixed length code is generated as the code information.

72. A coding apparatus for a color image which compresses a color image including a plurality of color components that form the color image, said apparatus comprising:

a separation unit configured to separate information for each component into a DC component and AC components in each predetermined block;

a transformation unit configured to transform the DC component separated by said separation unit to a lightness signal and color signals to obtain a DC lightness signal and DC color signals; and a quantization unit configured to perform quantization on the AC components separated by said separation unit, wherein said separation unit is configured to perform a Haar wavelet transform.

73. The coding apparatus for a color image according to claim 72, wherein said quantization unit performs vector quantization on a specific color that has an edge with a largest value of the AC components, and performs quantization on a ratio between a component of another color and a vector of the specific color.

74. The coding apparatus for a color image according to claim 72, wherein said quantization unit sets a threshold value to a value larger than a median point of quantized values when vector quantization is performed.

75. The coding apparatus for a color image according to claim 72, wherein said separation unit performs transformation by referring to only pixels within a predetermined block as a unit to be transformed.

76. The coding apparatus for a color image according to claim 72, wherein a fixed length code is generated as the code information.

77. A coding method for compressing a color image including a plurality of components as color components that form a color image to generate code information, said method comprising:

a first step of separating information for each of said components into a DC component and AC components in each predetermined block;

a second step of transforming the separated AC components to a lightness signal and color signals to obtain an AC lightness signal and AC color signals; and a third step of performing quantization on the AC lightness signal and/or the AC color signals, wherein said quantization unit sets a threshold value to a value larger than a median point of quantized values when vector quantization is performed.

78. A coding apparatus which compresses a color image including a plurality of components as color components that form a color image to generate code information, said apparatus comprising:

a first transformation unit which transforms information for each component by using a one-dimensional or two-dimensional position correlation of an image so that bias is generated in the amount of information;

a second transformation unit which transforms the information transformed by said first transformation unit to obtain a lightness signal and color signals; and a quantization unit which performs quantization on a plurality of coefficients obtained through transformation by said first transformation unit and/or said second transformation unit, wherein the first transformation unit associates a first amount of information with a first coefficient and associates a second amount of information less than the first amount of information with a second coefficient to generate the bias in the amount information, and wherein the first transformation unit divides the information for each of the plurality of components into DC information and AC information using the position correlation of the color image.

79. The coding apparatus according to claim 78, wherein a fixed length code is generated as the code information.

* * * * *